(12) United States Patent
Ziff et al.

(10) Patent No.: US 6,697,821 B2
(45) Date of Patent: Feb. 24, 2004

(54) CONTENT DEVELOPMENT MANAGEMENT SYSTEM AND METHOD

(75) Inventors: Susan Janette Ziff, Washington, DC (US); Allan L. Davidson, Nassau (BS)

(73) Assignee: Süccesses.com, Inc., Nassau (BS)

( * ) Notice: Subject to any disclaimer, the term of this patent is extended or adjusted under 35 U.S.C. 154(b) by 388 days.

(21) Appl. No.: 09/851,789

(22) Filed: May 8, 2001

(65) Prior Publication Data
US 2002/0023093 A1 Feb. 21, 2002

Related U.S. Application Data

(63) Continuation-in-part of application No. 09/526,700, filed on Mar. 15, 2000, now Pat. No. 6,557,013.

(51) Int. Cl.[7] .................................................. G06F 7/00
(52) U.S. Cl. ....................... 707/104.1; 707/10; 707/102; 715/513; 715/514
(58) Field of Search ................... 707/1, 10, 100–104.1; 709/100, 102, 106–108, 310, 318; 715/501.1, 513–514, 522, 530; 360/12, 13, 71

(56) References Cited

U.S. PATENT DOCUMENTS

| | | | | |
|---|---|---|---|---|
| 5,181,162 A | * | 1/1993 | Smith et al. ................. 715/530 |
| 5,434,952 A | * | 7/1995 | Yen et al. ...................... 706/59 |
| 5,841,741 A | * | 11/1998 | Freeman ....................... 360/71 |
| 6,038,573 A | * | 3/2000 | Parks ........................... 715/513 |
| 6,199,082 B1 | * | 3/2001 | Ferrel et al. ................. 715/522 |
| 6,230,173 B1 | * | 5/2001 | Ferrel et al. ................. 715/513 |
| 6,460,036 B1 | * | 10/2002 | Herz ............................ 707/10 |
| 6,584,480 B1 | * | 6/2003 | Ferrel et al. ................. 715/513 |

* cited by examiner

Primary Examiner—Greta Robinson
Assistant Examiner—Linh Black
(74) Attorney, Agent, or Firm—Gray Cary Ware & Freidenrich LLP

(57) ABSTRACT

A system and method for content development management is provided which increases the speed, quality control and accuracy of the content generation process and reduces the cost of the content generation process by providing the steps of the content generation process in a single integrated system. The system also permits the users of the system to work at different times of the day and in different geographic locations. The system also permits the users of the system to rapidly determine the current status of any content in the system. The system may be used to generate various different types of content including written content, such as success stories, stories, articles, advertisements, auditory content, such as radio spots, radio advertisements, radio presentations, electronic downloaded auditory content, audiovisual content that combines audible content and written content and visual content including television video or video data.

33 Claims, 72 Drawing Sheets

If you know of a success that you think would make a great story. . . tell us about it by filling in as many fields beside as you can.

HOW CAN WE CONTACT YOU?

| YOUR FIRST NAME | YOUR LAST NAME |
| TITLE | YOUR COMPANY |
| YOUR EMAIL ADDRESS | YOUR PHONE NUMBER COUNTRY PREFIX |

STREET ADDRESS

| CITY | STATE |
| ZIP | COUNTRY |

WHOM SHOULD BE CONTACT FOR DETAILS, IF NOT YOU?

| YOUR FIRST NAME | YOUR LAST NAME |
| TITLE | YOUR COMPANY |
| YOUR EMAIL ADDRESS | YOUR PHONE NUMBER COUNTRY PREFIX |

STREET ADDRESS

| CITY | STATE |
| ZIP | COUNTRY |

IS THERE ANYBODY ELSE WHO NEEDS TO GIVE PERMISSION BEFORE WE PUBLISH THIS STORY?

CONTACT INFORMATION

FIG. 2A

TELL US YOUR STORY, WHAT MAKES IT SO
SPECIAL AND WHY WAS IT SO SUCCESSFUL?

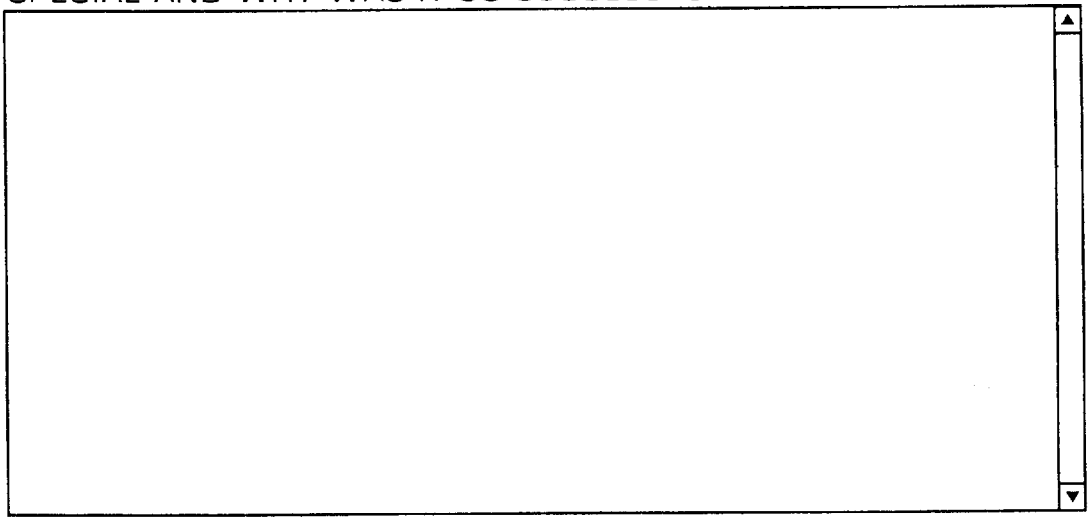

TAKE AS MUCH ROOM AS YOU LIKE FOR YOUR STORY, FIELD WILL ADJUST

IS THERE A WEBSITE THAT WE CAN LEARN MORE FROM?

URL

WHAT INDUSTRY ARE YOU IN?

SELECT ONE ▼

HOW BIG IS THE COMPANY?

SELECT COMPANY SIZE ▼

PLEASE TELL US ABOUT THE MAIN HARDWARE AND
SOFTWARE USED ON THIS PROJECT

HARDWARE                                    SOFTWARE

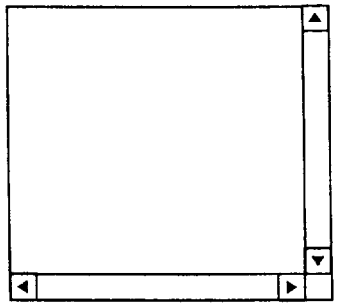                        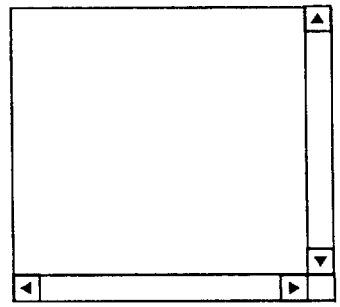

USE ONE LINE FOR EACH ITEM                  USE ONE LINE FOR EACH ITEM

FIG. 2B

HOW DID THIS PRODUCT HELP YOU SUCCEED? (HIGHER SALES, RELIABILITY...)
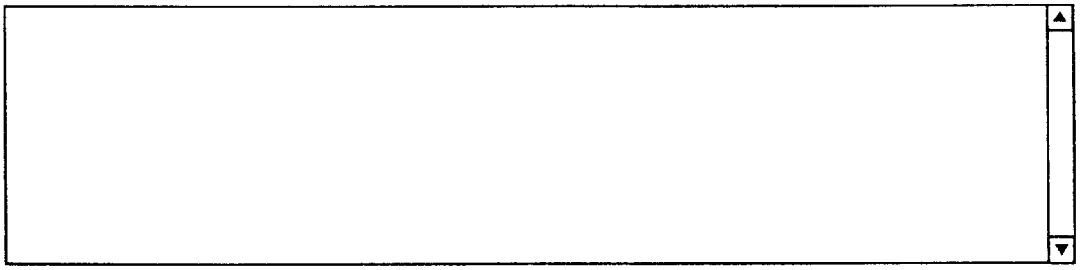
TAKE AS MUCH SPACE AS YOU NEED
ANY ADDITIONAL INFORMATION OR WEBSITES WE SHOULD VISIT?
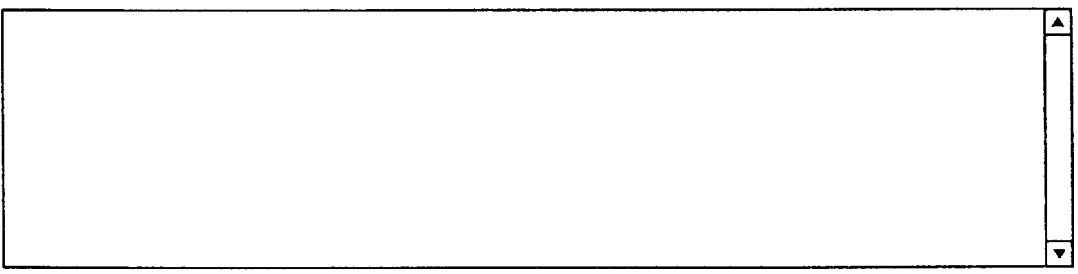
TAKE AS MUCH SPACE AS YOU NEED
HOW DID YOU HEAR ABOUT THIS PROJECT?
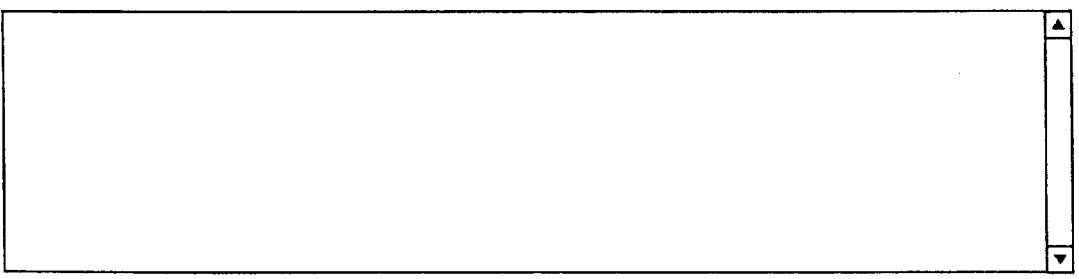
TAKE AS MUCH SPACE AS YOU NEED
| SUBMIT THIS SUCCESS STORY |
Copyright 1998 The Cybercasters (America) Corp
All Rights Reserved
FIG. 2C

52

Corporation

Publicity, Advertising and Promotional Release

The Quantum Corporation ("Quantum") appreciates and values the opportunity to serve the business needs of you and your company (the "Customer"). The positive experiences customers like you have had using Quantum's products affords us an unique opportunity to promote our products and your company.

In consideration for the potential promotional benefits Customer may receive from such exposure, Customer hereby grants to Quantum, or anyone authorized by Quantum, the right to utilize in any and all manner and media now known or later devised, including without limitation web-based and print media, throughout the world in perpetuity, solely for the purposes of publicity, promotion, and advertising, all materials, including without limitation all printed materials, photographs, illustrations, animated depiction of software program(s), screen shots, and oral reports or interviews provided by Customer to Quantum for such purposes in general and more specifically in relation to the success story known as:

_____    _____
(Ref. #)                       (Name of Success Story), (the" Materials").

Customer also grants to Quantum permission to use the Customer's Marks in any and all manner and media now known or later devised throughout the world in perpetuity, solely for publicity, promotion and advertising purposes. Customer's Marks shall mean Customer's company name, trademarks, logos, service names, software icon representations, and slogans as adopted by Customer from time to time and provided to Quantum as part of the Materials. Quantum shall use the Customer's Marks in accordance with Customer's policies on such use, as communicated in writing to Quantum from time to time.

If any of the Materials contain the name, likeness or picture, (including without limitation, photographs, film, video, or digital images), voice, quotations or testimonials, or biographical materials, of any of the Customer's officers, employees, agents, customers, or any other third party, customer represents and warrants that (i) Customer has sufficient rights to the materials to grant to Quantum the rights set forth in this release, and Quantum's exercise of such rights will not constitute an infringement of any intellectual property rights of any third party, and (ii) Customer has the full power to enter into this agreement, to carry out its obligations hereunder, and to grant the permissions granted to Quantum herein.

Customer expressly releases Quantum, its agents employees, licensees and assigns from and against any and all claims which Customer has or may have for invasion of privacy, defamation or any other cause of action arising out of production, distribution, broadcast or exhibition of the materials. Customer acknowledges that Quantum is under no obligation to exercise any of the rights granted hereunder.

The signature below acknowledges agreement with the grants and provisions in this document.

Signature: _____    Date: _____

Name/Title: _____

Company: _____

Address: _____

_____

_____

This document is also available as a .pdf file which can be viewed using Adobe Acrobat Reader 2.1 or higher

| Serial# | Name | Tickler Date | Status Bar Pages Completed | | | | |
|---|---|---|---|---|---|---|---|
| 10146 | Janet Lee - Ingram Micro (QUANTUM) | | | | | | |
| 10147 | KidzOnline (QUANTUM) | | 1 | 2 | 3 | 4 | 5 |
| 10148 | Arrow Electronics (QUANTUM) | | | | | | |
| 10253 | Greyound (QUANTUM) | | 1 | 2 | 3 | 4 | 5 |
| 10254 | Internet Archive (QUANTUM) | | 1 | 2 | 3 | 4 | 5 |
| 10256 | Origin Systems (QUANTUM) | | 1 | 2 | 3 | 4 | 5 |
| 10257 | MeritCare (QUANTUM) | | 1 | 2 | 3 | | |
| 10258 | Bruce Toback's Durable Drives (QUANTUM) | | | | | | |
| 10260 | Micro Technology Groupe (QUANTUM) | | | | | | |
| 10261 | Peripheral Parts Support (QUANTUM) | | | | | | |
| 10262 | Alan M. Gordon Consulting (QUANTUM) | | 1 | 2 | 3 | | |
| 10263 | BCD Computers (QUANTUM) | | | | | | |
| 10264 | Elta Electronics (QUANTUM) | | 1 | 2 | 3 | | |
| 10268 | Cabelas (QUANTUM) | | | 2 | | | |
| 10270 | Linkow Computing (QUANTUM) | | | | | | |
| 10271 | ELTA Electronics (QUANTUM) | | | | | | |
| 10272 | Peter Plantec's Old Time Radio (QUANTUM) | | 1 | 2 | 3 | 4 | |
| 10275 | Hewlett-Packard (QUANTUM) | | | 2 | 3 | | |
| 10276 | Silicon Graphics (QUANTUM) | | | | | | |
| 10277 | A. D. Microcircuit Computer (QUANTUM) | | | | | | |
| 10278 | Digital Basics (QUANTUM) | | | | | | |
| 10279 | Aps Technologies (QUANTUM) | | 1 | 2 | 3 | 4 | |

Full Data of Current Story

Serial #: 10253  Story Name: Greyhound
Client: Quantum

This page will show all the details of this record

92

94 Editor: 96
Initial OK:
- ☑ Requested (1.3)
- ☑ Authorized (1.4)

94  98
Copy Edit:
- ☑ Requested (4.6)
- ☑ Spell Checked (5.1.1)
- ☑ Format Checked (5.1.2)

100
WebReady
- ☑ Authorized (5.2)
- ☐ Spiked (1.5)

106 Writer:
Data Complete: 102

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented: 104
- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web Info (4.3)
- ☑ Pix in DB (4.5.1)
- ☑ Audio in DB (4.5.2)

Original Submission Data

SOURCE Public

Lead Contact Info

| | Submitted by: | Customer Info: |
|---|---|---|
| FIRST NAME: | Bill | FIRST NAME: |
| LAST NAME: | Cattell | LAST NAME: |
| TITLE: | Lead Network Analyst | TITLE: |
| COMPANY: | Greyhound Lines Inc. | COMPANY: |
| EMAIL: | | EMAIL: |
| PHONE: | | PHONE: |
| FAX: | | FAX: |
| TAX EXEMPTION NUMBER | | TAX EXEMPTION NUMBER |
| POSTAL ADDRESS | | POSTAL ADDRESS |
| STREET ADDRESS | P.O. Box 660362 | STREET ADDRESS: |
| CITY: | Dallas | CITY: |
| STATE: | TX | STATE: |
| ZIP: | 75266 | ZIP: |
| COUNTRY: | USA | COUNTRY: |

URL: http://www.greyhound.com
Company Size: 5000+
Industry Field: Miscellaneous

DOES ANYBODY NEED TO APPROVE THIS STORY FOR WEB USE? WHO?

DESCRIBE THE PROJECT:
Greyhound uses LANtegrity Network Recovery Software in conjunction with Quantum DLT tape drives to back up both internal network applications and customer services like the On-Line Reservation System.

WHY IS THIS A GOOD SUCCESS STORY?
Speed, Capacity, Reliability

ANYTHING MORE TO ADD?

HOW DID YOU HEAR ABOUT THIS PROJECT?

Entered by TEM 12/31/98

TELL US ABOUT THE HARDWARE AND SOFTWARE USED FOR THIS PROJECT

FIG. 5A

| SOFTWARE USED | HARDWARE USED |
|---|---|
| LANtegrity | Compaq ProLiant 5000 servers<br>Quantum DLT 4000 tape drives |

Story Data

PROJECT TITLE (VISIBLE ON THE WEB):
Greyhound Network Backup

| | |
|---|---|
| PROJECT COMPANY: | Greyhound Lines, Inc. |
| PROJECT COMPANY SIZE: | 5000+ |
| PROJECT STATE: | TX (Texas) |
| PROJECT COUNTRY: | U.S.A. |
| PROJECT CREATOR: | Bill Cattell |

STORY HEADLINE (VISIBLE ON THE WEB):
That's the Ticket!

STORY CAPSULE (VISIBLE ON THE WEB):
Coast to coast, Greyhound riders know they can expect reliable, timely transportation. A Quantum DLTtape™ systems help keep the bus line On Line.

STORY LEAD (VISIBLE ON THE WEB):
It happens thousands of times a day -- all over the US. A traveler steps up to a Greyhound ticket counter and within a few seconds is all ready for a trip -- across the state or across country. Behind that efficient service is an array of efficient computer systems. And behind those computer systems, you'll find Quantum.

STORY BODY (VISIBLE ON THE WEB):
Greyhound Lines depends on an elaborate network of computers to keep the buses rolling on time. Ticket counters are linked into a system-wide passenger reservation system making possible fast, efficient service for even the most complicated route. From timetables to transfers, the Greyhound system keeps you moving and gets you where you need to be -- without hassle.

Greyhound's office functions are just as efficient. The company headquarters complex in Dallas is linked by and effective Corporate Communications Network. And Dallas, in turn is connected to numerous other offices across North America through a Wide Area Network.

But what happens if there's a system crash? Does everything grind to a halt?

Not a chance. Greyhound's computer operations are backed up by a reliable Quantum DLTtape™ system.

Bill Cattell, Greyhound's network administrator, was responsible for choosing Quantum, replacing an outmoded 4mm tape backup system back in 1996. "The 4mm backup units we were using were unreliable," Bill explains. "We had backup failures and just too many midnight calls."

The replacement system needed to be fast, efficient and above all dependable. "The special

FIG. 5B problems we face in backup are based on the fact that we have so many servers to back up and such a small window of time to get the work done," notes Bill. "We don't run any backups during the day -- they have to be run between 10pm and 6am the next day. We run incremental backups every night and full backups over the weekend. Each server has about 40 gigabytes of storage, so we have a heavy backup workload."

Using the old 4mm system meant a lot of hands-on supervision, and there were too many system failures. "We were pushing the 4mm technology too hard," admits Bill, "and it couldn't take it.

But not so with the Quantum DLTtape™ units. "With DLTtape™ autoloader backup." says Bill, "it's an entirely lights-out, hands-off operation. DLTtape™ technology can handle the workload -- the benefits are speed, capacity, and reliability."

Speed, capacity, and reliability -- qualities you look for in selecting transportation. That's why millions of Americans "leave the driving to Greyhound."

And that's why Greyhound leaves the backup to Quantum!

QUOTES (VISIBLE ON THE WEB):

"The special problems we face in backup are based on the fact that we have so many servers to back up and such a small window of time to get the work done. We don't run any backups during the day -- they have to be run between 10pm and 6am the next day. We run incremental backups every night and full backups over the weekend. Each server has about 40 gigabytes of storage, so we have a heavy backup workload."

"That was one of the problems with the 4mm approach -- there was just too much hands-on required. We were pushing the 4mm technology too hard and it couldn't take it."

"With DLT autoloader backup, it's an entirely lights-out, hands-off operation. DLT technology can handle the workload -- the benefits are speed, capacity, and reliability."

--Bill Cattell
Lead network Analyst, Greyhound Lines Inc.

| KEYWORDS | MARKETS |
|---|---|
| Networking | Quantum Market |

| HARDWARE TOOLS | SOFTWARE TOOLS |
|---|---|
| Compaq ProLiant 5000 server<br>Quantum DLT 7000 | LANtegrity |

CONTACT DATA THAT WILL APPEAR ON THE WEB:

| | | | |
|---|---|---|---|
| FIRST NAME: | Bill | POSTAL ADDRESS: | P.O. Box 660362 |
| LAST NAME: | Cattell | | |
| TITLE: | Lead Network Analyst | CITY: | Dallas |
| COMPANY: | Greyhound Lines Inc. | STATE: | TX |
| | | ZIP: | 75266 |
| | | COUNTRY: | USA |
| TEL: | | EMAIL: | |
| FAX: | | URL: | http://www.greyhound.com |

FAQ
Copyright 1998. The Cybercasters (America) Corp. All rights reserved

Editor:

Initial OK:
- ☑ Requested (1.3)
- ☑ Authorized (1.4)

Copy Edit:
- ☑ Requested (4.6)
- ☑ Spell Checked (5.1.1)
- ☑ Format Checked (5.1.2)

WebReady
- ☑ Authorized (5.2)
- ☐ Spiked (1.5)

Writer:

Data Complete:

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented:

- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web Info (4.3)
- ☑ Pix in DB (4.5.1)
- ☑ Audio in DB (4.5.2)

110

1. Rate of Submission

Serial #: 10253     Story Name: Greyhound
Client: Quantum

1.1 ☑ Assign a name to the story in the "Story Name" box

1.2 ☑ Rate the Submission:
 1. Fill in the appropriate checkbox
 2. Make notes of your reasoning in the Notes box

1.3 ☑ Email your Editor:
 1. Use the "Save" button to store your settings in the database
 2. Use this link to Email your Editor
 3. Include Story's Title and Reference Number, and reasons for rating
 4. Editor will respond with approval or will spike the story. Await authorization from your Editor before continuing.

1.4 ☑ Editor only: Authorize this story
1.5 ☐ Editor only: Spike story [_____] Now (Server Time Zone MmmYYYY)

[Save] [Cancel] [Save & Next] [Save & Pending]

SOURCE     PUBLIC
LEAD CONTACT INFO

| SUBMITTED BY: | | CUSTOMER INFO: |
|---|---|---|
| FIRST NAME: | Bill | FIRST NAME: |
| LAST NAME: | Cattell | LAST NAME: |
| TITLE: | Lead Network Analyst | TITLE: |
| COMPANY: | Greyhound Lines Inc. | COMPANY: |
| EMAIL: | | EMAIL: |
| PHONE: | | PHONE: |
| FAX: | | FAX: |
| TAX EXEMPTION NUMBER | | TAX EXEMPTION NUMBER |
| POSTAL ADDRESS | | POSTAL ADDRESS |
| STREET ADDRESS: | P.O. Box 660362 | STREET ADDRESS: |
| CITY: | Dallas | CITY: |
| STATE: | TX | STATE: |
| ZIP: | 75266 | ZIP: |
| COUNTRY: | USA | COUNTRY: |

URL: http://www.greyhound.com
COMPANY SIZE: 5000+
INDUSTRY FIELD: Miscellaneous

DOES ANYBODY NEED TO APPROVE THIS STORY FOR WEB USE? WHO?

DESCRIBE THE PROJECT:

FIG. 6A

Greyhound uses LANtegrity Network Recovery Software in conjunction with Quantum DLT tape drives to back up both internal network applications and customer services like the On-Line Reservation System.

WHY IS THIS A GOOD SUCCESS STORY?

Speed, Capacity, Reliability

ANYTHING MORE TO ADD?

HOW DID YOU HEAR ABOUT THIS PROJECT?

Entered by TEM 12/31/98

TELL US ABOUT THE HARDWARE AND SOFTWARE USED FOR THIS PROJECT
SOFTWARE USED            HARDWARE USED
    LANtegrity                 Compaq ProLiant 5000 server
                                Quantum DLT 4000 tape drives Use this link to provide feedback to your Editor for this company's stories

FAQ

Copyright 1998. The Cybercasters (America) Corp. All rights reserved

[Save] [Cancel] [Save & Next] [Save & Pending]

FIG. 6B

| 92 | 120 |

| Editor: |
|---|
| Initial OK: |
| ☑ Requested (1.3) |
| ☑ Authorized (1.4) |
| |
| Copy Edit: |
| ☑ Requested (4.6) |
| ☑ Spell Checked (5.1.1) |
| ☑ Format Checked (5.1.2) |
| |
| WebReady |
| ☑ Authorized (5.2) |
| ☐ Spiked (1.5) |
| |
| Writer: |
| |
| Data Complete: |
| |
| Releases: |
| ☑ Verbal (2.1.3) |
| ☑ Emailed (2.3) |
| ☑ Fax (3.1) |
| ☑ Original (4.1) |
| |
| ☑ Story data (2.1.4) |
| ☑ Quotes (2.1.5) |
| ☑ Web Cont. (2.1.6) |
| ☑ Pix (4.2.1) |
| ☑ Audio (4.2.2) |
| |
| Implemented: |
| |
| ☑ Data Verified (4.3) |
| ☑ Headline (3.2.1) |
| ☑ Capsule (3.2.2) |
| ☑ Lead (3.3.4) |
| ☑ Body (3.2.4) |
| ☑ Quotes (3.3) |
| ☑ Categorized (3.5) |
| ☑ Web Info (4.3) |
| ☑ Pix in DB (4.5.1) |
| ☑ Audio in DB (4.5.2) |

2. Complete Info Required to Write this story

Serial # 10253  Story Name: Greyhound
Client: Quantum

2.1 Contact the subject party of the Success Story. During the phone call:
1. ☑ Confirm accuracy of the submitted information (visible by clicking the "View Record" link on the menu bar) and obtain any information to confirm that the story is what we think it is.
2. ☑ Obtain Verbal Consent for use of story - do not proceed further until verbal consent has been received. Also confirm that a person with some authority will eventually sign the release form; there is no point in doing anything more without this verbal okay.
3. ☑ Enter the name, title and contact info of the person providing verbal consent in "Ongoing contacts for Success Stories" box.
4. ☑ Obtain any additional information required to complete the story in the blank fields on this page.
5. ☑ Obtain raw quotes necessary to do the story, plus extra quotes if possible.
6. ☑ Get the data for the person whose name should appear on the web as contact person.
7. ☑ Have them download and print the legal release form. They (or whoever has authority to sign the release) should fill it out and fax it to us, then send us the original. Double check your notes and the original submission to ensure that they have indeed got the power to sign.

The release may not be modified by anybody under any circumstances. YOU ARE NOT AUTHORIZED TO MAKE, ACCEPT OR ALLOW CHANGES OF ANY TYPE TO THE RELEASE TEXT. The office of The Cybercasters (America) Corp are the only persons authorized to accept an additional letter that allows any variation from the conditions of the standard release; please contact them if any issues should arise.

8. ☑ Arrange for them to send us pix/audio/video as appropriate; as they may be technical, please check with your editor if you have the slightest doubt about what to arrange. Make a note in the "Notes & Queries" box listing what we are supposed to be receiving.

2.2 ☑ Note the date/time, name and details of what they said about the release in the "Notes" box - it is important to document the verbal release properly.
2.3 ☑ Email the person (using the model included in the FAQ) who has given the verbal release, thanking them for their time, their verbal release and willingness to participate in the project. Also quickly confirm the important facts that they gave us, so as to ensure that everything has been correctly understood.

[Save] [Cancel] [Save & Next] [Save & Pending]

| Project Data to Appear on the Web: |
|---|
| Creator of Customer's Project: Bill Cattell |
| Customer's Company Name: Greyhound Lines, Inc. ▼ |

FIG. 7A

| | |
|---|---|
| Customer's Company Size: | 5000+ ▼ |
| State where Project is located: | TX (Texas) ▼ |
| Country where Project is located: | USA ▼ |

PROJECT QUOTES (RAW QUOTES PROVIDED BY SUCCESSFUL CUSTOMER)

"The special problems we face in backup are based on the fact that we need many servers to back up and such a small window of time to get the work done," notes Bill. "We don't run any backups during the day -- they have to be .. . .

CONTACT DATA THAT WILL APPEAR ON THE WEB:

| | | | |
|---|---|---|---|
| First Name: | Bill | Postal Address: | P.O. Box 660362 |
| Last Name: | Cattell | | |
| Title: | Lead Network Analyst | City: | Dallas |
| Company: | Greyhound Lines Inc. | State: | TX |
| | | Zip: | 75266 |
| | | Country: | USA |
| Tel: | | Email: | |
| Fax: | | URL: | http://www.greyhound.com |

Use this link to provide feedback to your Editor for this company's stories

FAQ

Copyright 1998 The Cybercasters (America) Corp. All rights Reserved

[ Save ] [ Cancel ] [ Save & Next ] [ Save & Pending ]

FIG. 7B

3. Write the Story

Serial #: 10253  Story Name: Greyhound
Client: Quantum 3.1 ☑ Confirm the fax release has arrived (or the original hardcopy.) don't do work on this story until the release is in our hands.
3.2 Write the story - use the following fields:
 1. ☑ Headline
 2. ☑ Capsule Summary (ie. one line description)
 3. ☑ Lead (ie. the first paragraph of the story)
 4. ☑ Story Body (ie. second paragraph till end of story).
3.3 ☑ Spellcheck all the text in the record.
3.4 ☑ Assign the appropriate keyword/s, Market Segments, company size, etc. to record. Avoid using more than 5 keywords per story.
3.5 ☑ Do whatever is still required to obtain the final release form.
3.6 ☐ Follow up on any images, audio and/or video that were supposed to be used
3.7 Follow up on the media that you've arranged for this story (see 2.1.8)

[ Save ] [ Cancel ] [ Save & Next ] [ Save & Pending ]

Editor:

Initial OK:
☑ Requested (1.3)
☑ Authorized (1.4)

Copy Edit:
☑ Requested (4.6)
☑ Spell Checked (5.1.1)
☑ Format Checked (5.1.2)

WebReady
☑ Authorized (5.2)
☐ Spiked (1.5)

Writer:

Data Complete:

Releases:
☑ Verbal (2.1.3)
☑ Emailed (2.3)
☑ Fax (3.1)
☑ Original (4.1)

☑ Story data (2.1.4)
☑ Quotes (2.1.5)
☑ Web Cont. (2.1.6)
☑ Pix (4.2.1)
☑ Audio (4.2.2)

Implemented:
☑ Data Verified (4.3)
☑ Headline (3.2.1)
☑ Capsule (3.2.2)
☑ Lead (3.3.4)
☑ Body (3.2.4)
☑ Quotes (3.3)
☑ Categorized (3.5)
☑ Web Info (4.3)
☑ Pix in DB (4.5.1)
☑ Audio in DB (4.5.2)

---

PROJECT TITLE (VISIBLE ON THE WEB):
Greyhound Network Backup

STORY HEADLINE (VISIBLE ON THE WEB):
That's The Ticket!

STORY CAPSULE (VISIBLE ON THE WEB):
Coast to coast, Greyhound riders know they can expect reliable, timely transportation. And Quantum DLTtape

STORY LEAD (VISIBLE ON THE WEB):
It happens thousands of times a day -- all over the US. A traveler steps up to a Greyhound ticket counter and within a few seconds is all ready for a trip across the state or across the country.
Behind those computer systems, you'll . . .

STORY BODY (VISIBLE ON THE WEB):
Greyhound Lines depends on an elaborate network of computers to keep rolling on time. Ticket counters are linked into a system-wide passenger reservation system making possible fast, efficient service for even the most complicated route. From timetables to transfers, the Greyhound system keeps moving and gets you where you need to be -- without hassle.

Greyhound's office functions are just as efficient. the company headquarters complex in Dallas is linked by an effective Corporate Communications network. Dallas, in turn, is connected to numerous other offices across North America through a Wide Area Network.

PROJECT QUOTES (RAW QUOTES PROVIDED BY SUCCESSFUL CUSTOMER)

FIG. 8A

"The special problems we face in backup are based on the fact that we use servers to back up and such a small window of time to get the work done," says Bill. "We don't run any backups during the day -- they have to be run between 10pm and 6am the next day. We run incremental backups every night and full

QUOTES (VISIBLE ON THE WEB)

"The special problems we face in backup are based on the fact that we have servers to back up and such a small window of time to get the work done. We don't run any backups during the day -- they have to be run between 10pm and 2am the next day. We run incremental backups every night and full backups over the weekend. Each server has about 40 gigabytes of storage, so we have a heavy backup.

"That was one of the problems with the 4mm approach -- there was just too much hands on required. We were pushing the 4mm technology too hard and it showed it."

"With DLT autoloader backup, it's an entirely lights-out, hands-off . . .

KEYWORD          SELECTED KEYWORD

Art
Banking and Finance
Broadcasting          Add           Networking
Education
Engineering
Entertainment
Film Production       Remove
Fitness

[Add/Edit Keyword]

MARKET           SELECTED MARKET

Quantum Market      Add          Quantum Market

Remove

[Add/Edit Market]

Use this link to provide feedback to your Editor for this company's story

FAQ

Copyright 1998 The Cybercasters (America) Corp. All Rights Reserved

[Save] [Cancel] [Save & Next] [Save & Pending]

FIG. 8B

4. WebData - Complete Web Display Data

92 — Editor panel
140 — Main form
142 — Story Name: Greyhound

Editor:

Initial OK:
- ☑ Requested (1.3)
- ☑ Authorized (1.4)

Copy Edit:
- ☑ Requested (4.6)
- ☑ Spell Checked (5.1.1)
- ☑ Format Checked (5.1.2)

WebReady
- ☑ Authorized (5.2)
- ☐ Spiked (1.5)

Writer:

Data Complete:

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented:
- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web Info (4.3)
- ☑ Pix in DB (4.5.1)
- ☑ Audio in DB (4.5.2)

---

Serial #: 10253   Story Name: Greyhound
Client: Quantum

4.1 ☑ Confirm that the original hardcopy release has arrived.
4.2 Confirm arrival of the images/audio/video that were supposed to come in - follow up if they haven't. Check we've begun our internal processing to prepare them for the Web
  1. ☑ Images
  2. ☑ Audio and/or Video
4.3 ☑ Verify that all the information required for the Web is complete and confirmed accurate.
4.4 ☑ Fill in the Definitive hardware and software listings (to be visible on the Web). Add new products and companies as necessary.
4.5 Confirm that the image/audio/video materials are ready to publish. Fill in the links for these materials.
  1. ☑ Image material
  2. ☑ Audio/Video materials
4.6 ☑ When you've completed all of the above, notify your editor that this story is ready for CopyEdit and Final OK - include the story number and name in the subject when you send your email.

[Save] [Cancel] [Save & Next] [Save & Pending]

SOFTWARE USED (AS SUBMITTED)
LANtegrity

| SOFTWARE | | SOFTWARE (VISIBLE ON THE WEB) |
|---|---|---|
| 3D Nation<br>ACT!<br>Adobe Photoshop<br>Adobe Premiere<br>After Effects<br>AfterImage<br>Apache<br>AppleShare | Add<br><br>Remove | LANtegrity |

[Add/Edit Software Product] [Add/Edit Manufacturer]

HARDWARE USED (AS SUBMITTED)
Compaq ProLiant 5000 servers
Quantum DLT 4000 tape drives

| HARDWARE | | HARDWARE (VISIBLE ON THE WEB) |
|---|---|---|
| ADIC Scalar 458 Library<br>ADIC Scalar DLT Libraries<br>AMD166 Processor<br>AMD486 Processor<br>AMDP - 100 Processor<br>ATL Library<br>Adaptec AAA133 RAID cont<br>Alpha | Add<br><br>Remove | Compaq Proliant 5000 server<br>Quantum DLT 7000 |

FIG. 9A

Alpha ▼

Add/Edit Hardware Product | Add/Edit Manufacturer

This area to allow insertion of filenames for images, audio and video (as appropriate)

Use this link to provide feedback to your Editor for this company's stories

FAQ

Copyright 1998. The Cybercasters (America) Corp. All rights reserved.

Save | Cancel | Save & Next | Save & Pending

FIG. 9B

5. Copy Editing (Editor Use Only)

Serial # 10253    Story Name: Greyhound
Client: Quantum

5.1 Editor's CopyEdit - Check everything and confirm that the story is ready to publish.
  1. ☑ Spellcheck everything
  2. ☑ Check for format errors, duplicate spaces, excess carriage returns, etc.

5.2 ☑ Editor - activate WebReady status
5.3 ☐ Editor - set Online Date
  [_____] Now or Offline (Server Time Zone DD Mmm YYYY)

5.4 Editor - set story as Featured Story if required
  From: [_____] (Server Time Zone DD MmmYYYY)
  To:   [_____] (Server Time Zone DD MmmYYYY)

[Save] [Cancel] [Save & Next] [Save & Pending]

---

This area to sub used to display all the fields that will be displayed over the Web to all one final copy edit of the web visible materials

COMPANY Greyhound Lines, Inc

PROJECT NAME Greyhound Network Backup

TITLE That's the Ticket!

DESCRIPTION Coast to coast, Greyhound riders know they can expect reliable, timely transportation. And Quantum DLTtape™ systems help keep the bus line On Line.

LEAD It happens thousands of times a day -- all over the US. A traveler steps up to a Greyhound ticket counter and within a few seconds is all ready for a trip -- across the state or across country. Behind that efficient service is an array of efficient computer systems. And behind those computer systems, you'll find Quantum.

BODY Greyhound Lines depends on an elaborate network of computers to keep the buses rolling on time. Ticket counters are linked into a system-wide passenger reservation system making possible fast, efficient service for even the most complicated route. From timetables to transfers, the Greyhound system keeps you moving and gets you where you need to be -- without hassle.

Greyhound's office functions are just as efficient. The company headquarters complex in Dallas is linked by and effective Corporate Communications Network. And Dallas, in turn is connected to numerous other offices across North America through a Wide Area Network.

But what happens if there's a system crash? Does everything grind to a halt?

Not a chance. Greyhound's computer operations are backed up by a reliable Quantum DLTtape™ system.

Bill Cattell, Greyhound's network administrator, was

QUOTES "The special problems we face in backup are based on the fact that we have so many servers to back up and such a

---

Editor:

Initial OK:
☑ Requested (1.3)
☑ Authorized (1.4)

Copy Edit:
☑ Requested (4.6)
☑ Spell Checked (5.1.1)
☑ Format Checked (5.1.2)

WebReady
☑ Authorized (5.2)
☐ Spiked (1.5)

Writer:

Data Complete:

Releases:
☑ Verbal (2.1.3)
☑ Emailed (2.3)
☑ Fax (3.1)
☑ Original (4.1)

☑ Story data (2.1.4)
☑ Quotes (2.1.5)
☑ Web Cont. (2.1.6)
☑ Pix (4.2.1)
☑ Audio (4.2.2)

Implemented:
☑ Data Verified (4.3)
☑ Headline (3.2.1)
☑ Capsule (3.2.2)
☑ Lead (3.3.4)
☑ Body (3.2.4)
☑ Quotes (3.3)
☑ Categorized (3.5)
☑ Web Info (4.3)
☑ Pix in DB (4.5.1)
☑ Audio in DB (4.5.2)

FIG. 10A fact that we have so many servers to back up and such a small window of time to get the work done. We don't rim any backups during the day -- they have to be run between 10pm and 2 a m the next day. We run incremental backups every night and full backups over the weekend. Each server has about 40 gigabytes of storage, so we have a heavy backup workload.

"That was one of the problems with the 4 m m approach -- there was just too much hands-on required. We were pushing the 4 m m technology too hard and it couldn't take it."

HARDWARE AND OS SOFTWARE USED

HARDWARE

```
ADIC Scalar 458 Library
ADIC Scalar DLT Libraries
AMD166 Processor
AMD486 Processor
AMDP - 100 Processor
ATL Library
Adaptec AAA133 RAID con
Alpha
```

Add

Remove

SELECTED HARDWARE

```
Compaq Proliant 5000 server
Quantum DLT 7000
```

SOFTWARE USED

SOFTWARE

```
3DNation
ACT!
Adobe Photoshop
Adobe Premiere
After Effects
AfterImage
Apache
AppleShare
```

Add

Remove

SOFTWARE (VISIBLE ON THE WEB)

```
LANtegrity
```

FIG. 10B

Contact Information

| | |
|---|---|
| CONTACT PERSON | Bill |
| | Cattell |
| TITLE OF CONTACT PERSON | Lead Network Analyst |
| CONTACT COMPANY NAME | Greyhound Lines |
| CONTACT COMPANY COUNTRY | USA |
| WEBSITE | http://www.greyhound |
| CONTACT TEL. | |
| CONTACT E-MAIL | |
| CONTACT FAX | |
| POSTAL ADDRESS | P.O. Box 6660362 |
| CONTACT CITY | Dallas |
| CONTACT STATE | TX |
| CONTACT ZIP | 75266 |
| CONTACT COUNTRY | USA |

Project Description

| | |
|---|---|
| COMPANY NAME | Greyhound Lines, Inc |
| PROJECT AUTHOR | Bill Cattell |
| PROJECT NAME | |
| COMPANY SIZE | 5000+ |
| STATE | TX (Texas) |
| COUNTRY | USA |

CATEGORY

| MARKET | | SELECTED MARKET |
|---|---|---|
| Quantum Market | Add | Quantum Market |
| | Remove | |

KEYWORDS

FIG. 10C

Search Page

1. Fill in the form below to search for stories that fulfill the criteria that you want to find. Wildcard searches can be done using a "*" sign to indicate that any character/s will satisfy the search criteria.

[SEARCH]

| FIELD TO SEARCH ON: | CRITERIA TO SEARCH ON: | |
|---|---|---|
| STORY AS WEBREADY: | | ☐ Yes |
| SERIAL NO.: | is | |
| STORYNAME: | is ▼ | |
| PROJECTNAME: | is ▼ | |
| CLIENT: | is | ▼ |
| COMPANY: | is | |
| STATE: | is | ▼ |
| COUNTRY: | is | ▼ |
| TICKLERDATE: | is ▼ | (DD Mmm YYYY) |
| ONLINEDATE: | is ▼ | (DD Mmm YYYY) |
| COOL STORY DATE: | is ▼ | (DD Mmm YYYY) |
| INCLUDE GRAVEYARD STORIES: | ☐ Yes | |

| MARKET | SEARCH FOR MARKET |
|---|---|
| Quantum Market<br>Small Business<br>Enterprise<br>K-12<br>New Media & Entertainment<br>Publishing<br>Scientific & Engineering<br>Health Care | Add<br><br>Remove |

FIG. 11A

TICKET USAGE IN CYBERSUBMIT 290

CYBERSUBMIT APPLICATION

292 — INTERVIEWEE CLICKS ON URL IN EMAIL AND COMES TO THE CYBERSUBMIT APPLICATION

294 — CYBERSUBMIT APPLICATION READS THE EMBEDDED TICKET FROM THE URL AND LOCATES THE TICKET IN THE DATABASE. ONCE THE TICKET HAS BEEN LOADED, THE CORRECT INTERVIEW FORM CAN BE DISPLAYED

296 — ONCE THE INTERVIEWEE HAS COMPLETED THE INTERVIEW THE CYBERSUBMIT APPLICATION INVALIDATES THE TICKET BY REMOVING IT FROM THE DATABASE

FIG. 16

TICKET GENERATION IN CYBERWRITER 300

CYBERwriter APPLICATION

302 — INTERNAL CYBERWRITER USER (ICWU) GENERATES A TICKET BY SELECTING AN EXPRING DATE

304 — SYSTEM GENERATES A UNIQUE TICKET AND RETURNS A SPECIAL URL WITH A TICKET EMBEDDED WITHIN TO THE GENERATING ICWU ON THE WEBPAGE

306 — THE ICWU SENDS THE SPECIAL URL TO THE INTERVIEWEE VIA EMAIL

LEAD CREATION WIZARD

GOOGLE.CORPORATE

ALLAN DAVIDSON
USER

FEATUREE

FIRSTNAME      LASTNAME

* COMPANY

PHONE          EMAIL

WEB SITE

QUESTIONS

* WHY IS THIS A GOOD STORY? HOW DOES IT ILLUSTRATE SUCCESS OF A PRODUCT? WHAT ARE THE BENEFITS TO THE CLIENT COMPANY?

ARE THERE ANY SPECIAL ISSUES WE SHOULD RAISE IN THE INTERVIEW?

> SAVE  312

INTERNET ZONE

310

Back Forward Stop Refresh Home AutoFill Print Mail
Address http://bluejay.cybercasters.com/cgi-bin/WebObjects/CyberWriterTest.woa/6/wo/Rj2NfmJeALHH3VBYRlNM8F5p37A/3.11.0

LEAD CREATION WIZARD

LEAD CREATION WIZARD     GOOGLE.CORPORATE

ALLAN DAVIDSON
USER

FEATUREE

| LITTLE RED | | RIDING HOOD |
| FIRSTNAME | | LASTNAME |

| www.grandmashouse.com |
| ✽ COMPANY |

| 1-212-123-1234 | | lrrh@grandmashouse.com |
| PHONE | | EMAIL |

| www.grandmashouse.com |
| WEB SITE |

QUESTIONS

✽ WHY IS THIS A GOOD STORY? HOW DOES IT ILLUSTRATE SUCCESS OF A PRODUCT? WHAT ARE THE BENEFITS TO THE CLIENT COMPANY?

THIS IS A GREAT STORY BECAUSE IT'S GOT A HAPPY ENDING.

ARE THERE ANY SPECIAL ISSUES WE SHOULD RAISE IN THE INTERVIEW?
WHY WAS LITTLE RED RIDING HOOD THERE IN THE FIRST PLACE?

◯ INTERNET ZONE

[ > SAVE ]  312

FIG. 18B

LEAD CREATION WIZARD

LEAD CREATION WIZARD — GOOGLE CORPORATE

LEAD SUCCESSFULLY CREATED AND SAVED WITH SERIAL NUMBER 20693 — 314

ALLAN DAVIDSON
USER

FEATUREE

LITTLE RED
FIRSTNAME

RIDING HOOD
LASTNAME www.grandmashouse.com
* COMPANY 1-212-123-1234
PHONE irrh@grandmashouse.com
EMIAL www.grandmashouse.com
WEB SITE

QUESTIONS

* WHY IS THIS A GOOD STORY? HOW DOES IT ILLUSTRATE SUCCESS OF A PRODUCT? WHAT ARE THE BENEFITS TO THE CLIENT COMPANY?

THIS IS A GREAT STORY BECAUSE IT'S GOT A HAPPY ENDING.

ARE THERE ANY SPECIAL ISSUES WE SHOULD RAISE IN THE INTERVIEW?
WHY WAS LITTLE RED RIDING HOOD THERE IN THE FIRST PLACE?

> SAVE — 312

○ INTERNET ZONE

CyberWriter - Cockpit successes.com

| ADMIN | GO |

- ☐ 0 NEEDS ATTENTION
- ☐ 11 ON HOLD
- ☑ 21 LEADS
- ☐ 10 RATED LEADS
- ☐ 6 INTERVIEWS
- ☐ 27 STORIES
- ☐ 0 COPY EDIT
- ☐ 2 APPROVAL
- ☐ 188 PUBLISHED
- ☐ 0 REFRESH
- ☐ 93 GRAVEYARD
- ☐ 3 MORGUE

LOAD NOW

322

QUICK WORKTHREAD(S)

| LOAD NOW | (COMMA DELIMITED)

> NEW LEAD  338
> RESET DISPLAY
> NEW LEAD (TMP)

LEADS
21 WORKTHREAD(S)

340

| AT | CLIENT ⇕ | DIV ⇕ | NUMB | FEATURE | SUBMITTER | EDITOR ⇕ |
|---|---|---|---|---|---|---|
| 342 01-1-1-1 | GOOG | CORP | 20693 | WWW.GRANDMASHOUSE.COM | ALLAN DAVIDSON | OWNER: JAN |
| 21-1-1-1 | HAND | CORP | 20691 | BALLARD HIGH SCHOOL | LIZ MCLEOD | LEAD: JAN OWNER: JAN |
| 30-1-1-1 | SBYN | CORP | 20659 | MARTINS | MARTIN GROVE | LEAD: JAN OWNER: JAN |
| 40-1-1-1 | SBYN | CORP | 15309 | MEMORIAL SLOAN-KETTER... | | OWNER: JAN INTERVIEW - REQUIRED INFO - PUBLISH DATA - PUBLISH - |
| 113-1-1-1 | SBYN | CORP | 15270 | UBS AG | | OWNER: JAN INTERVIEW - REQUIRED INFO - MEDIUM STORY - PUBLISH DATA - PUBLISH - |
| 114-1-1-1 | SBYN | CORP | 15269 | WESTLB | | OWNER: JAN INTERVIEW - REQUIRED INFO - MEDIUM STORY - PUBLISH DATA - PUBLISH - |
| 114-1-1-1 | SBYN | CORP | 15268 | TELSTRA | | OWNER: JAN INTERVIEW - REQUIRED DATA - PUBLISH - |
| 114-1-1-1 | SBYN | CORP | 15267 | RAYTHEON COMPANY | | OWNER: JAN INTERVIEW - CAPSULE - PUBLISH DATA - PUBLISH - |
| 114-1-1-1 | SBYN | CORP | 15266 | PETSMART | | OWNER: JAN INTERVIEW - REQUIRED DATA - MEDIUM STORY - PUBLISH DATA - PUBLISH - |

326 328 330 331 332 334 336

320 324

FIG. 19C successes.com

ADMIN ▼ [GO]

- LEAD
- INTERVIEW PREP
- INTERVIEW REVIEW
- ☒ STORY LOG
- ☒ MONOLITHIC
- ☒ FULL STORY DATA
- ☒ CREATE NEW LEAD
- ☒ STYLE GUIDE
- ☒ WORKING CONTENT
- TO DO

> REBUILD MENU

Successes.com - Work Area

??? ON GO ??? WAIT | ACTION
RATED LEAD 10 MAR 01 | INTERVIEW 10 MAR 01 | CENTER

RESOURCES | BUG REPORT

LEAD
www.grandmashouse.com                              GOOGLE.CORPORATE
                                                          20693

⟳ REFRESH          FROM: ALLAN DAVIDSON.
🔓 UNLOCKED69      LITTLE RED          RIDING HOOD
> DELETE           FIRST NAME          LAST NAME
> GRAVEYARD        www.grandmashouse.com
                   COMPANY
                   lrrh@grandmashouse.com   www.grandmashouse.com
                   EMAIL                    URL
                   1-212-123-1234
                   WORK PHONE RATING             QUESTIONS
○ EXCELLENT        ARE THERE ANY SPECIAL ISSUES WE SHOULD RAISE IN THE INTERVIEW?
○ FAIR             WHY WAS LITTLE RED RIDING HOOD THERE IN THE FIRST PLACE?
⦿ GOOD             WHY IS THIS A GOOD STORY? HOW DOES IT ILLUSTRATE SUCCESS FOR A
○ NO USE           PRODUCT? WHAT ARE THE BENEFITS TO THE CLIENT COMPANY?
○ POOR             THIS IS A GREAT STORY BECAUSE IT'S GOT A HAPPY ENDING.
> SUBMIT

346

VIEW NOTES    ADD NOTE
FILTER BY: (NO FILTER ▼)

NO CLIENTS COMMENTS
STORY NAME:
[www.grandmashouse.com]          — 350
CREATE TASKS:
INTERVIEW PREP       JAN ZIFF    — 352
INTERVIEW REVIEW     JAN ZIFF
EDITOR COMMENTS:
THIS IS A GREAT STORY AND WE SHOULD  — 354
PURSUE IT.

Favorites    History    Search    Scrapbook    Page Holder

356

FIG. 20A successes.com - Work Area successes.com

ADMIN ▼ [GO]

LEAD
INTERVIEW PREP
INTERVIEW REVIEW
▣ STORY LOG
▣ MONOLITHIC
▣ FULL STORY DATA
▣ CREATE NEW LEAD
▣ STYLE GUIDE
▣ WORKING CONTENT
TO DO

> REBUILD MENU

??? | ON GO | ??? | WAIT | ACTION
RATED LEAD 10 MAR 01 | 10 MAR 01 | INTERVIEW | 10 MAR 01 | CENTER

RESOURCES | BUG REPORT

INTERVIEW PREP     GOOGLE.CORPORATE
www.grandmashouse.com     20693

🔄 REFRESH
🔒 UNLOCKED684
> DELETE
> GRAVEYARD

SUBMITTED DATA
WWW.GRANDMASHOUSE.COM
COMPANY
LITTLE RED
FIRST NAME
RIDING HOOD
LAST NAME
NO DATA
STREET ADDRESS
NO DATA
CITY
NO DATA
STATE/PROVINCE
NO DATA
ZIP
NO DATA
COUNTRY
www.grandmashouse.com
URL
lrrh@grandmashouse.com
EMAIL
1-212-123-1234
WORK PHONE

VERIFIED DATA
[ ] COMPANY
[ ] FIRST NAME
[ ] LAST NAME
[ ] STREET ADDRESS
[ ] CITY
[ ] STATE/PROVINCE
[ ] ZIP
[ ] COUNTRY
[ ] URL
[ ] EMAIL
[ ] WORK PHONE

> COPY   > CANCEL   > SAVE

VIEW NOTES   ADD NOTE
FILTER BY: [NO FILTER ▼]

TICKET GENERATION
EXPIRY DATE: [MAR▼] [24▼] [2001▼]
> GENERATE 360
362
364

Favorites   History   Search   Scrapbook   Page Holder

SHARE YOUR GOOGLE SUCCESS STORY
Back Forward Stop Refresh Home AutoFill Print Mail
Address http://www2.success.com/cgi-bin/WebObjects/CyberSubmitTest.woa/wa/startSubmit?tid=nVEo614: >go
@Q1 @Q2 @Q3 Page Title @http://www.macnn.com/ @http://www.macintouch.com/ >>

Google   More Google:  Success Stories

Home
All About Google   Success Stories
                   How has Google contributed to your success?

*Find on this site:* We're looking for companies and individuals who have a
                    Google success story to tell.
[SEARCH]

WWW.GRANDMASHOUSE.COM
COMPANY
LITTLE RED
FIRST NAME
RIDING HOOD
LAST NAME
123 HIGH ST
STREET ADDRESS
OLD TOWN
CITY
VA
STATE/PROVINCE
22222
ZIP
USA
COUNTRY
www.grandmashouse.com
URL
lrrh@grandmashouse.com
EMAIL
1-212-123-1234
WORK PHONE

> COPY  > CANCEL  > SAVE

VIEW NOTES   ADD NOTE
FILTER BY: [NO FILTER ◆]

NO DATA
ZIP
NO DATA
COUNTRY
www.grandmashouse.com
URL
lrrh@grandmashouse.com
EMAIL
1-212-123-1234
WORK PHONE > TEST TICKET   TICKET GENERATION
                GENERATED:    2001/03/10
                EXPIRY DATE:  [MAR ◆] [24 ◆] [2001 ◆]

> RESET

SHARE YOUR GOOGLE SUCCESS STORY

Back Forward Stop Refresh Home  AutoFill Print Mail

Address  http://www2.success.com/cgi-bin/WebObjects/CyberSubmitTest.woa/wa/startSubmit?tid=nVEo614xbDxYbTBGOxkyrsdxmLRY8GNdXrUPRS5oZ1ywe1IF41  >go @ Q1  @ Q2  @ Q3  Page Title  @ http://www.macnn.com/  @ http://www.macintouch.com/  @ http://www.versiontracker.com/ ⇐ Microsoft Web Sites  >>

Google  [ More Google: Success Stories ]

Home
All About Google

Success Stories
How has Google contributed to your success?

Find on this site:

We're looking for companies and individuals with a
Google success story to tell.

[SEARCH]

How can we contact you?

| LITTLE RED | RIDING HOOD |
| FIRST NAME | LAST NAME |

| TITLE | WWW.GRANDMASHOUSE.COM |
| | COMPANY |

| lrrh@grandmashouse.com | www.grandmashouse.com |
| EMAIL ADDRESS | WEB ADDRESS |

| 1-212-123-1234 | FAX |
| PHONE NUMBER | |

| 123 HIGH ST. | |
| STREET ADDRESS (200 CHARS MAX) | |

| OLD TOWN | VA |
| CITY | STATE/PROVINCE |

| 22222 | USA |
| ZIP | COUNTRY |

[ NOW TELL US YOUR STORY ]

382

Favorites    History    Search    Scrapbook    Page Holder

FIG. 21C

SHARE YOUR GOOGLE SUCCESS STORY — 384

What's the primary market your company serves?
ENTERTAINMENT

How big is your company?
1-9

Tell us about your site

WHAT ARE THE BEST URLS TO VISIT? HOW DO VISITORS USE YOUR SITE/S? WHAT ARE YOUR FUTURE PLANS FOR THE SITE/S?

www.grandmashouse.com

HOW OFTEN DO YOU REFRESH YOUR CONTENT? (DAILY, WEEKLY, ETC.) HOW BIG IS THE SITE; HOW MANY PEOPLE VISIT IN AN AVERAGE WEEK? DO YOU PROFILE YOUR VISITORS?

Every time someone comes to the site the story is told a little bit differently. The site is many pages long and 10s of thousands come every week in all languages. We don't need to profile our visitors because they are mainly small kids.

386

[BACK TO PREVIOUS PAGE] [TELL US ABOUT YOUR RELATIONSHIP WITH GOOGLE] — 388

FIG. 21G

SHARE YOUR GOOGLE SUCCESS STORY

Back Forward Stop Refresh Home AutoFill Print Mail
Address http://www2.success.com/cgi-bin/WebObjects/CyberSubmitTest.woa/7/wa/DirectAction

In what media would you like to see this story appear?
Please include names and contact information if possible.

FAMILY PC

Can we write a capsule summary based on the information you've provided?

We plan to feature capsule success stories of under 100 words on our website -- to be immediately considered as a capsule story candidate, we need your permission to write a capsule based on your responses to this interview and post it when ready. Please mark the appropriate box.

⊙ Yes  ○ No

390

Thank you for taking the time to complete this interview.

Please click the submit button below. You will immediately see a copy of all the information you have provided. Please feel free to print it for your records! If you have any questions or need to make any changes, please email us:
googlesuccessteam@successes.com

[ BACK TO PREVIOUS PAGE ]  [ SUBMIT SUCCESS STORY ]

Favorites    History    Search    Scrapbook    Page Holder

○ LINK: MAILTO:GOOGLESUCCESSTEAM@SUCCESSES.COM

FIG. 22B

SHARE YOUR GOOGLE SUCCESS STORY

Back Forward Stop Refresh Home AutoFill Print Mail

Address http://www2.success.com/cgi-bin/WebObjects/CyberSubmitTest.woa/7/wa/DirectAction @ Q1 @ Q2 @ Q3 Page Title @ http://www.macnn.com/ @ http://www.macintouch.com/ @ http://www.versiontracker.com/⇔ Microsoft Web Sites Q: What's the primary market your company serves?
A: Entertainment
Q: How big is your company?
A: 1 - 9

Tell us about your site:
Q: What are the best urls to visit?  How do visitors use your site/s?
What are your future plans for the site/s?
A: www.grandmashouse.com
Q: How often do you refresh your content? (Daily, weekly, etc.?) How big is the site; how many people visit in an average week? Do you profile your visitors?
A: Every time someone comes to the site the story is told a little bit differently.  The site is many pages long and 10s of thousands come every week in all languages.  We don't need to profile our visitors because they are mainly small kids.

Your relationship with Google:
Q: How long have you been using Google on your site?
A: 3 years
Q: The Challenge -- What was the problem you needed to solve?  Did Google help you compete more effectively, and if so, how?
A: To keep the site up and have kids find the stories.
Q: The Solution -- What was your solution and how did it meet the challenge? What other solutions did you consider and why did you choose Google?
A: Google helped us meet the challenge because kids can always find Little Red Riding Hood through Google.

Favorites    History    Search    Scrapbook    Page Holder

INTERNET ZONE

FIG. 22C

SHARE YOUR GOOGLE SUCCESS STORY

Back Forward Stop Refresh Home AutoFill Print Mail

Address http://www2.success.com/cgi-bin/WebObjects/CyberSubmitTest.woa/7/wa/DirectAction @Q1 @Q2 @Q3 Page Title @http://www.macnn.com/ @http://www.macintouch.com/ @http://www.versiontracker.com/ @ Microsoft Web Sites Q: Which Google services are you using? (WebSearch? SiteSearch? SafeSearch? Web Directory, Restricts, etc.) Do you plan to add more in the future? How do you use Google reporting services?

A: We're using Web Search and Safe Search.

Q: The Benefits -- what benefits has Google brought to your business? (Faster implementation? cost savings? Productivity, etc.) Did you save other resources? Have your customers, partners, and suppliers also benefitted, and if so, how? Do you see your relationship with Google growing?

A: Faster searches and happy kids.

Other Contact Information:
Big Bad Wolf

Additional information:

Q: In what media would you like to see this story appear? Please include names and contact information if possible.

A: Family PC

Q: Can we write a capsule summary based on the information you've provided?

A: Yes

Thank you for telling us your story. If there is anything you would like to add or change, please email us at googlesuccessteam@successes.com Favorites    History    Search    Scrapbook    Page Holder

INTERNET ZONE

FIG. 23A

410 successes.com — Work Area

| ??? | ON GO | ??? | WAIT | ACTION |
| RATED LEAD 10 MAR 01 | INTERVIEW | 10 MAR 01 | CENTER | successes.com
ADMIN ▾ GO

- LEAD
- INTERVIEW PREP
- INTERVIEW REVIEW
- ▣ STORY LOG
- ▣ MONOLITHIC
- ▣ FULL STORY DATA
- ▣ CREATE NEW LEAD
- ▣ STYLE GUIDE
- ▣ WORKING CONTENT
- TO DO

> REBUILD MENU

RESOURCES | BUG REPORT

INTERVIEW REVIEW
www.grandmashouse.com                        GOOGLE.CORPORATE                 20693

▣ REFRESH
🔒 UNLOCKED684

> DELETE
> GRAVEYARD

RATING
○ EXCELLENT
○ FAIR
● GOOD
○ NO USE
○ POOR

> SUBMIT

FEATURED CLIENT CONTACT DATA

LITTLE RED                    RIDING HOOD
FIRST NAME                    LAST NAME
WWW.GRANDMASHOUSE.COM         NO DATA              NO DATA
COMPANY                       TITLE                DEPARTMENT
OLD TOWN                      VA                   22222
CITY                          STATE/PROVINCE       ZIP
USA                           www.grandmashouse.com
COUNTRY                       URL
irrh@grandmashouse.com        NO DATA
EMAIL ADDRESS                 FAX
1-212-123-1234
WORK PHONE

QUESTIONS
ADDITIONAL CONTACT INFORMATION
BIG BAD WOLF
CAN WRITE CAPSULE
YES
HOW LONG HAVE YOU BEEN USING GOOGLE
3 YEARS
HOW OFTEN DO YOU REFRESH YOUR CONTENT
EVERY TIME SOMEONE COMES TO THE SITE THE STORY IS TOLD A LITTLE BIT
DIFFERENTLY. THE SITE IS MANY PAGES LONG AND 10S OF THOUSANDS COME EVERY
WEEK IN ALL LANGUAGES. WE DON'T NEED TO PROFILE OUR VISITORS BECAUSE THEY
ARE MAINLY SMALL KIDS.
MEDIA 2OR STORY TO APPEAR IN
FAMILY PC
NUMBER OF EMPLOYEES
1-9
PRIMARY MARKET SERVED
ENTERTAINMENT
THE BENEFITS
FASTER SEARCHES AND HAPPY KIDS.
THE CHALLENGE
TO KEEP OUR SITE UP AND HAVE KIDS FIND THE STORIES.
THE SOLUTION
GOOGLE HELPED US MEET THE CHALLENGE BECAUSE KIDS CAN ALWAYS FIND LITTLE
RED RIDING HOOD THROUGH GOOGLE.
WHAT ARE THE BEST URLS TO VISIT
WWW.GRANDMASHOUSE.COM

412

VIEW NOTES    ADD NOTE ◆
FILTER BY:    NO FILTER ◆

Favorites    History    Search    Scrapbook    Page Holder

Successes.com - Work Area

THE CHALLENGE
TO KEEP OUR SITE UP AND HAVE KIDS FIND THE STORIES.
THE SOLUTION
GOOGLE HELPED US MEET THE CHALLENGE BECAUSE KIDS CAN ALWAYS FIND LITTLE RED RIDING HOOD THROUGH GOOGLE.
WHAT ARE THE BEST URLS TO VISIT
WWW.GRANDMASHOUSE.COM
WHAT DOES YOUR COMPANY DO
WE MAKE FOOD AND BRING IT TO GRANDMA'S HOUSE.
WHICH GOOGLE SERVICES ARE YOU USING
WE'RE USING WEB SEARCH AND SAFE SEARCH.
WHO ARE OUR COMPETITORS
DON'T HAVE ANY AS YET. GRANDMA LIKES MY FOOD.

NO CLIENT COMMENTS

STORY NAME
WWW.GRANDMASHOUSE.COM

ASSIGN STORY:
CAPSULE              ASSIGN STORY TO ▾
CAPSULE-QUOTE        ASSIGN STORY TO ▾
MEDIUM STORY         ASSIGN STORY TO ▾
STORY 400            ASSIGN STORY TO ▾
STORY 800            ASSIGN STORY TO ▾

CREATE TASKS:
VERIFY PUB. CONTACT  ASSIGN TO ▾
CLASSIFY             ASSIGN TO ▾
PUBLISH              ASSIGN TO ▾

EDITOR COMMENTS:
THIS IS A GREAT STORY AND WE SHOULD PURSUE IT.

> SAVE

414

Favorites    History    Search    Scrapbook    Page Holder

FIG. 23C

FIG. 24D successes.com - Work Area successes.com

ADMIN ▼ [GO]

STORY 400 STORY | ON GO 10 MAR 01 | ACTION CENTER

RESOURCES | BUG REPORT

LEAD
INTERVIEW PREP
INTERVIEW REVIEW
▶ STORY 400
   APPROVAL
   PUBLIC CONTACT
   CLASSIFY
   PUBLISH
▣ STORY LOG
▣ MONOLITHIC
▣ FULL STORY DATA
▣ CREATE NEW LEAD
▣ STYLE GUIDE
▣ WORKING CONTENT
TO DO
   STORY 400
   ☐ RESEARCH  ?
   ☐ GET IMAGES  ?
   ☐ LEGAL APPROVAL  ?
   ☐ SPELLCHECK  ?
   [>SET]

> REBUILD MENU

STORY 400
www.grandmashouse.com                    GOOGLE.CORPORATE
                                                    20693
⟳ REFRESH   *UNPUBLISHED*
🔒 UNLOCKED328   [NORMALIZE]
> DELETE
> GRAVEYARD

HEADLINE
RED RIDING HOOD FOUND BY GOOGLE

COMPARE [2001/3/10 17:4 ▼] [GO] >CURRENT

BRIEF DESCRIPTION
KIDS WORLD OVER CAN FIND LITTLE RED RIDING
HOOD BY SEARCHING WITH GOOGLE.

COMPARE [2001/3/10 17:4 ▼] [GO] >CURRENT

BODY
ONCE UPON A TIME, IN A FAR OFF LAND, THERE
LIVED A LITTLE GIRL WHO ALWAYS WORE A RED
CAPE. AND SHE WAS KNOWN FAR AND WIDE AS
LITTLE RED RIDING HOOD. OR LITTLE RED HOODING
RIDE BY THOSE WHO ARE DYSLEXIC.

ETCTETCTETCTETCT

VIEW NOTES    ADD NOTE
FILTER BY: [NO FILTER ▼]

◇ △ ✕ ⟲  Favorites    History    Search    Scrapbook    Page Holder

WORKTHREAD EVENT VIEWER

Back Forward Stop Refresh Home  AutoFill Print Mail
Address: http://bluejay.cybercasters.com/cgi-bin/WebObjects/CyberWriterTest.woa/6/wo/Rj2NfmJeALHH3VBYRINM8F5p37A/26.4.24.1.2.0 >go

EVENTS                                                                      20693

| USER | DATE | CONTENT | TYPE |
|------|------|---------|------|
|  | MAR 10, 2001 17:05 | UPDATED CURSOR NAME: STORY STATE:PROGRESS ASSOCIATED TYPE: STORY 400 USER: JAN ZIFF | SYSTEM |
|  | MAR 10, 2001 17:04 | UPDATED CURSOR NAME: STORY STATE: PROGRESS ASSOCIATED TYPE: STORY 400 USER: JAN ZIFF | SYSTEM |
| ALLAN D | MAR 10, 2001 16:56 | CREATED WORKFLOW FOR THE FOLLOWING TASKS: VERIFY PUBL. CONTACT CLASSIFY PUBLISH | INTERNAL USER |
| ALLAN D | MAR 10, 2001 16:56 | ASSIGNED TASK: PUBLISH TO JAN ZIFF | INTERNAL USER |
| ALLAN D | MAR 10, 2001 16:56 | ASSIGNED TASK: CLASSIFY TO JAN ZIFF | INTERNAL USER |
| ALLAN D | MAR 10, 2001 16:56 | ASSIGNED TASK: PUBLIC CONTACT TO JAN ZIFF | INTERNAL USER |
| ALLAN D | MAR 10, 2001 16:56 | CREATED STORY OBJECT AND WORKFLOW FOR THE FOLLOWING STORY TYPES: STORY 400 | INTERNAL USER |
|  | MAR 10, 2001 16:56 | REMOVED CURSOR NAME: RATED LEAD STATE: PROGRESS ASSOCIATED TYPE: NONE SPECIFIED USER: JAN ZIFF | SYSTEM |
|  | MAR 10, 2001 16:56 | REMOVED CURSOR NAME: INTERVIEW STATE: WAITING ASSOCIATED TYPE: NONE SPECIFIED USER: JAN ZIFF | SYSTEM |
|  | MAR 10, 2001 16:56 | ADDED CURSOR NAME: STORY STATE: WAITING ASSOCIATED TYPE: STORY 400 USER: JAN ZIFF | SYSTEM |
|  | MAR 10, 2001 16:56 | REMOVED CURSOR NAME: RATED LEAD STATE: PROGRESS ASSOCIATED TYPE: NONE SPECIFIED USER: JAN ZIFF | SYSTEM |
|  | MAR 10, 2001 16:56 | REMOVED CURSOR NAME: INTERVIEW STATE: WAITING ASSOCIATED TYPE: NONE SPECIFIED USER: JAN ZIFF | SYSTEM |
| ALLAN D | MAR 10, 2001 16:20 | CREATED WORKFLOW FOR THE FOLLOWING TASKS: INTERVIEW PREP INTERVIEW REVIEW | INTERNAL USER |
| ALLAN D | MAR 10, 2001 16:20 | ASSIGNED TASK: INTERVIEW REVIEW TO JAN ZIFF | INTERNAL USER |
| ALLAN D | MAR 10, 2001 16:20 | ASSIGNED TASK: INTERVIEW PREP TO JAN ZIFF | INTERNAL USER |
|  | MAR 10, 2001 16:20 | ADDED CURSOR NAME: INTERVIEW STATE: WAITING ASSOCIATED TYPE: NONE SPECIFIED USER: JAN ZIFF | SYSTEM |
|  | MAR 10, 2001 16:17 | REMOVED CURSOR NAME: LEAD STATE: WAITING ASSOCIATED TYPE: NONE SPECIFIED USER: JAN ZIFF | SYSTEM |
|  | MAR 10, 2001 16:17 | ADD CURSOR NAME: RATED LEAD STATE: PROGRESS ASSOCIATED TYPE: NONE SPECIFIED USER: JAN ZIFF | SYSTEM |

○ INTERNET ZONE

FIG. 26

FIG. 28B successes.com

LEADS TO RATE
CREATE NEW LEAD
LOG OFF

EXTERNAL USER AREA

Create a Lead

CORPORATE
Mar 16, 2001

FIRST NAME   LAST NAME

COMPANY NAME   URL

TELEPHONE   EMAIL ADDRESS

WHY IS THIS A GOOD STORY? HOW DOES IT ILLUSTRATE SUCCESS FOR YOU/YOUR PRODUCT? WHAT ARE THE BENEFITS TO YOUR COMPANY?

ARE THERE ANY SPECIAL ISSUES WE SHOULD RAISE IN THE INTERVIEW?

> SUBMIT

Favorites    History    Search    Scrapbook    Page Holder

○ INTERNET ZONE

FIG. 28C successes.com

LEADS TO RATE

CREATE NEW LEAD

LOG OFF

Create a Lead

CORPORATE
Mar 23, 2001

FIRST NAME   LAST NAME
FED           FLINTSTONE

COMPANY NAME   URL
BEDROCK PLC    WWW.BEDROCKPL

TELEPHONE      EMAIL ADDRESS
800-BEDROCK    DROCKPLC.COM

WHY IS THIS A GOOD STORY? HOW DOES IT
ILLUSTRATE SUCCESS FOR YOU/YOUR PRODUCT?
WHAT ARE THE BENEFITS TO YOUR COMPANY?
GREAT STORY -- LOTS OF ACTION.

FIG. 28E successes.com

EXTERNAL USER AREA

LEADS TO RATE
CREATE NEW LEAD
LOG OFF

Rate lead

TIM                                          CORPORATE
CORPORATE                                   Mar 23, 2001

BEDROCK PLC
FED FLINTSTONE
TEL:    800-BEDROCK
EMAIL:  FRED@BEDROCKPLC.COM
WEB:    WWW.BEDROCKPLC.COM

Q   WHY IS THIS A GOOD STORY? HOW DOES IT ILLUSTRATE SUCCESS FOR YOU/YOUR PRODUCT? WHAT ARE THE BENEFITS TO YOUR COMPANY?

A   GREAT STORY -- LOTS OF ACTION.

Q   ARE THERE ANY SPECIAL ISSUES WE SHOULD RAISE IN THE INTERVIEW?

A   TALK TO BARNEY AND WILMA. THEY'LL HAVE LOTS TO ADD.

COMMENTS OR ADDITIONAL POINTS TO RAISE

> PROCEED
> KILL

Favorites   History   Search   Scrapbook   Page Holder

INTERNET ZONE

FIG. 28G successes.com

EXTERNAL USER AREA

LEADS TO RATE
CREATE NEW LEAD
LOG OFF

Create a Lead
CORPORATE  Mar 23, 2001

FIRST NAME        LAST NAME
MIKE              SMITH

COMPANY NAME      URL
SMITH CO          WWW.SMITHCO

TELEPHONE         EMAIL ADDRESS
800-555-1212      SMITHCO.COM

WHY IS THIS A GOOD STORY? HOW DOES IT ILLUS-
TRATE SUCCESS FOR YOU/YOUR PRODUCT? WHAT
ARE THE BENEFITS TO YOUR COMPANY?
GOOD STORY

ARE THERE ANY SPECIAL ISSUES WE SHOULD RAISE
IN THE INTERVIEW?
EVEN BETTER STORY

> SUBMIT

Favorites   History   Search   Scrapbook   Page Holder

INTERNET ZONE

FIG. 28H successes.com

EXTERNAL USER AREA

LEADS TO RATE

CREATE NEW LEAD

LOG OFF

WELCOME TIM LOHSE               CORPORATE

Leads to rate   Mar 23, 2001

CORPORATE    BEDROCK PLC       2001/03/23
CLIENT       FED FLINTSTONE

CORPORATE    SMITH CO          2001/03/23
CLIENT       MIKE SMITH

Favorites   History   Search   Scrapbook   Page Holder

○ INTERNET ZONE

CONTENT DEVELOPMENT MANAGEMENT SYSTEM AND METHOD

RELATED APPLICATIONS

This application is a continuation in part and claims priority under 35 USC §120 of U.S. application Ser. No. 09/526,700 now U.S. Pat. No. 6,557,013, filed on Mar. 15, 2000 and entitled "Story Workflow Management System and Method" which is owned by the same assignee as the present invention.

FIELD OF THE INVENTION

This invention relates generally to a system and method for managing the development of various different types of content wherein the development of the content includes finding leads to content, developing the content and publishing the content in one or more different forms. In more detail, the content developed using the system may include written content, such as success stories, stories, articles, advertisements, auditory content, such as radio spots, radio advertisements, radio presentations, electronic downloaded auditory content, audiovisual content that combines audible content and written content as well as visual content including video. In the preferred embodiment described below, the content development system is described with an example of the workflow associated with a story and in particular to a system and method for managing the workflow associated with the preparation, editing and creation of a story, but the invention is not limited to a story workflow management system.

BACKGROUND OF THE INVENTION

In a typical environment in which content is being developed, there is a content development process with various steps which must be completed in order to generate the particular content. For example, there may be the step of developing the leads and information that will be needed to generate a new piece of content, such as when trying to write a news-story, the step of reviewing the lead to determine the quality of the lead, the step of assigning an approved lead to a particular content person to develop and edit the lead to generate the content, the step of following up with the content developer and editor to complete the draft and final version of the content within a particular period of time, the step of client and featuree approval of the content and the step of publishing the content. Thus, the content development process is typically very cumbersome and slow. Often, the steps are managed by a human being and each step must typically be performed in a sequential manner.

For example, in a typical environment in which a piece of content may be created, such as a newspaper, a television newscast or a cable service, the management of the workflow associated with the creation of a story is very difficult. In particular, the creation of a story may include receiving a submission for a new story, rating the story idea, checking the story's facts, writing the story and preparing the story for publishing. In the past, each step of the process was completed by one or more different people, but no one was easily able to monitor the entire story workflow process to make sure it was completed. Therefore, it is difficult to ensure that the entire process was completed correctly and that each step was in fact completed. It is also difficult for a person trying to manage the story workflow to ensure each step is being completed in a timely manner. It is also difficult to ensure that each story being generated is factually accurate. Finally, it is also difficult to implement a quality control process due to the large number of steps in the process, the large number of people involved in the process, the large number of variables that affect the process and the large number of sign-offs involved in the process.

For a company which generates success stories about its products, the story workflow management process is equally complex. In this process, it is necessary to screen incoming success story leads and interviews to remove the unwanted leads and interviews and determine if the story is worth pursing. Then, it is necessary to check the lead and interview's accuracy and, if they are found to be accurate, the writing of the success story must be assigned to a writer. The writer then has to check all the facts (i.e. find the person, get the story and quotes, conduct the interview, get the appropriate releases, get images and other media as required, have those media prepared for publication, etc.), write the story and get everybody to sign off on what's been done. Once the writer has completed the story, it must be edited and prepared for publication. In a typical success story creation process within a corporation, the leads for success stories are difficult to obtain. In particular, it is typically necessary to disturb the salespeople in order to generate any leads for success stories since the salespeople have the most contact with people who may have success stories with the products made by the corporation. Often, the person administering the success story creation process must provide the salespeople with an incentive, such as a cash bonus or some other material prize, in order to receive any success story leads or submissions. The management of the success story process is often done manually which is a daunting task since the process is extremely complex and has many imponderables. The manual management of the process leads to inconsistent quality stories, slower generation of stories and unpredictable results since the results depend on the particular person.

Some typical systems attempt to automate the process in some manner. However, these systems are typically disparate pieces of technology that have been put together in an attempt to automate the process. For example, a typical database may be combined with a interface which is not intended for that database. It is desirable to provide a content development and management system wherein the system is homogeneous in that each portion of the system is designed and intended to work together.

Corporations which have success story programs also find it immensely difficult to ensure that stories are currently maintained up to date and accurate (i.e., the featured party is still using the same products and the same people are still with the company, etc.). It is staggering to discover how many of the success stories that a company uses are actually obsolete. In addition, because the success story creation work is done in an artisanal manner right now, it's also difficult, time consuming (i.e. expensive) to get the story done in multiple media (print, web) in a useful time frame. It is also extremely difficult for companies to ensure that their people can quickly find a relevant success story when they need one. In addition, because the stories usually take months from inception to delivery of a usable story, their shelf life (before they become obsolete) is much shorter.

Many companies already have a success story program. In one type of success story program, one or more people in the organization are assigned to find and develop leads and turn them into stories. These people usually have one or more other assigned tasks which are their primary responsibility, and usually lack training in the skills required to do success stories. The results of this type of success story program is slow story turnaround, poor quality stories, few and often outdated stories, poor legal documentation and high hidden costs. For example, the stories are also generally handled at a divisional or department level and therefore never centralized in a useful manner so that duplication exists between the different departments, the quality of the stories may not be consistent between the departments and can be generally of lower quality and customers may become annoyed in that the same customer may be contacted by two different departments for the same story. In another success story program, the persons assigned to find and develop leads and turn them into stories bring in one or more outside contractors, such as individual freelancer writers, PR companies, or the like. Companies consistently find the turnaround slow, quality very variable and cost high because the process always tends to be that of a craftsman working on a very limited number of leads assigned by the project manager at the company. As a result, there is often very little filtering of mediocre leads and interviews since there are not enough story leads.

It is desirable, however, to provide a content development management system and method which automatically tracks each step of the content development process and documents the steps as the content is being generated regardless of who or how many people complete a particular task and therefore permits the story workflow to be more easily controlled. It is also desirable to provide a content development management system which permits the various process steps to be completed in a non-sequential manner in that the steps do not necessarily need to be completed in a sequential manner and the cost of implementation is lower and faster. It is also desirable to provide content outputs that are flexible and highly customizable, a search capability within the content system and a mechanism for updating and maintaining content. Thus, it is desirable to provide a content development management system which avoid the above problems with the typical content development processes and story creation processes and it is to this end that the present invention is directed.

SUMMARY OF THE INVENTION

The content development management system and method in accordance with the invention provides many features and advantages that provide for an efficient, automatic content development and management system. For example, the system may automatically manage the content development process. The system is very flexible and extensible and expandable. The system also provides billing and cost control mechanisms, quality control of the content since it can be checked at each portion of the development process. The system also provides lead management, production management and scheduling of the tasks associated with the content development process. The system also includes a review process during which the people involved with the content approve the content in an environment that encourages rapid approval of the content. The system may also include a search mechanism that permits a user to search the content generating and management process. The system may also include the ability to update and maintain content so that the system may, for example, automatically remind the editor that a story has been published for a predetermined period of time so that the editor can check the content and update it as needed.

The content development and management system provides core data storage. In more detail, the system tracks all of the data associated with the content within the system. Thus, all of the data associated with the content is never lost. In addition, the data for a particular piece of content is kept together. In a preferred embodiment, the system may be object based and may contain one or more modules that can be interchanged depending on the needs of the particular client of the system.

Thus, in accordance with the invention, a story workflow management system and method are provided in which each step of the story creation process from initial lead generation to final publication of the story is tracked so that the entire story creation process is more easily managed. The system integrates the various story creation processes into a single controlled process. The system permits the traditional story generation process to be automated and the speed of the story generation increased while the quality control for the stories is also increased. The integrated system provides various advantages to the story creation process including reduced costs to create a story, increased speed with which a story is prepared, and various features not typically available to a story writer and story editor. The system is also robust, compatible with other existing systems and networks and is very flexible.

In the success story embodiment or any other embodiment, the end users may submit story leads and interviews to the system about particular products and the system may provide a mechanism for processing the incoming lead and interviews information in an efficient manner. The system may store unformatted story contents so that the published story may be quickly published automatically by the system in a variety of different formats, such as XML, ASCII, a hardcopy of the story, a Postscript Display Format/Portable Document Format (PDF) file, any web format and the like and on a variety of different media, such as CD-ROM, DVD, FLASH memory and the like. The system may also permit story leads and interviews to be tracked so that a lead for a new story is not lost. The system also may be easily integrated into a corporate Intranet computer network and with other prior legacy databases. The system may also gather together the success stories spread throughout a corporation. The system may also provide tiered security access levels to the system that is individualized. The system may also track different versions of a story and provide redlining capabilities.

The system also allows for more time and space flexibility for everybody in the process since the story creation is not constrained by location or time (i.e., everybody can work on it from anywhere at any time). The system also reduces the dependency on any one individual because this is a formalized system and the steps are defined and documented so that less skilled people may accomplish the same tasks typically completed by a more skilled person. The system is also easy scaled in size to increase the number of stories being created, the number of people working on the stories and the number of people involved in the production of the stories. The system also accumulates a central knowledge base for continually improving the story creation process based on ongoing experiences. In addition, since the system may track visitors through the integrated web system, the system may track the visitor's interests and preferences and provide feedback to our customers which allows them to tune their marketing and products. The system permits a large number of story leads and interviews to be generated so that the best stories (high quality control) may be picked from the lead and interviews to create the stories. In essence, the system performs a funneling of the leads wherein a large number of leads and interviews leads to a smaller number of good pieces of content.

The system may include a novel database structure that permits the content to be tracked and stored in a logical manner. The database may include story threads which include information about a particular story. The database may also include one or more workthreads for each story wherein each workthread contains information about different generations of the story (e.g., a 400 word version of the story, an internal generation of the story and an XML generation of the story). Thus, the system permits various different generations of the content to be logically stored so that any of the generations can be easily retrieved.

In more detail, the system may include a server which is executing one or more software applications which implement various steps in the story creation process. The software applications may include lead and interview applications or interfaces for accepting leads, lead reviews and interviews, for managing the story lead and interview process, a writer application or function for managing the story rating and story creation process, an administrative application or function for controlling the access to the system and editorial review as well as managing and maintaining the data contained in the database space, and a publisher application for generating a published story in a variety of different formats. The system may also include a database for storing information about each lead and interview and each completed story workthread. The database permits the content to be updated as needed which reduces the costs associated with producing and maintaining the finished content. The administrative system provides an overview of the system for an administrator, allows control of certain system data, controls the user permissions to access particular data so that different people who access the system may be able to view different information about the stories being prepared based on the privileges given to the person. For example, a particular corporation may view only the stories pertaining to that particular corporation while the system may actually be generating stories for multiple corporations. To manage the multiple tiers of access to the information in the system, the system may include an access information database containing information about the web pages/information available in the system for each user of the system. The database may also include each different access level in the system and what web pages each different user may view. For example, a person submitting a story may only access and view the lead and interview web pages while an editor may view all of the current stories being processed and their progress towards completion.

The system may have a user interface which is generated to provide users of the system, including story submitters, story researchers, story writers, story editors, system administrators, system customers, sub-contractors, partners and others, with guidance through the process. In one World Wide Web (WWW) based embodiment, one or more web pages are generated as the user interface. The system may generate these user interface screens dynamically as each user accesses the system. In particular, each user accessing the system may have a predetermined security level based on the user's intended use of the system. Based on the predetermined security level, pieces of data are retrieved from a database and the user interface for the particular user is generated based on the retrieved data. Thus, each user only views the data in the user interface screen which the user has the privileges to view to provide security for the stories being generated. Additionally, the user interface screens in the system are customizable to integrate seamlessly with the current look and feel of a customer's web site, for example, so that not only can different content be made accessible to different users based on the access privileges, but different versions of the same content as well as different presentations of that content may be provided to different users.

To generate leads for possible stories, the system may receive a lead through the lead and interview system. In addition, the system may include a pre-qualification system for finding and generating leads and following up on the leads to have them pre-qualified (i.e., determine that the story is valuable and should be created. Once the stories have passed this pre-qualification, the system requests an interview from the featured person, and this interview is matched with the data from the pre-qualification and tracking system. This integrated pre-qualification and tracking system is valuable to clients because it provides their project managers with a simple of generating leads and ensuring that leads don't fall through the cracks once they have signed off on them. Thus, data associated with the content is never lost and can be easily retrieved.

The system may include a placement management system wherein the content generated by the system may be placed in appropriate media or locations. The system may also include a writer management mechanism that permits the system to qualify a writer, editor, etc. for working and then manage the writer, editor, etc. payment process. The system may also include a user interface customization system wherein the screens and user interfaces for each editor and writer and other users of the system can be customized. The system may also include a digital rights management mechanism or it may be integrated with any well known digital rights management system. The system is individualizable to each user and can be upgraded to add new clients and new writers.

BRIEF DESCRIPTION OF THE DRAWINGS

FIGS. 2A–2C are diagrams illustrating an example of a submission form for the system of FIG. 1;

FIG. 3 is a diagram illustrating an example of a release form for the system of FIG. 1;

FIGS. 4A and 4B are diagrams illustrating an example of the initial screen of the writer application in accordance with the invention showing the status of the stories for the system of FIG. 1;

FIGS. 5A–5C are diagrams illustrating an example of a user interface page showing information about a particular story being prepared using the system for the system of FIG. 1;

FIGS. 6A and 6B are diagrams illustrating an example of a user interface page for managing the submission rating process for the system of FIG. 1;

FIGS. 7A and 7B are diagrams illustrating an example of a user interface page for managing the gathering of additional information (i.e., the researching of the story) required to write the story for the system of FIG. 1;

FIGS. 8A and 8B are diagrams illustrating an example of a user interface page for managing the writing of the story for the system of FIG. 1;

FIGS. 9A and 9B are diagrams illustrating an example of a user interface page for managing the story publication preparation process for the system of FIG. 1;

FIGS. 10A–10D are diagrams illustrating an example of a user interface page for managing the story editing process for the system of FIG. 1;

FIGS. 11A and 11B are diagrams illustrating an example of a user interface page for searching for stories within the system;

FIG. 16 is a diagram illustrating more details of the ticketing system in the CyberSubmit sub-system;

FIG. 17 is a diagram illustrating more details of the ticketing system in the CyberWriter sub-system;

FIGS. 18A–18C are diagrams illustrating an example of a lead creation wizard in accordance with the invention;

FIGS. 19A–19C are diagrams illustrating an example of a lead generation module in accordance with the invention;

FIGS. 20A–20E are diagrams illustrating an example of an interview preparation module in accordance with the invention;

FIGS. 21A–21G are diagrams illustrating an example of a customized interview form in accordance with the invention;

FIGS. 22A–22C are diagrams illustrating an example of an interview transcript in accordance with the invention;

FIGS. 23A–23D are diagrams illustrating an example of an interview review process in accordance with the invention;

FIGS. 24A–24E are diagrams illustrating an example of a story being created in accordance with the invention;

FIGS. 25A and 25B are diagrams illustrating an example of a public contact process in accordance with the invention;

FIG. 26 illustrates an example of an event log for a particular story in accordance with the invention;

FIGS. 28A–28H are screen shots illustrating the user interface and operation of the Extranet portion of the content development management system in accordance with the invention.

DETAILED DESCRIPTION OF PREFERRED EMBODIMENTS

The invention is particularly applicable to a system for managing the workflow for the creation of success stories for a corporation or other entity and it is in this context that the invention will be described. It will be appreciated, however, that the story workflow management system and method in accordance with the invention has greater utility, such as to any other type of stories which may include news feature stories, magazine articles, wire service articles and the like. The system is also applicable to other fields besides success stories, such as press relations (e.g., providing stories and information for the media), marketing (e.g., providing information for use by salespeople and telemarketing people), e-marketing (e.g., tying stories with products or solutions on the web), marketing (e.g., providing accurate end-user information to a company about how the end-users really use the company's products and why end-users like the products, customer education (e.g., stories about the profession and/or services provided), or human resources (e.g., to improve employee morale and communications as well as education). The content development system in accordance with the invention may also be used for other different types of content that may include written content, such as success stories, stories, articles, advertisements, auditory content, such as radio spots, radio advertisements, radio presentations, electronic downloaded auditory content and audiovisual content that combines audible content and written content. In the preferred embodiment described below, the content development system is described with an example of the workflow associated with a story and in particular to a system and method for managing the workflow associated with the preparation, editing and creation of a story, but the invention is not limited to a story workflow management system. A web-based example of the invention is described below, but the invention can be implemented on various well known computer systems and computer architectures without departing from the scope of the invention. Now, a first embodiment of the content development system will be described in the context of a story workflow management system and method.

Figure 1:
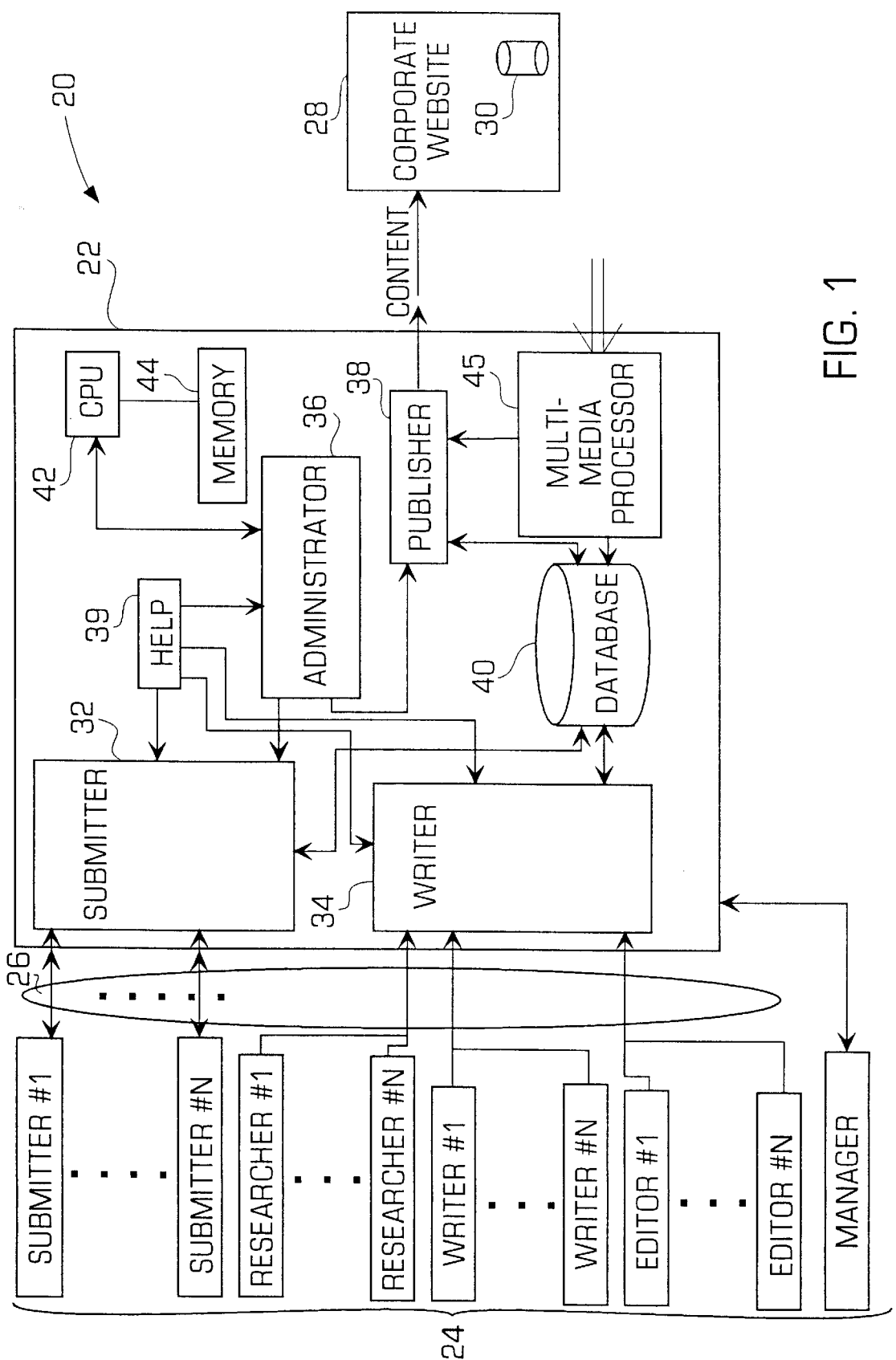
FIG. 1 is a block diagram of an example of a first embodiment of a content development management system in accordance with the invention which is a story workflow management system.

FIG. 1 is a block diagram of an example of a story workflow management system 20 in accordance with the invention. The system 20 may include a server 22 and one or more client computers 24 connected to the server by a computer network 26, such as the Internet or a corporate Intranet. The server 22 may house one or more sub-systems which generate a user interface and perform some of the steps of the story creation process as described below in more detail. Each client computer 24 may be a typical personal computer having a central processing unit which executes a browser application so that the user of the client computer may log onto the server 22. In the example shown, the users of the client computers may include different people who may have different privilege or access rights to the data stored on the server. The different people may include one or more people who submit stories to the system (Submitter #1-Submitter #N), one or more story researchers writers (Researcher #1-Researcher #N) who research the story submissions, one or more writers (Writer #1-Writer #N) who write the stories (in some cases the story research and story writing may be done by the same person), one or more Editors (Editor #1-Editor #N) who oversee and edit these stories and a corporate manager (Manager) who wishes to review the current stories being processed for a particular corporation.

Once the user of the client computer has logged onto the server, the user may interact with the various story creation systems, which may be software applications being executed by the server, by viewing information located on the server and providing information to the server. For example, a submission system as described below may be intelligent and may modify its actions or the data it displays based on the privileges of the user who requests the data. When a story lead and interview is being made, the forms content can be checked to ensure that certain minimum content requirements have been provided and an acknowledgment and receipt are automatically generated for the submitter or a request to fix any problems is generated. All of the submitted data may be automatically transferred into the workflow production system with an copy of the lead and interview data being preserved as read-only to ensure that it cannot be modified. An on-line help system is available to help the user through the submission system.

In the success story embodiment of the management system shown in FIG. 1, the resultant story (STORY) may be output over a communications link, such as the Internet or email, to a corporate web site 28 which stores the finished success stories in a database 30 and displays the success stories to client computers who access the corporate web site. The system may also store a copy of the story in its own database as described below. The system may also publish the story on its own success story website. The story, in accordance with the invention may be sent to the corporate web site using a variety of different delivery techniques, such as via fax, FedEx or anything else. In a preferred embodiment, the story is stored in the system's database and the corporate site's system requests a page containing a story from the system and then displays the story page within their website. Alternatively, the final version of the story is stored on a database in the corporate website maintained by the system and data is published locally into their website.

In accordance with the invention, each of the story creation sub-systems, as described below, may operate independently of each other so that stories, for example, may be submitted at any time from anywhere in the world and automatically stored in the database. In addition, the story creation process, as described below, is broken into a plurality of independent steps some of which may be performed out of order and at any time. The system automatically keeps track of the completed and uncompleted steps so that any authorized user of the system, such as researchers, writers, editors, administrators, customers, partners, etc., may quickly determine the status of any story. In addition, the system permits the steps to be completed at any time of the day or night to suit the work habits of different people. Now, more details of the sub-systems in the server will be described.

The server 22 may include a submission application system 32, a writer system 34, an administration/security system 36, a publisher system 38, a help system 39, a database 40, a central processing unit (CPU) 42, a memory 44 and a multi-media processing system 45. The 44 may include any type of data storage system such as a semiconductor memory, such as a RAM, EEPROM, ROM or the like, a hard disk drive system, a tape drive storage system or the like. In the example shown, the submission application system, the writer system, the security system and the publisher system may be software applications stored in the memory 44 of the server and the software applications are executed by the CPU 42 of the server. The system may also include a reporter system (not shown) which may sort the data in the database and/or in the pages being displayed to a user.

The submission application system 32 may generate a user interface, as described in more detail below with reference to FIGS. 2A–2C, to gather information from a user about a possible story idea (a lead and interview). The submission application system 32 automatically store the gathered information in the database 40 in a new story record with a unique numeric identifier. The submission application system may also include a lead generation system which may, for example, automatically generate messages, such as e-mail messages, requesting that users submit a story lead or participate in an interview. In this manner, the system 20 attempts to gather new story leads from the users of the products. The lead capture system 32 may also direct the user submitting a story, in certain circumstances, to fill out and send in a release form as will be described below with reference to FIG. 3.

The writer system 34 may permit a writer to rate the story leads or the interviews stored in the database, to manage the fact gathering process (i.e., researching the story) if the story lead or interview is approved for development and to manage the writing of the story by a writer, and to manage the final pre-publications processing of a completed story. The writer system may also permit an editor to manage all of the writer stages of the story creation process including the final pre-publication processing of a completed story, and to edit or kill the story at any time during the story generation process. The details of these functions will be described below with reference to FIGS. 4–11. At various stages during the generation of the story, the information about the story is stored in the database 40. The database also stores information about the status of each pending story.

The administrator system 36 may control the access to the submission application and writer systems. For example, the user accessing the submission application system 32 cannot access any information about other stories stored in the database using the submission application (since they do not have the appropriate privileges) while a writer, researcher or editor of stories may be able to access his/her own story and brief information about other stories. As another example, a supervisory editor may be able to access detailed information about every story to check the progress of each story and possibly send a reminder to a writer who has not completed a story, for example. Thus, a plurality of different security levels may be assigned to different users of the system to ensure that a particular user only views data which the user has the appropriate privileges to view. The administration system 36 also performs data maintenance and management functions. In particular, the user of the administration system may have the privileges to modify or delete data within the database which other users cannot modify or delete.

The publisher 38 may generate a downloadable version of the generated success story so that a salesman, for example, may take a hard copy of the success story along with him on a sales visit. The publisher may also forward the completed, ready-to-be-published success story to the corporate web site 28. The help system 39 may provide the users of the system with on-line help with any of the systems at any time in addition to step-by-step instructions provided in the user interface screens. The database 40 may store various pieces of information about each story including the steps completed in the story creation process, the submitted story idea, the written story and information about the person who submitted the story. The database may also store each completed story to keep a complete record of each completed story as well as a morgue archive and a graveyard archive (i.e., one or more levels of archives). The morgue archive may contain stories which are too old and no longer published while the graveyard archive may contain stories and story information which was spiked, as described below, or never made it past the initial rating process as described below.

The database 40 may also store the information about each user of the system including his/her access level and the information necessary to generate the user interface pages shown to each user. In particular, the user interface pages generated for a particular user are dynamically generated as the user logs into the system based on the pieces of data in the database and the security level of the particular user. For example, a user from a particular corporation may log into the system and be able to view only the stories associated with that corporation although the system may contain stories for a plurality of different corporations. Now, the multimedia processor system 45 will be described in more detail.

The multimedia processor system 45 may receive multimedia (e.g., images, video, audio, animation, etc.) for a particular story and store the multimedia in the database 40. A unique identifier may be generated for each piece of multimedia received to identify the story with which the multimedia is associated. The multimedia may then be processed to fit into the publication requirements of the system and published with the story once the story has been completed. The various systems described above provide an automatic document flow process in that a story in the system is automatically guided through the system and will appear in the pending page of a user automatically. Now, the submission application system and an example of a release page will be described.

FIGS. 2A–2C are diagrams illustrating an example of a submission form 50 in accordance with the invention and FIG. 3 is a diagram illustrating an example of a release form 52. The submission form 50 may include various user input blocks into which the user of the submission application system may enter information about the success story being submitted. The information may include contact information about the submitter, contact information about the person who knows more details about the success story, contact information about someone who needs to give permission to generate the story, information about the story and why it should be written, information about a website which may contain more information, information about the industry of the submitter's company, the size of the submitter's company, information about the hardware and software used during the project, information about how the product helped the submitter succeed, information about other websites to visit for information and information about how the submitter heard about the success story program as shown in FIGS. 2A–2C. The information gathered by the submission form, once submitted, is automatically stored in the database 40 shown in FIG. 1 and a new story submission record is created so that the a story submission review process may be completed.

The story submission process may include an initial screening by a writer who makes a recommendation for the rating of the story submission and documents this recommendation. The writer may also give the story submission a working title and handles some of the other minor administrative tasks associated with processing a story submission. Once the writer enters the initial recommendation into the system, the editor is automatically notified of this rating and accepts or modifies the writer's recommended rating. In particular, the system may automatically place the story in the editor's Pending page (as described below) until the editor makes his decision about the rating. Then once the editor either gives the okay to proceed with the story, the story is automatically placed back into the assigned writer's Pending page (inbasket) or a researcher's inbasket, as appropriate. If the editor spikes the story, the story goes into the graveyard archive.

Once the writer has reviewed the submission and received the editor's approval to proceed, the submission application system may send the release form 52 to the submitter or the appropriate person or organization featured in the story via e-mail or direct the submitter or the featured person or corporation to a website so that the release form may be downloaded. The submitter or featured person or corporation is then requested to review the release form and sign and date it. Once the form is executed, the submitter is asked to submit the release form, via facsimile and an original copy by mail, to an address. The release form 52 shown is a typical release (©Quantum Corporation),which permits the system's use of the submitter's information. Now, the writer system will be described in more detail. The writer system may generate a plurality of user interface pages, shown in FIGS. 4–11, which manage the story creation process. Each of the writer pages may include a notes section (not shown) which permits the person using the page to enter notes about the story.

Figure 4A:
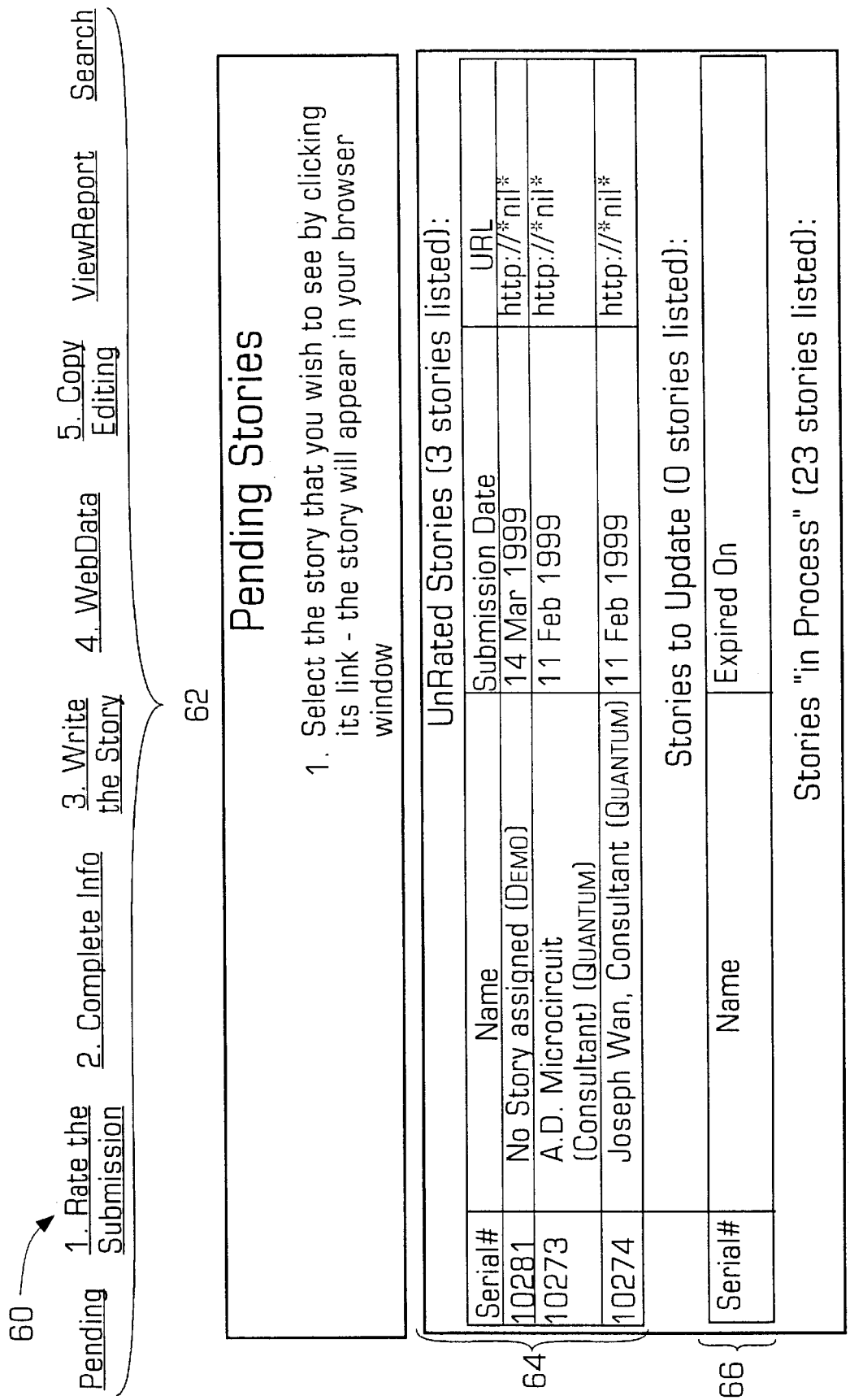
Figure 10D:
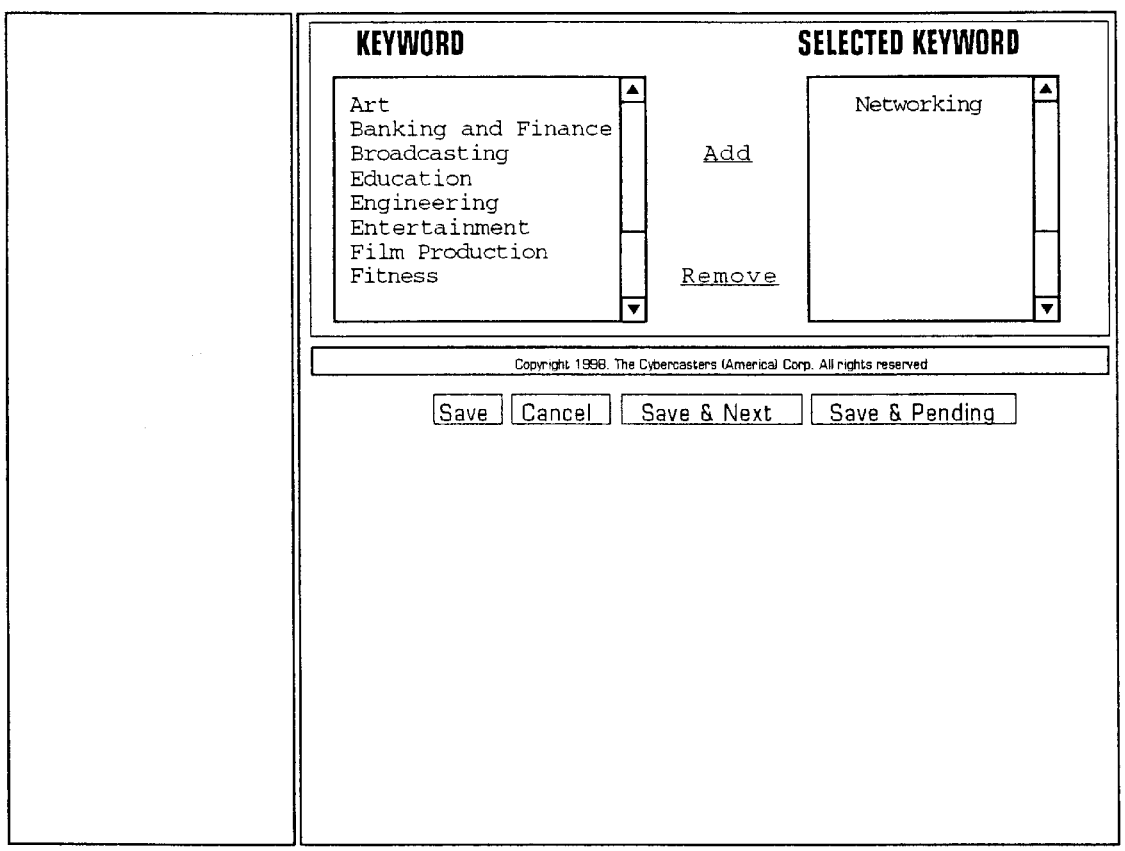
Figure 11B:
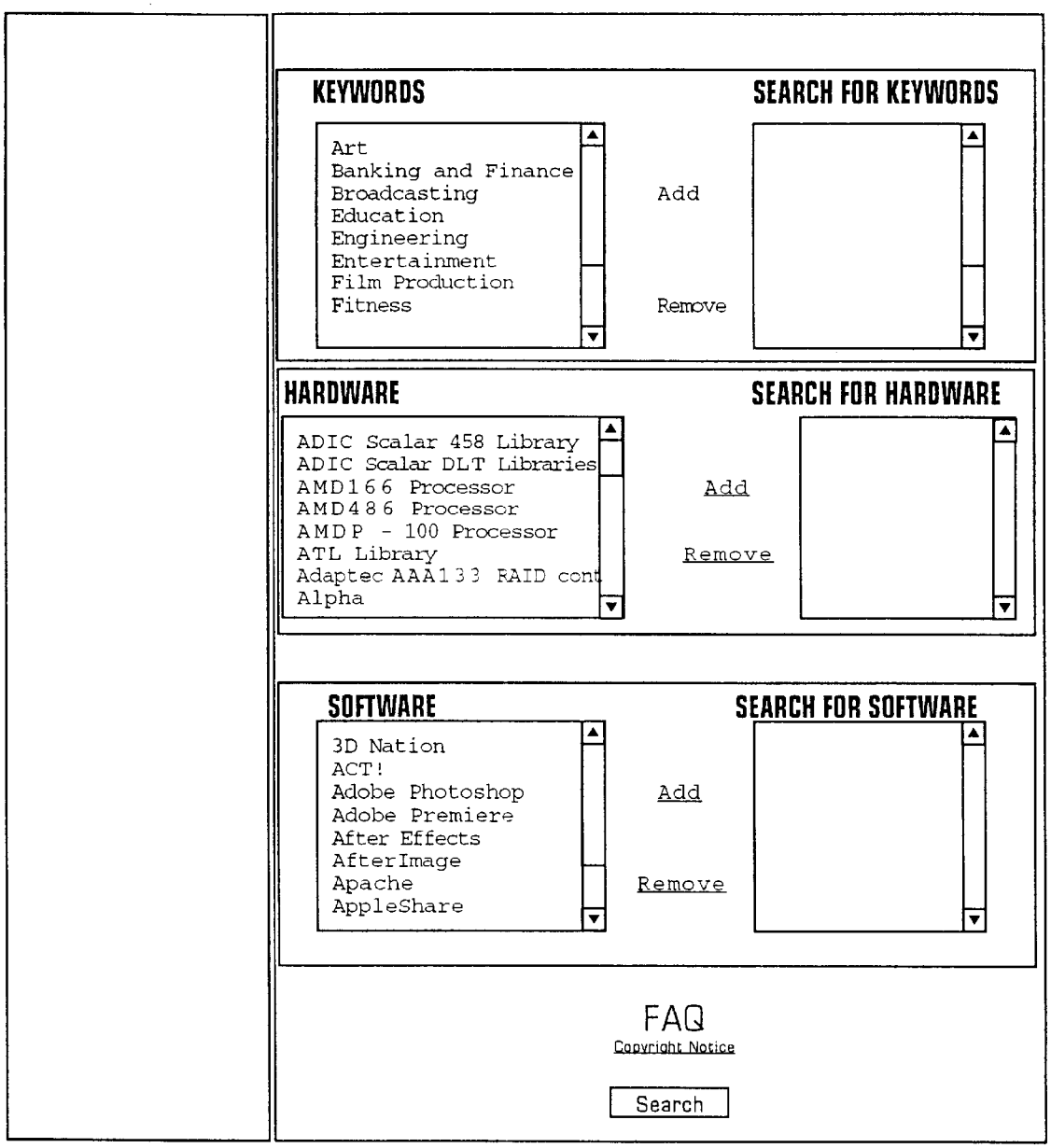

FIGS. 4A and 4B are diagrams illustrating an example of a status page 60 for the writer system in accordance with the invention showing the status of the stories currently being prepared by the system. The status page may include a menu 62 near the top of the page permitting the user of the writer system to navigate through the steps within the writing process. In particular, the menu may include one or more hyperlinks to other pages in the writer system including the pending page, as shown in FIGS. 4A and 4B, a rating page as shown in FIGS. 6A and 6B, an information completion page as shown in FIGS. 7A and 7B, a story writing page in FIGS. 8A and 8B, a web data page as shown in FIGS. 8A and 8B, an editing page as shown in FIGS. 9A and 9B, a view report page as shown in FIGS. 5A–5C and a search page as shown in FIGS. 11A and 11B. The invention, however, is not limited to the pages described below and additional pages may be added to provide more functionality to the system, such as a page for managing multimedia components and multimedia production. The system, using these pages, may be easily expanded using existing technologies or new technologies by adding additional pages to provide the user of the system with access to the existing technologies or any new technologies. Each of the above pages will be described in more detail below.

The status page 60 may further include an unrated story section 64, a stories to be updated section 66 and a stories in process and stories completed section 68. A unique status page may be generated for each user of the system so that, for example, a writer may see a status page listing the stories currently in the system for the particular writer. Thus, the status page may also be viewed as a sort of flow-based inbasket for each individual. The status page reflects the status of each story based on the traffic flow defined by the system so that it includes stories that appear because they are currently in the story creation process, because they have just come been submitted as a story submission and need a decision on whether they should be processed, or because the story needs updating.

The unrated stories section contains story submissions within the database which have not yet been rated by a writer and approved by an editor as described above. Until a story is rated as being appropriate for publishing or not, the story submission will remain in the unrated section of the pending page of the writer and editor responsible for that customer. The stories to be updated section 66 may include stories whose submission information needs to be updated or augmented. In particular, once a story has been live to the public (published) for the predeterminded period of time, the story appears in the updated section 66 because the story now needs to be checked for accuracy. The story remains in the updated section 66 until it has been checked and updated, if appropriate. Once the update has been completed for the particular story, the particular story is removed from the updated section and the predetermined time period is reset so that the story will appear again in the updated section after the predetermined time period expires again. Thus, each story will periodically be placed into the updated section to reverify the accuracy of the story.

The pending stories section 68 contains all of the stories which are currently being prepared using the system 20. The pending story section 68 may include a serial number section 70, a title section 72, a tickler section 74 and a story preparation status section 76 and other story status information as appropriate. Any story on a status page for a particular user which has been rated as worthy of writing and publication, but which has not yet been completed may be displayed in the pending story section for the appropriate writer and editor. The serial number section lists an identifier associated with each story, the name section lists the name of the story and the tickler section lists any due dates associated with the particular story. The story preparation status section 76 may include a panel 78 associated with each page listed above (the rating page, the information completion page, the story writing page, the web data page, and the editing page corresponding to the "1" panel, the "2" panel, the "3" panel, the "4" panel and the "5" panel, respectively). As all of the steps and items associated with a particular page are completed, the panel may change colors to indicate that that portion of the story generating process has been completed.

The important thing about the status page is that it is automatically updated in real time as steps of the story creation process are completed so that the status page for any user of the system is constantly updated. Each status page also provides an individually customized overview of the entire process from the perspective of the writer, editor, administrator or other authorized user (i.e., each user views his own personalized status page based on the stories for which the user has responsibility). The status page may also be implemented using pop-up menus, other forms of navigation and status display as well as the use of additional colors and additional information so that the status page is not limited to the example shown.

In a preferred embodiment, the panels for uncompleted pages may be red while the panels for completed pages may be yellow although the invention is not limited to these colors. For example, for a story entitled "Greyhound", all of the pages of the story creation process have been completed while for the story entitled "Hewlett Packard", the steps in the information completion page, the web data page, and the editing page have not been completed. In this manner, using the status page 60, a user of the system that has the access and the authority to view this page may easily determine the current status of the stories currently being prepared using the system including which portions of the story creation process have been completed. As above, the access to the data in the status page may be restricted so that a particular corporation may only see its own stories in the pending story section 68. Now, each of the pages associated with the story creation process will be described in more detail.

FIGS. 5A–5C are diagrams illustrating an example of a page 90 showing information about a particular story being prepared using the system. The page may summarize the information gathered about a particular story in the system. The page may include a dashboard section 92 located near the left side of the page which provides information about the status of various tasks in the story creation process. The dashboard section 92 accurately reflects the current status of the individual checkboxes for the instruction steps listed at the top of each page of the writer system as described below. The dashboard section may uses logic and rules to summarize important information relating to the individual steps of the process so that each of the items listed in the dashboard section provides information to quickly inform the viewer what has been done, what is pending, and tell them where in the system (the help system) to find the instructions for that particular step or steps. Therefore, from this page and every other story creation page described below, it is possible to easily determine the status of the particular story based on the dashboard.

In the dashboard, each checkbox 94 may have a number in parentheses associated with it which refers to the particular step in the particular page. As shown in FIG. 5A, the dashboard may include an initial OK section 96, a copy edit section 98, a WebReady section 100, a data complete section 102 and an implementation section 104. In the particular example shown, all of the boxes in the dashboard have been checked off indicating that these steps have been completed except for a spiked checkbox 106. If the spiked checkbox is checked off, then the story has been discarded by the writer or editor (depending on who has the privilege to spike a story) at some point in the story creation process which may be long before the story is written, such as anytime after the submission is made. In general, the vast majority of spikings occur before the story is written when the writer rates the story. In the example shown, the story is ready for publishing and is awaiting the final review by the editor, customer and possibly the person/organization featured in the story and the posting of a date after which the story may be published.

The story summary page 90 may also include original submission data including contact addresses and URLs to review, a description of the project about which the success story is being written, why the story is a good success story, the hardware and software used for the project, the contact address to appear on the published copy, and various story specific data, such as the headline, the story capsule, the story lead, the story body and quotes from the story. The story summary page 90 may be accessed by entering the writer system or by clicking on the view report button after selecting a particular story. Now, the submission rating page will be described in more detail.

FIGS. 6A and 6B are diagrams illustrating an example of a page 110 for managing the submission rating process in accordance with the invention. The page 110 may include the dashboard 92 which indicates the current status of the particular story. This page permits the writer of the system to assign a story name, to rate the submission using radio buttons and a notes field (not shown), to send the suggested rating to the editor for approval (the editor may either approve the story or spike the story). The rating of the story may involve the writer selecting a radio button indicating the rating of the story and a notes field which permits the writer to indicate why the particular rating was made. The stated story may be submitted to an editor who may then check the box authorizing the story or check the box spiking the story and the time that the story was spiked. At this point, the story is either authorized to be prepared or it is spiked and discarded. If the story is authorized and any initial research of the story confirms the value of the story, then the contact person is sent a release form or sent to a website to retrieve the release form to sign and return to an address. Thus, the rating page permits a writer and an editor to filter the incoming story submissions and spike unwanted story submissions. The rating page may also include lead contact information from the story submission which may be reviewed by the editor in determining the rating. Now, the process of gathering additional information will be described.

FIGS. 7A and 7B are diagrams illustrating an example of a page 120 for managing the gathering of additional information required to write the story in accordance with the invention. As above, the page 120 may include the dashboard 92 with the current status of the story. This page may ensure that the person preparing the story performs various fact finding tasks (i.e., story research) prior to preparing the story. The various facts learned during the story research may be stored in a notes field. For example, the person must contact the submitter and determine various facts including confirmation of the accuracy of the submitted information, obtain verbal consent for use of the story, obtain any additional information about the story and any quotes for the story, get the data about the person who is going to appear as the contact for the published story, and have the submitter obtain and sign a release form. The page may also require the person to document the verbal release and email the submitter thanking them for their time. As the person checks the items off in the page, the corresponding dashboard items are also checked off in all of the pages so that each page has a current status of the story. In the dashboard, individual steps of the information gathering process may be identified as completed such as the verbal release, the e-mailed thank you, a faxed copy of the signed release and an original received copy of the signed release. Now, a page for managing the writing of the story will be described.

FIGS. 8A and 8B are diagrams illustrating an example of a page 130 for managing the writing of the story in accordance with the invention. The page may include the dashboard 92 with the current status of the particular story. The page may also include a checkbox section 132 and a story writing section 134. The checkbox section 132 includes check boxes which may be checked when the faxed copy of the release has been received, when the story and its constituent parts have been written, when the story has been spellchecked, when keywords have been assigned to the story, when the original release is received, and any other follow up. The story writing section 134 may provide the story writer with a space to enter various information about the story such as the project title, the story headline, the story capsule, the story lead, the story body and quotes for the story. The story writing section may also permit the writer to choose keywords for the story as well as the markets to which the story may apply. Thus, this page permits the writer of the story to follow up on any missing items and write the story. Now, the page for managing the story publication process will be described.

FIGS. 9A and 9B are diagrams illustrating an example of a page 140 for managing the story publication preparation process in accordance with the invention. The page may include the dashboard 92 and a checkbox section 142 for completing the final steps to publish the story. The steps may include confirming that an original signed release has been received, confirming any incoming videos or images associated with the story, confirming the accuracy of the information, filling in the software and hardware information, confirming the image and video materials are ready to publish, and indicating that the story is ready for the editor to review. The other portion of the page permits the story writer to assign the hardware and software used for the project. These pages permit the story creation process to be managed by an editor and provides frequent rechecks for critical process steps. The pages also are dynamic and any updates to any of the pages are reflected in the dashboard for any of the other pages. Now, the editor page will be described which may only be accessed by a story editor.

FIGS. 10A–10D are diagrams illustrating an example of a page 150 for managing the story editing process in accordance with the invention. This page may only be accessed by an editor of a story and this page permits the editor to make a final review of the story before authorizing the publication of the story. In this manner, the editor has a final veto power over the story even after the story has been completed. As above, the page may include the dashboard 92 to review the current status of the story. The page may also include a display section 152 which displays the data to be published on a web site to permit a final copy edit review by the editor. The page may also display the contact information and the project description. The page 150 may also include a checkbox section 154 which permits the editor to make a final check of the story before it is published. For example, the editor must spellcheck the story and check for any other errors. The editor may then check a WebReady button which checks the appropriate box in the dashboard to indicate that the story is ready to be published to the web site. The editor may also set an Online Date (the date which the story is actually available for viewing) which may be now or some later time to coincide, for example, with a marketing pitch about the product. The editor may also designate the story as a featured story from a certain start date until a certain stop date as well as quotes from the story. Once the editor has indicated the WebReady status and the online date is now, the story is published on a web site and may be viewed by anyone accessing the web site. Now, an example of the page for permitting searching will be described.

FIGS. 11A and 11B are diagrams illustrating an example of a page 160 for searching for stories in the system. The search page may provide one or more different criteria which may be used for purposes of searching the database for a matching story. The search page may return the one or more stories which match the search criteria. In summary, the system provides for workflow management during a story creation process. The system provides constant updates about the status of any story in the system and may provide different data to different people based on the security level of the person. The system may increase the speed with which a story may be generated since each sub-system of the system may operate independently and permit users to access relevant pages at any time. Thus, the user of the system, such as the story submitters, the story writers and the story editors, may all work independently of each other and at different times and geographic locations so that the speed of the story creation is not limited by the availability of any person. Now, a preferred embodiment of the content generation management system and method will be described in the context of a success story creation management system.

Figure 12:
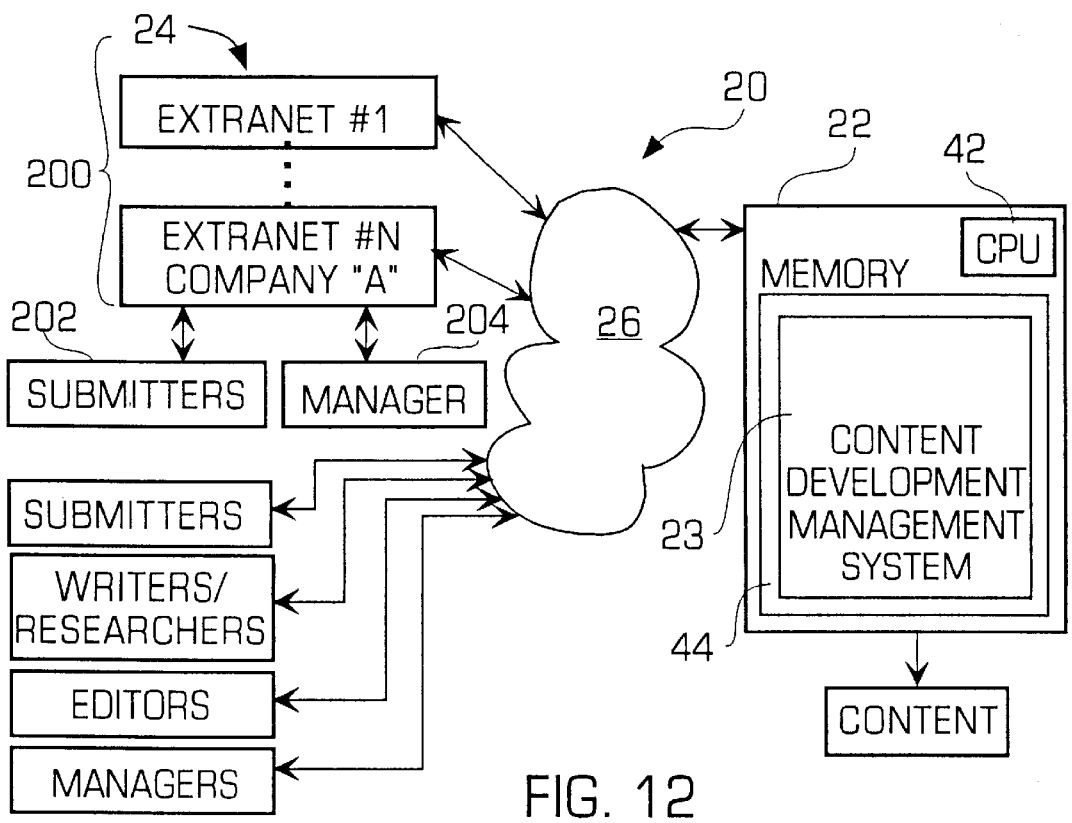
FIG. 12 is a diagram illustrating a preferred embodiment of the content development management system in accordance with the invention.

FIG. 12 is a diagram illustrating a second preferred embodiment of the content development management system 20 in accordance with the invention. For purposes of the description of this embodiment shown in FIGS. 12 and 13, elements that are common with the embodiment shown in FIG. 1 have the same reference number and have the same function unless some other function is described. In addition, the common elements may not be described here. For this preferred embodiment, the content generation management system may be implemented in the following manner although the invention is not limited to the particular implementation. For this preferred embodiment, the server 22 is a Sun Sparc server computer (version 5) that is using the Solaris operating system (Version 2.7.1). The database is OpenBase Version 6.5.3 and the web server is an Apache web server (Version 1.2.11). The application server is a WebObjects Version 4.5 application server and the language is Java (JDK Version 1.18). In this embodiment, the system may present, using the web server, one or more web pages to a user so that the user can interact with the system as described below with reference to FIGS. 18–28. The various software applications that support the system may be stored on the application server. In this preferred embodiment, the units shown in FIG. 13 are implemented as one or more software modules, such as JAVA applets or servlets. However, the system may also be implemented using one or more pieces of hardware as is well known.

With this embodiment, the flexibility of the system has been improved so that the system may be used for a variety of different purposes. For example, the system may include one or more extranets 200 (Extranet #1-Extranet #N) wherein each extranet may permit a particular customer of the system, such as Company A, to create its own customized content generation management system that may be located on the Intranet of the corporation. For each Extranet, there may be submitters 202 and a corporate manager 204. Thus, a large corporation that wants to generate its own success stories may have an extranet wherein the extranet is managed by the corporate manager. The extranet may permit customers of the corporation or employees of the corporation to submit success story leads directly from the corporate intranet or corporate web site. The extranet may also permit the corporation to use the content generation management system to manage the creation of success stories or other forms of content. As with the other system shown in FIG. 1, there may also be other users of the system 24, such as one or more submitters, one or more writers/researchers, one or more editors and one or more managers that perform that same functions as described above. The system may also include a mechanism to permit the content developed by the system to be dropped into a client site automatically, such as an FTP site so that the system does not need to maintain the client's site in accordance with one aspect of the invention.

To manage the various users of the system including the extranet users, the system may assign different access privileges to different people or groups of people using the administration unit 36 (shown in FIG. 13). In particular, the embodiment shown in FIG. 1 permits different people to have different access privileges. With this embodiment, the system permits access privileges to be assigned to an individual based on the individual status (e.g., writer, manager, submitter) as above, but it also permits access to be assigned on a group basis. For example, a person who is part of Company A may have a certain set of access privileges to the Extranet for Company A and then may have a different set of privileges for the management system. A second person with Company B would then have different access privileges than the first person since he should not be granted any access to Company A's Extranet. In this manner, the system can support numerous different Extranets as well as the usual Internet users. In this manner, the system is more flexible and handles many different customers and many different types of users. To manage the use of the system by different users, a ticketing system may be used that will be described below with reference to FIGS. 15–17. Now, more details of the content development management system in accordance with the invention will be described.

Figure 13A:
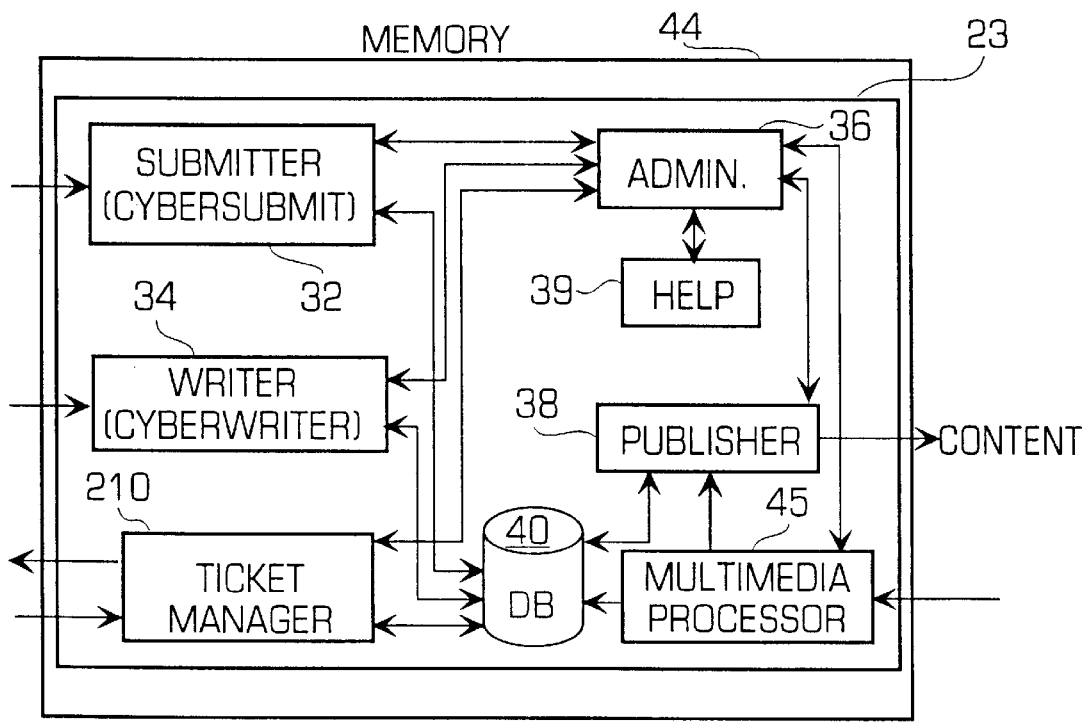
FIG. 13A is a diagram illustrating more details of the server portion of the content development management system of FIG. 12.

FIG. 13A is a diagram illustrating more details of the server portion 22 of the content development management system of FIG. 12 and in particular the content development management system 23 that is stored in the memory 44 of the server. As described above, the system may generate web pages as user interface elements using the web server described above and the software applications shown may be stored on an application server. Both the web server and application server are well known and are not shown in the diagram since it is well understood how these systems operate and how one would use these systems to implement a web-based system. As with FIG. 12, like elements to FIG. 1 are numbered with the same reference numbers and may not be described herein. In fact, most of the elements perform the same functions as the corresponding elements in FIG. 1 so their functions will not be described here. In this embodiment, the system 23 may further include a ticket manager 210 that is part of a ticketing system. The ticketing manager permits a user's access to different portions of the system to be controlled. For example, a person who is the contact for a success story lead (e.g., an interviewee) for a particular company may receive a uniform resource locator (URL) in a message, such as an e-mail, that instructs the interviewee to click on the URL to access an interview page. The URL may include an embedded unique ticket which identifies the particular interview page that should be shown to the particular interviewee. For example, an interviewee for a product for Company A may receive an interview page/form with text entry spaces/radio buttons, company logos or the like that have been customized for the particular company. In addition, the form may be pre-filled in with information about the interviewee and may provide customized questions to the user. The system may also include branching logic in the form so that, as the form is being filled in by the interviewee, the questions being asked of the interviewee may be altered based on the interviewee's responses.

In addition to the functionality described above, the publisher 38 shown in FIG. 13 may also include the ability to publish the content in various different formats. In particular, the publisher may generate an individual piece of content dynamically in any media format, such as into a PDF format, onto a CD, onto a DVD, to a printer, onto FLASH memory or any other media format. The system may also generate the output content in various formats, such as XML, PDF, HTML text with a logo, images, unformatted text or any other formats including new formats since the system includes APIs. The system may also generate/pre-publish the web site or part of the web site into which the content is destined so that the content is perceived in the context of the web site since users seems less likely to make unneeded changes to the content when seen in the context of the web site. The pre-publication reduces the review time and costs and catches errors more rapidly. The pre-publication of the web site also permits that web site to be delivered to a company that is a user of the system. Then, when changes to the content are necessary, the system may generate a new web site with the new content. In a preferred embodiment, the publication of the web site may be carried out in the following manner. An editor may select the content to be published and the system may search a database to locate the appropriate types of stories so that the system may generate HTML code corresponding to the content for the web site and write the HTML code to disk. The system may then fill in the content into a template that can be pre-published. In accordance with the invention, all of the pages for the web site may be generated by the system and stored on an file transfer protocol (FTP) site so that the company client may access the web site and serve it up to its customers. The system may also include the ability to change the look and feel of a generated page on a predetermined or random basis so that, despite the fact that the actual content does not change, the web page appears to be different.

In addition to the functionality of the writer 34 described above, the writer may also include the ability to control the versions of a piece of content as it is being created and finalized. For example, the system is able to track each different version of each component for a particular piece of content so that an editor may see the prior version of any component (e.g., headline, summary or the body) of a piece of content. As with the prior embodiment, the system may automatically route the data associated with a piece of content to the appropriate writer, editor, researcher or the like. Thus, the system associates all of the data for a piece of content with a particular object (see the database schema described below with reference to FIG. 14) so that, when the content is assigned to an editor, for example, the editor has all of the data associated with that content.

In addition to the functions of the administrative portion 36 described above with reference to FIG. 1, this embodiment may include various functions to set-up and manage the flexibility of the system. For example, the administrative section may include a client set-up portion which permits an operator of the system to generate a client profile and customize the system and its user interfaces for the particular client, such as providing a customized interview form customizing the types of stories permitted for the client, customized the content generation process of the client, customize the user interface for each writer/editor and any other customizations needed to facilitate the content generation process. Since the various customizations are set-up by the administrator, the system is customizable in various different manners. As described in more detail below, the one or more department(s) for each client is the key data that is used to organize the data for a particular client. This permits one client to have one or more different departments wherein each department may have its own customized content generation system. The administrator may also set-up and manage the different one or more story types (e.g., 400 word story type, 800 word story type, a long story type, a capsule story type) that are applicable to each department for each client.

The system also permits the actual workflow for each client (e.g., each department, story type, story, etc.) to be customized for the particular corporation. For example, a particular corporation may have a particular workflow that they use due to some unique characteristics of the corporation. For example, the system may provide each new customer with a checklist of content development choices that can be selected by the customer which in turn may affect the questions posed on the interview page for the customer. For example, the customer may be asked if he/she wants a story generated, if he/she wants a headline generated and if she/he wants a quote from the content generated. This embodiment of the invention also permits leads to content to be generated by various different means. In particular, a lead may be developed as before over the Internet. However, a lead may also be generated from the Extranets for a corporation, such as from a project manager, an employee, a writer of a piece of content and the like. The lead generation user interface provides a person with fill-in boxes with an unlimited number of characters to indicate the nature of the lead and the relevant information. The system may also permit the actual questions posed to a possible lead or to an interviewee to be customized based on the particular company that is the subject of the lead or interview. Thus, multiple interviews that may be typically needed to interview a person can be eliminated since the interview questions can be customized.

As with the prior embodiment, the system may break the content generation process into one or more steps which may be carried out as independent tasks by different people. In particular, each different task may be assigned to a different person on the fly (e.g., a particular editor may automatically receive all content for a particular company) and the tasks may be carried out independently of each other. In addition, the system may also permit additional content writers to be developed and qualified for the system so that the system may encourage the development of new writer talent. The system shown in FIG. 13 is also capable of handling content, such as written content, in a variety of different languages.

The system may also be used for different areas of content within the same client company. For example, the same data for a client company may be used for different areas of the company. For example, a company may have different corporate entities, subdivisions, departments or operating groups and each group may have its own customized user interface or forms. A company may have content published for the human resources department, an engineering department and the like. In addition, the system permits the leads and content associated with a company to be divided into one or more different categories according to the department that is associated with the particular lead or content. The different departments for a particular company may have different user interfaces, different writers, different billing arrangements and the like. The system also permits the different departments to be segregated from each other and different companies to be segregated from each other to maintain the confidentiality of each department or each company.

The system may also permit one or more templates to be stored wherein, for a particular client, a particular template for a piece of content is specified. For example, for a Wall Street company, the template may specify a 500 word story while a magazine may specify a 1000 word format story. This enables each client to receive leads and stories that conform to the needs of the particular client. In addition, the system may generate customized interview forms for each client so that, for example, there may be a Google® interview page for a piece of content, such as a success story, directed to a Google® product or service. The interview forms may have unlimited length fields and may also include logic that alters the interview form during the interview based on the interviewee's actions. When the interviewee has completed the interview, the interviewee may receive a customized receipt. The system also permits a short summary or capsule, such as 100 words, to be prepared based on information about a piece of content, a lead or an interview that may be placed on a website wherein the form for the lead or interview may include a release question that the interviewee must accept so that the summary can be published.

The content development management system in accordance with the invention also provides an action center wherein each user of the system can be alerted to current assignments and tasks that the user is assigned to complete. The system may also automatically route an assignment to a particular user. In a preferred embodiment, all incoming leads may be assigned to a default owner, such as the editor for the particular client/company. The editor may then assign the tasks associated with the content generation process to one or more team members assuming that the team members have the appropriate privileges for the particular client. Once the tasks are assigned, the person who is assigned the task will see the task automatically appear in his/her cockpit at login. In addition, the default owner may also reassign the tasks at any time so that, for example, a task assigned to a person on vacation can be easily reassigned. In more detail, the action center may include the messaging as described above. It may also include notes that may appear for a particular user to alert the user. For example, the user may be alerted that the system is going to be down for some time period. The action center may also notify a user about an extra task and then permit the user the bill the client for the extra task. The action center may also provide one or more resources to each user, such as a dictionary, a web search engine and the like.

The system may also include on-line contracts so that the various users of the system, such as the interviewee, the writer, etc., grant the proper rights to the system to use the content. The system may also provide multimedia tracking in that it can track where files, images, etc. are located in the system and ensure that the multimedia for a particular piece of content is not lost. The system may also include a mechanism to permit a user to upload multimedia, such as images in various formats including EPS, JPG or WAV files, into the content development system and then permits the multimedia to be incorporated into a content review process so that the user can view the multimedia with the content.

The system may also permit a piece of content to be placed into a "HOLD" state wherein, for example, a story may be held until the interviewee or editor is back from vacation on a particular date. The system may then generate an alarm to remind the interviewee or editor that the content is still in the HOLD state. The system may also provide other notifications to the various users of the system at various times. For example, the system may generate a message to an interviewee indicating that the person has not yet reviewed the content and providing the interviewee with a link containing a ticket to review the content. If the interviewee still does not review the content, the system may provide the interviewee with further reminders. As another example, if a piece of content to be prepared sits in a writer's in box for some predetermined period of time, the system may send a reminder to the writer.

Due to the flexibility of the database and the customizablility of the system, the system handles ambiguities very well and can adapt to the ambiguity. In particular, there are many different steps in the content generation process that are not well defined and therefore can cause problems with a system that attempts to normalize the content generation process. For example, a typical system may permit a single review by the interviewee, but the actual review process may take a single review or it may involve 10 review cycles depending on the person. The system can permit as many review cycles as necessary.

The system may also provide one or more functions that support other elements of a customer's business. For example, the system may provide functionality that enhances a marketing campaign. In more detail, the system may permit one or more elements of a piece of content, such as a quote in the content or a headline, to be randomized at different predetermined periods of time. Thus, the same piece of content may look different at different times since portions of the content are randomized. Now, a method for content generation in accordance with the invention will be described in more detail.

Figure 13B:
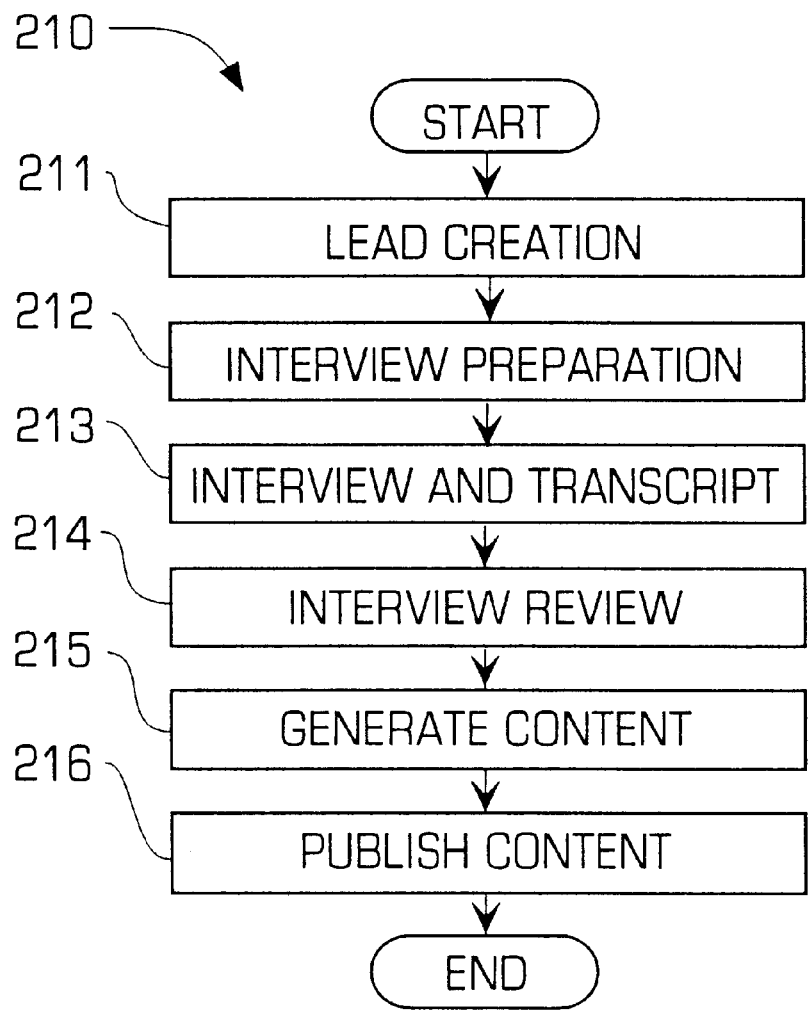
FIG. 13B illustrates a method for generating content in accordance with the invention.

FIG. 13B illustrates a method for content generation 210 in accordance with the invention. In particular, the method may includes a step 211 in which a lead is created by a person using the Extranet, by an internal user as shown in more detail in FIGS. 18A–18C below or by someone on the Internet. In a next step 212, an interview for the interviewee is prepared which is described in more detail with reference to FIGS. 20A–20E. In step 213, the interview is conducted with the interviewee and an interview transcript is generated as shown in FIGS. 21A–E and FIGS. 22A–C below. In a next step 214, a user of the system may review the interview as shown in FIGS. 23A–D below. In a next step 215, the content based on the interview is generated as shown below in FIGS. 24A–E. In step 216, the content may be published in various different formats or published as part of an entire web site as described above. Using this process, a piece of content may be generated. As described above, each step of the process may occur independently and does not need to occur in a serial manner. Now, the database schema of the content development system will be described in more detail.

Figure 14:
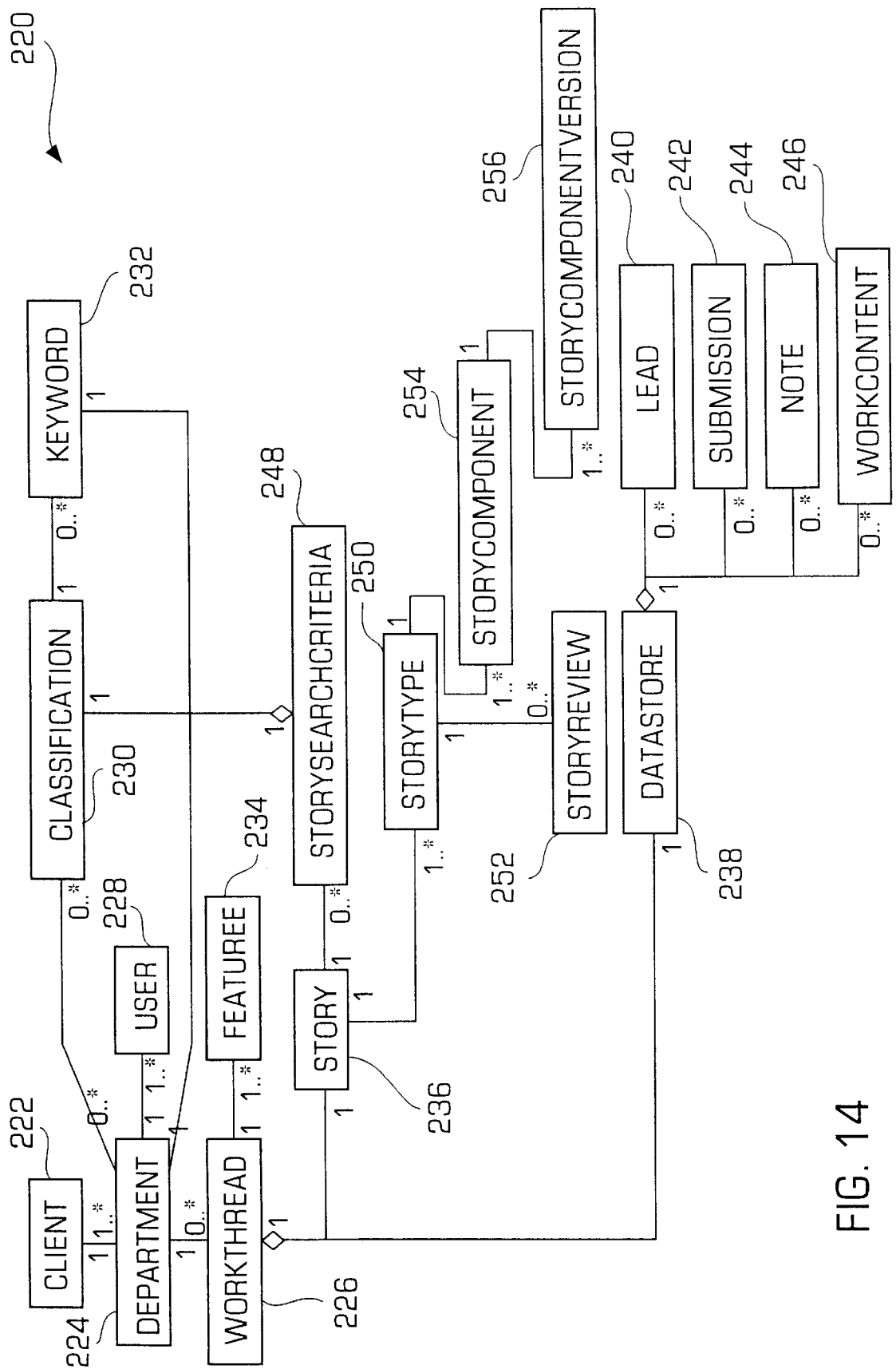
FIG. 14 is a diagram illustrating the database schema of the content development management system of FIG. 12.

FIG. 14 is a diagram illustrating an example of a database schema 220 of the content development management system of FIG. 12 for a particular client wherein the actual database for the system will have data associated with a plurality of different clients. In this example, the database schema for a success story generation embodiment of the system is shown for illustration purposes. In particular, the database schema may be one or more records and/or tables (referred to for purposes of this section as nodes) that are related to each other. As shown in the diagram, the relationships of the tables/records are illustrated. In particular, the number "1" next to a node indicates that there is a single node. For example, there is a single client node for each client. Similarly, a "0.*" or a "1.*" indicator near a node indicates a one to many or a zero to many relationship wherein there may be one or more tables (for the "1.*") or zero or more tables (for the "0.*") associated with the one parent node. For example, there may be zero or more workthreads associated with each department of each client. Similarly, there may be one or more departments associated with each client.

In more detail, the database schema may include a client table/record 222 which is the root table/record (e.g., node) for the database since all of the other records for a particular client relate to the client record. Each client node may contain information about a particular client of the content development management system, such as a company or corporation that uses the system to generate success stories for the corporation. The only child of the client node is a department node 224 since each client may have one or more different departments as described above so that the content for each client may be divided up by department if needed.

The department node has several related nodes including a WorkThread node 226, a user node 228, a classification node 230 and a keyword node 232. The WorkThread node 226 contains information about the WorkThread for each piece of content being generated for the particular department of the particular client. In more detail, the WorkThread contains customized information about the content generation process for the client. The user node 228 contains information about one or more users of the system, such as editors, writers, etc. that have access privileges to the content associated with the particular department since each department may have, for example, a different editor. The classification node 230 contains information of the zero or more classifications for different pieces of content associated with the particular department of the particular client. The keyword node 232 contains information about zero or more keywords that may be associated with a particular classification and about the keyword associated with a particular department.

There may also be one or more child nodes of the WorkThread node 226 that may include a featuree/customer node 234, a story node 236, and a datastore node 238. The featuree node contains information about the person being featured in the particular piece of content (e.g., the featuree), the story node 236 that contains information about the one piece of content (e.g., the story) associated with a workthread due to the one-to-one relationship, and the datastore node 238 contains information about the data associated with the workthread (wherein there is only one datastore node associated with each workthread). The datastore node 238 may have one or more children wherein each datastore node may have zero or more tables for each child. The children may include a lead node 240, a submission node 242, a note node 244 and a WorkContent node 246. Thus, the datastore node may have zero or more lead nodes, zero or more submission nodes, etc. The lead node 240 may contain information about a lead (e.g., contact information, story suggestions, etc.) associated with a particular workthread, the submission node 242 may contain information about a story submission for the particular workthread, the note node 244 may contain information about the notes associated with a particular workthread and the workcontent node 246 may contain information about the work content associated with a particular workthread.

The story node 236 may have zero or more StorySearchCriteria nodes 248 that contain information about the search criteria for a story and the StorySearchCriteria node may be related to the classification node 230. The story node may have one or more StoryType nodes 250 that contain information about the types of the story (e.g., a 400 word story, an 800 word story, a long story, a summary, etc.). Thus, for example, one story may have one or more different story types that are generated based on the story. The StoryType node 250 may have zero or more StoryReview nodes 252 containing information about the zero or more reviews associated with a particular story type. The StoryType node 250 may also have one or more StoryComponent nodes 254 associated with it that contain information about a particular story component, such as the summary, the body of the story and the like. The StoryComponent node 254 may in turn have one or more StoryComponentVersion nodes 256 which contain information about each version of each component of a story so that any person with the appropriate privileges can review all of the version of a particular component of a story.

Using the above database schema, the data and information associated with a particular piece of content, such as a story, are related to particular department of a particular client. The database schema permits various information about a particular story or a particular client to be viewed by people having the appropriate privileges. The database schema also permits the various associations between the tables to be dynamically changed. For example, a first client may have an 800 word story type for each story and each story has a headline and a summary only. A second client may have a 400 word story type, an 800 word story type and a long story type wherein the components of each story type is different. Thus, the database has been created to permit the maximum amount of flexibility.

The database and the object oriented modules in accordance with the invention may also permit the system to provide an integrated search engine. In particular, the search engine permits users of the system, such as a writer or an editor, to search the content stored in the system. The search engine also permits a customer of the system using an extranet, such as a particular corporation, to search for content within the system by using the integrated search engine. For customers, the search is limited to content of the corporation and may be limited to only very limited searched although the system can provide whatever level of search is necessary. The system may also include a second search capability used for the static published sites. For this search, a hitlist page may be pre-generated with the static page wherein all the links are then stored as part of the static site pages. This means that more processing power is necessary to generate the site, but that the generated site does not need any software to be installed on our customers servers so as to execute the searches Now, the ticketing system in accordance with the invention will be described in more detail.

Figure 15:
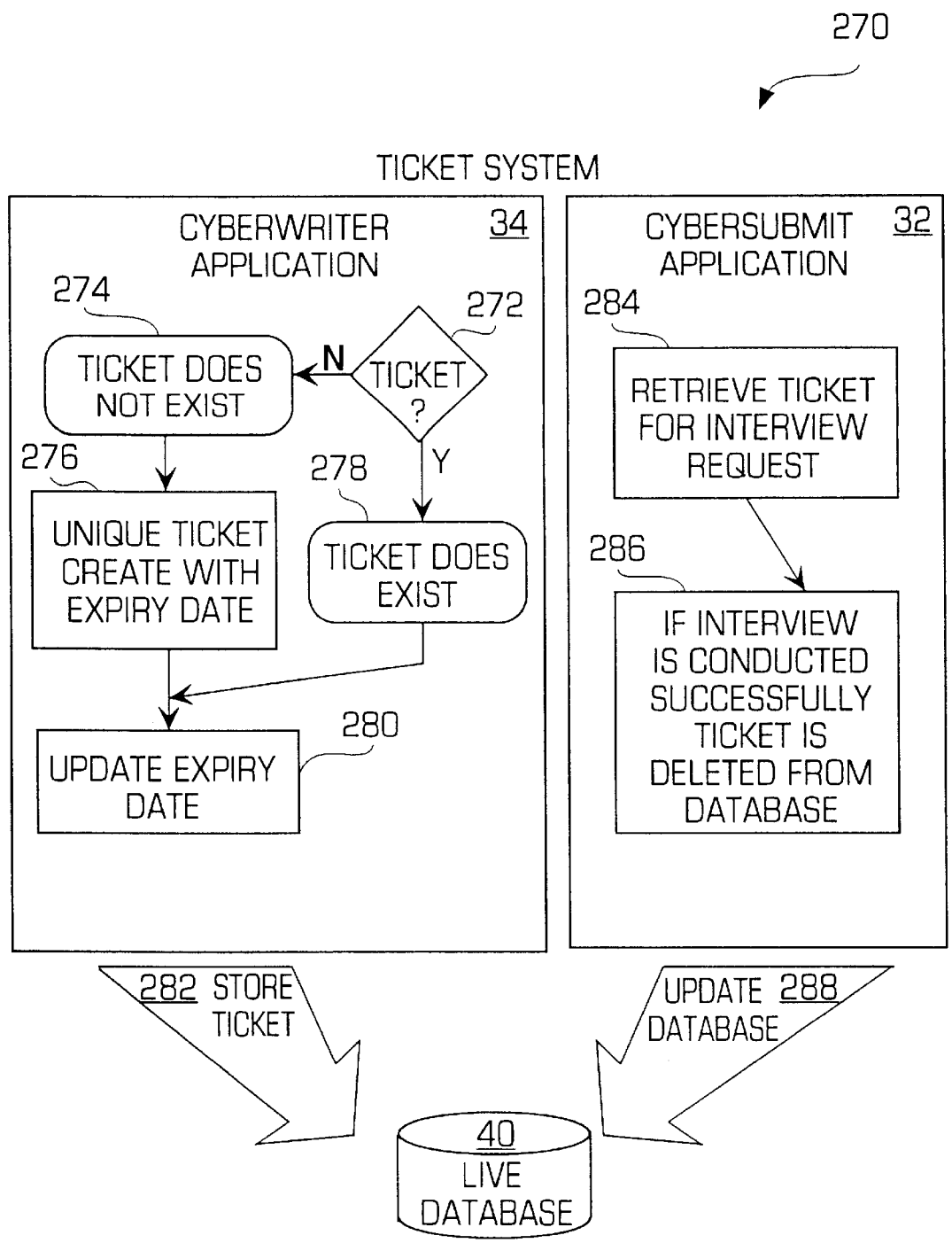
FIG. 15 is a diagram illustrating a ticketing system that is incorporated into the content development management system of FIG. 12.

FIG. 15 is a diagram illustrating a ticketing system 270 that is incorporated into the content development management system of FIG. 12. As described above, the ticketing systems permits customized forms and web pages to be presented to each user of the system based on the particular characteristics of the user. As shown, the ticketing system may be implemented by steps performed by the CyberWriter portion 34 and the CyberSubmit portion 32. In particular, the CyberWriter portion 34 may initially generate a ticket wherein the CyberWriter may determine if a ticket is attached to a URL in step 272. If the ticket does not exist as shown in step 274, the CyberWriter portion may generate a unique ticket with a predetermined expiration date in step 276. The expiration date may be set by default to 2 weeks, but can be customized as needed. The expiration date ensures that the interviewee only has access to the system for a short period of time so that a lot of unused tickets with access into the system do not exist to prevent security breaches. If the ticket already exists in step 278 or the ticket was just generated, the expiration date of the ticket may be updated in step 280 so that it does not expire too soon and not permit the user to access the particular form associated with the ticket. In a last 282, the ticket is stored in the database 40 and associated with a new WorkThread for the client.

For the CyberSubmit portion 32, when a user establishes a connection with the server through a URL with an attached ticket, the system may retrieve the ticket from the URL for the interview request in step 284. Then, if the interview is successfully conducted, the system may delete the ticket from the database 40 in step 286 and update the database in step 288 to reflect the deleted ticket. The ticket may also be used for the review of the content process as well as the multimedia upload process. Now, more details of the usage of the ticket in the CyberSubmit portion will be described.

FIG. 16 is a diagram illustrating more details of the ticketing method 290 in the CyberSubmit sub-system. In particular, in step 292, the interviewee clicks on a URL in an e-mail which invites the interviewee to fill out an interview form. The URL takes the interviewee to the CyberSubmit application. In step 294, the CyberSubmit application reads the ticket that is embedded into the URL and locates the corresponding data in the database. Using the data in the database associated with the ticket, the CyberSubmit application generates a customized interview form that is then displayed to the user in the user's browser application. For example, the customized interview form for a particular interviewee may be pre-filled in with the known personal information about the interviewee so that the interviewee does not need to fill in the information that the systems already knows based on the lead submission. In step 296, once the interviewee has completed the interview within the CyberSubmit application, the CyberSubmit application may invalidate the ticket by removing it from the database so that it cannot be used again. In accordance with the invention, if the interviewee only completes some portion of the interview screens, such as the first two screens, the data in the first two screens is saved so that the interviewee can come back and complete the interview and the ticket is maintained in the database. When the user next accesses the interview form at some later time, the system will fill in all of the information previously provided to the system so that the interviewee starts from where he left off. Now, more details of the ticketing system as implemented by the CyberWriter application will be described.

FIG. 17 is a diagram illustrating more details of the ticketing method 300 in the CyberWriter sub-system. In particular, in step 302, the internal CyberWriter user (using the CyberWriter application) may generate a new ticket by selecting an expiration date. In step 304, the system generates a unique ticket and returns a special URL with the embedded ticket to the user on a web page. In step 306, the user may then send the special URL to the interviewee via e-mail so that the interviewee can fill in the interview form.

Now, the various screen shots of the content development management system in accordance with the invention will be described to help aid in the understanding of the content development management system. In these figures, an example of the system being implemented over the Internet using one or more web pages is shown although the system can be implemented using a variety of different computer systems and configurations.

FIGS. 18A–18C are diagrams illustrating an example of a lead creation wizard module 310 in accordance with the invention. FIG. 18A illustrates the lead creation wizard user interface that is initially presented to a user of the system when that user wants to enter some lead information into the system. The form shown may be presented to both users of the Extranet (e.g., employees of a corporation using the system that want to enter a new lead idea) and user of the Internet wherein any user may enter a lead idea into the system. As shown, the form permits the user to enter various information into the system including the name of the featuree (e.g., the person who will be interviewed and the person who will be the basis for the possible success story) and his contact information. The form also requests information about why the lead would make a good story and if there are any special issues to raise in the interview (so that the interview form for the particular interviewee can be automatically customized with questions related to the special issues). FIG. 18B illustrates the same form as FIG. 18A after the user has entered information into the fields of the form. The user may then click on a save button 312 and the lead information is stored in the system in the database schema described above. In response to the saving of the lead form, the user interface shown in FIG. 18C may be displayed to the user. The user interface shown in FIG. 18C indicates to the user (see indicator 314) that the lead information has been saved in the system's database and that the lead has been assigned unique serial number that can be used to track the lead through the system. Now, the generation of a lead in accordance with the invention will be described.

Figure 19B:
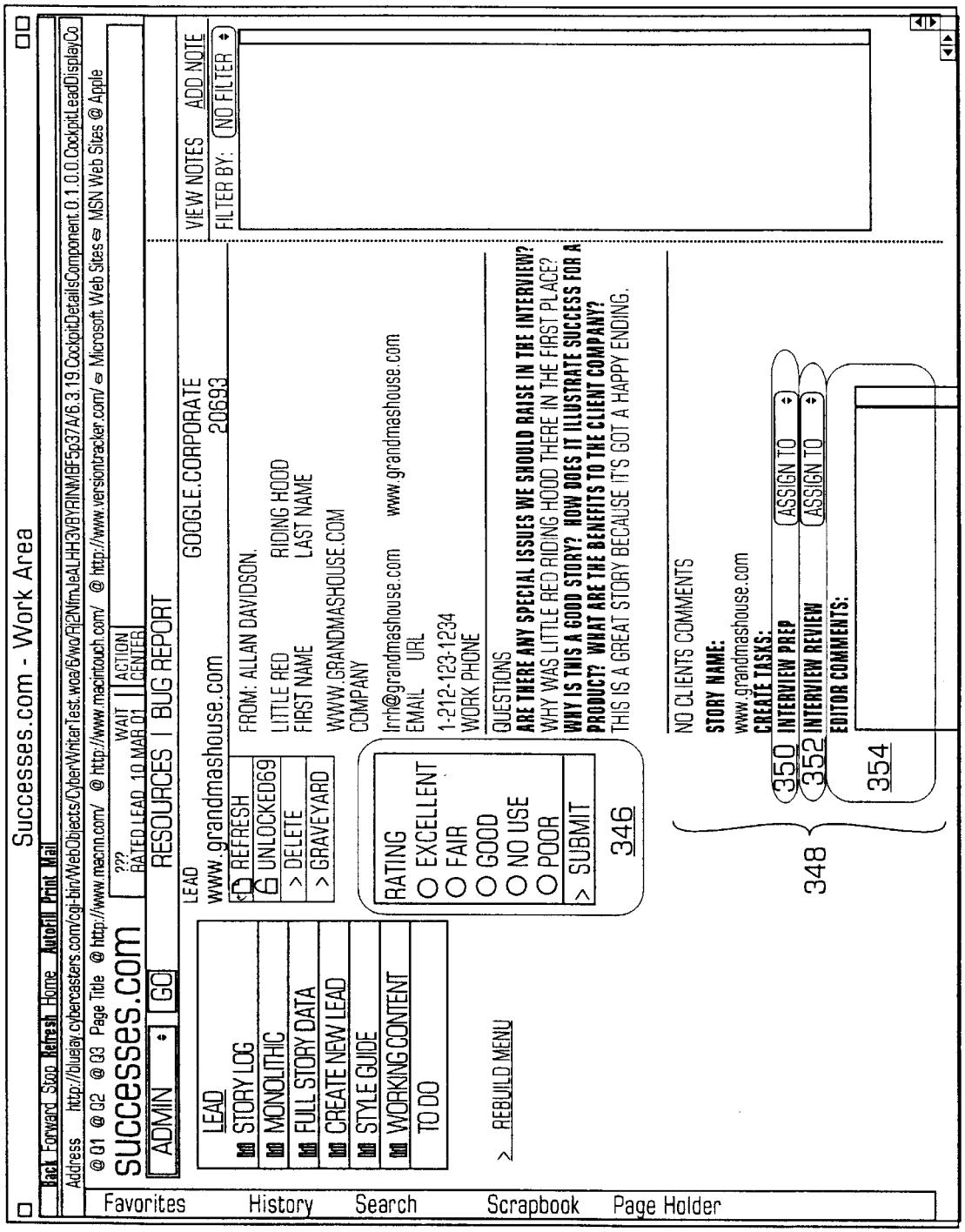

FIGS. 19A–19C are diagrams illustrating an example of a lead generation module in accordance with the invention. In particular, FIG. 19A illustrates a cockpit overview 320 of the content generation management system wherein a user is able to view various information about the currently being worked on content in the system that the particular user has the privileges to view. The cockpit may include a control panel 322 that permits the user to navigate around in the system and view a snapshot of the amount of content at each stage of the content development process including "needing attention", "on hold", "leads", "rated leads", "interviews", "stories", "copy edit", "approval", "published", "refresh", "graveyard" and "morgue". In the example shown, the user has selected the "leads" stage and is presented with a summary of the current leads 324 in the system that the user has privileges to view.

Each current lead may include one or more of the following pieces of information, such as a workthread identifier 326, a client name 328, a client department name 330, a lead serial number 331, a featuree name 332, a submitter name 334 and a job assignment section 336 that provides the user with data about the particular lead that has already been generated from various sources including the information from the lead creation wizard. The lead created in FIGS. 18A–18C is shown at the top of the section. In this example, the lead has been assigned to Jan for different tasks. In this example, Jan is the owner of the new lead (e.g., she is responsible for the lead) and the assigned lead editor. Note that the other leads have other tasks for the content generation, such as capsule generation, interviewing and publishing data, that can be assigned to different people and reassigned if needed.

The cockpit 320 may further include a filtering section 338 that permits the user to filter out the leads and, for example, only view leads that are a particular type of story. The cockpit view may also include one or more drop-down menus 340 that permits the user to sort the lead by certain attributes or to only view lead having certain attributes. For example, the user may select to only view lead which are generated for a particular department of a particular client of the system. When the user selects a particular lead 342, the user of the system is presented with a user interface 344 shown in FIG. 19B. The user interface provides the user of the system, typically the owner of the lead or an editor, with the ability to assign a rating to the lead in a rating portion 346. In accordance with the invention, the information about the lead filled by a user are automatically filled into the form. The user interface may also include a task assignment portion 348 that permits the owner of the lead to assign the tasks associated with generating content from the lead. In particular, the assignment portion may include an interview preparation portion 350 with a drop-down menu to assign the interview preparation task to someone, an interview review portion 352 with a drop-down menu to assign the interview review to someone and a editor comments portion 354 that permits the editor to make any comments about the lead. FIG. 19C illustrates the user interface 356 presented to the editor when the lead has been rated by the editor in the rating portion 346 as shown, an editor comment has been provided in the comments section 354 and the interview preparation and review has been assigned (see portions 350, 352) to a particular person. Thus, at this point, the lead has been generated and the tasks to generate the content from the lead have been assigned. Now, the person assigned to the interview preparation task may be provided with a user interface as will now be described.

Figure 20B:
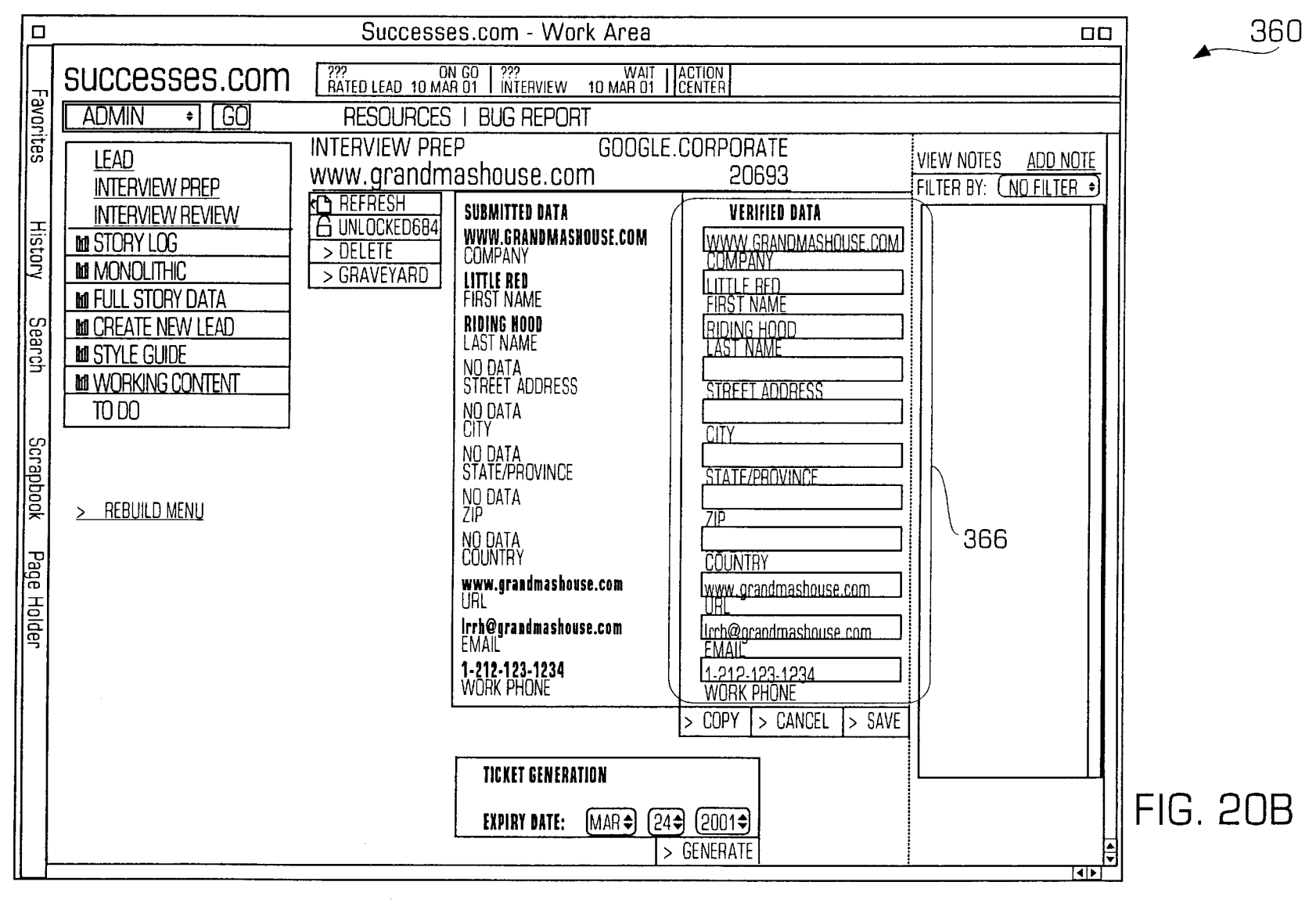
Figure 20C:
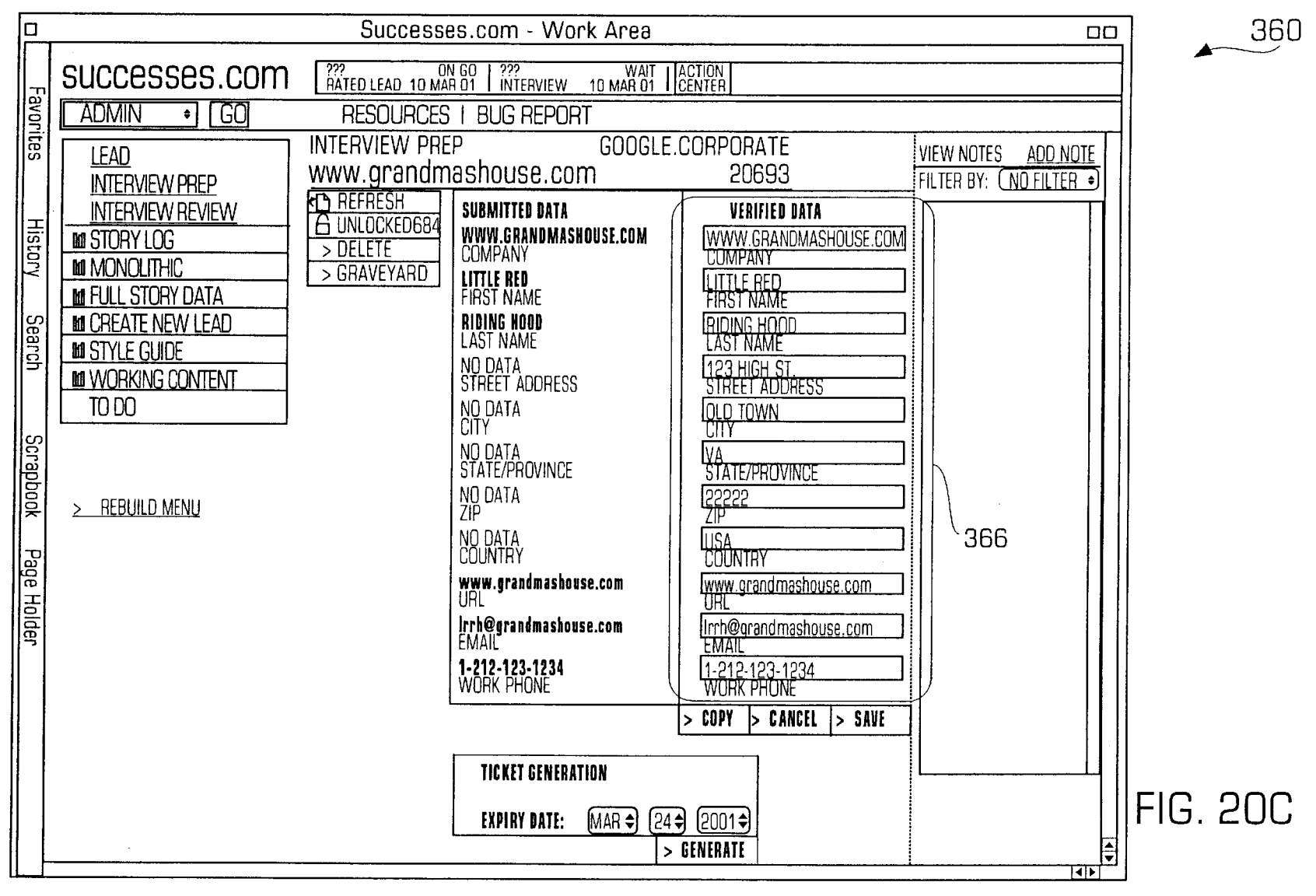
Figure 20D:
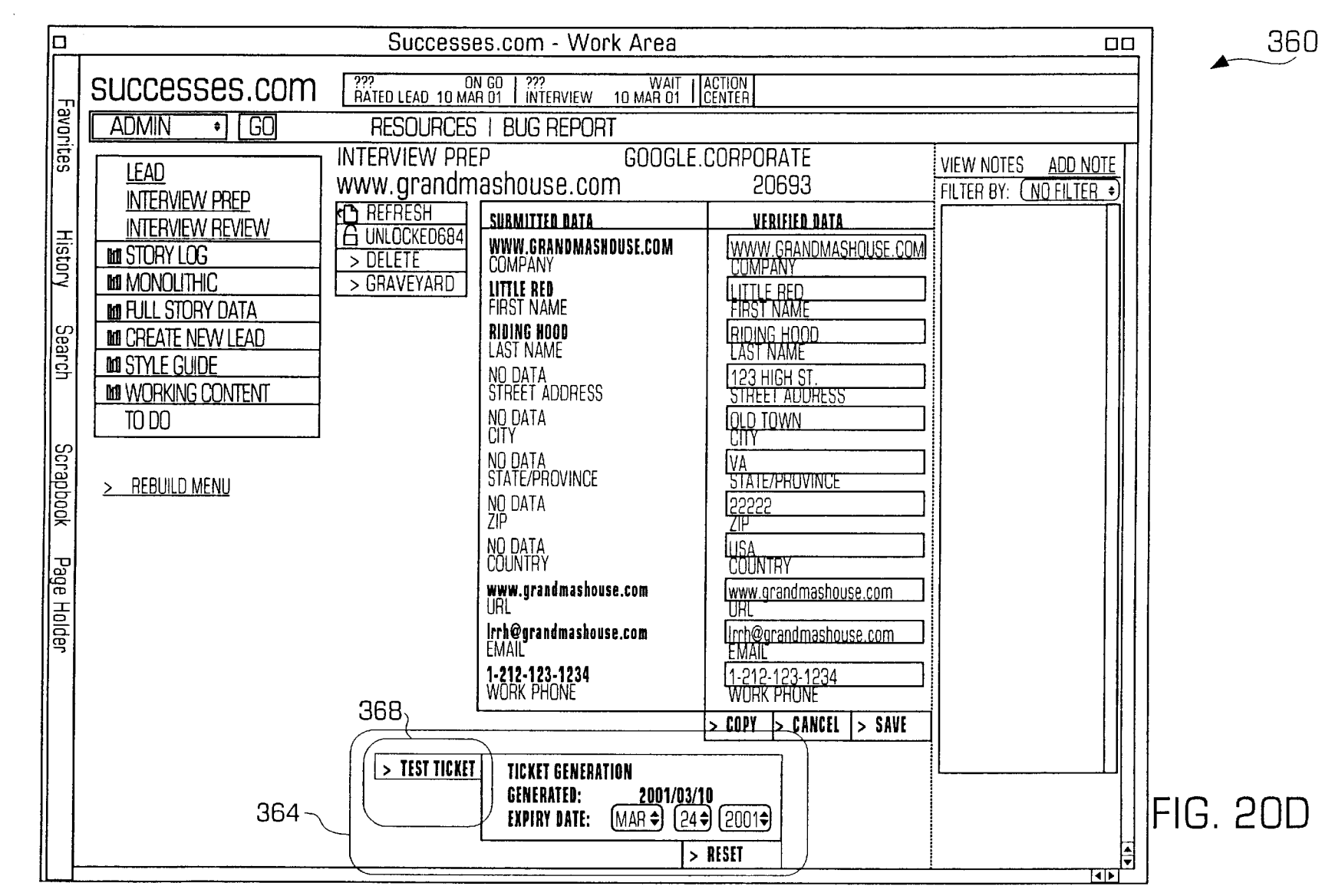

FIGS. 20A–20E are diagrams illustrating an example of an interview preparation module in accordance with the invention. In particular, FIG. 20A illustrates an example of an interview preparation user interface 360 that may include a submitted data section 362 wherein the data about the featuree previously entered into the lead creation wizard is automatically filled into the interview preparation user interface after the editor has looked at the data and indicated that it should be pre-filled into the form so that the data is more accurate. The user interface may also include a ticket generation portion 364 that permits the ticket for the interview as described above to be generated. FIG. 20B illustrates the same user interface 360 with the submitted data automatically copies over into a verified data portion 366 as shown. FIG. 20C illustrates the same user interface 360 after the user has added any additional information into the verified data portion 366. FIG. 20D illustrates the same user interface 360 when the interview preparation data has been entered and a ticket has been generated as shown in the ticket portion 364. Since the ticket has been generated by the system, a ticket generation date and an expiration date are shown. The user interface may also have a test ticket button 368 wherein the user of the system may test the ticket. FIG. 20E illustrates the same user interface 360 when the test ticket button is pressed and an interview user interface 370 is generated in a new window. The user interface 370 shown is the same that will be presented to an interviewee as will now be described.

Figure 21B:
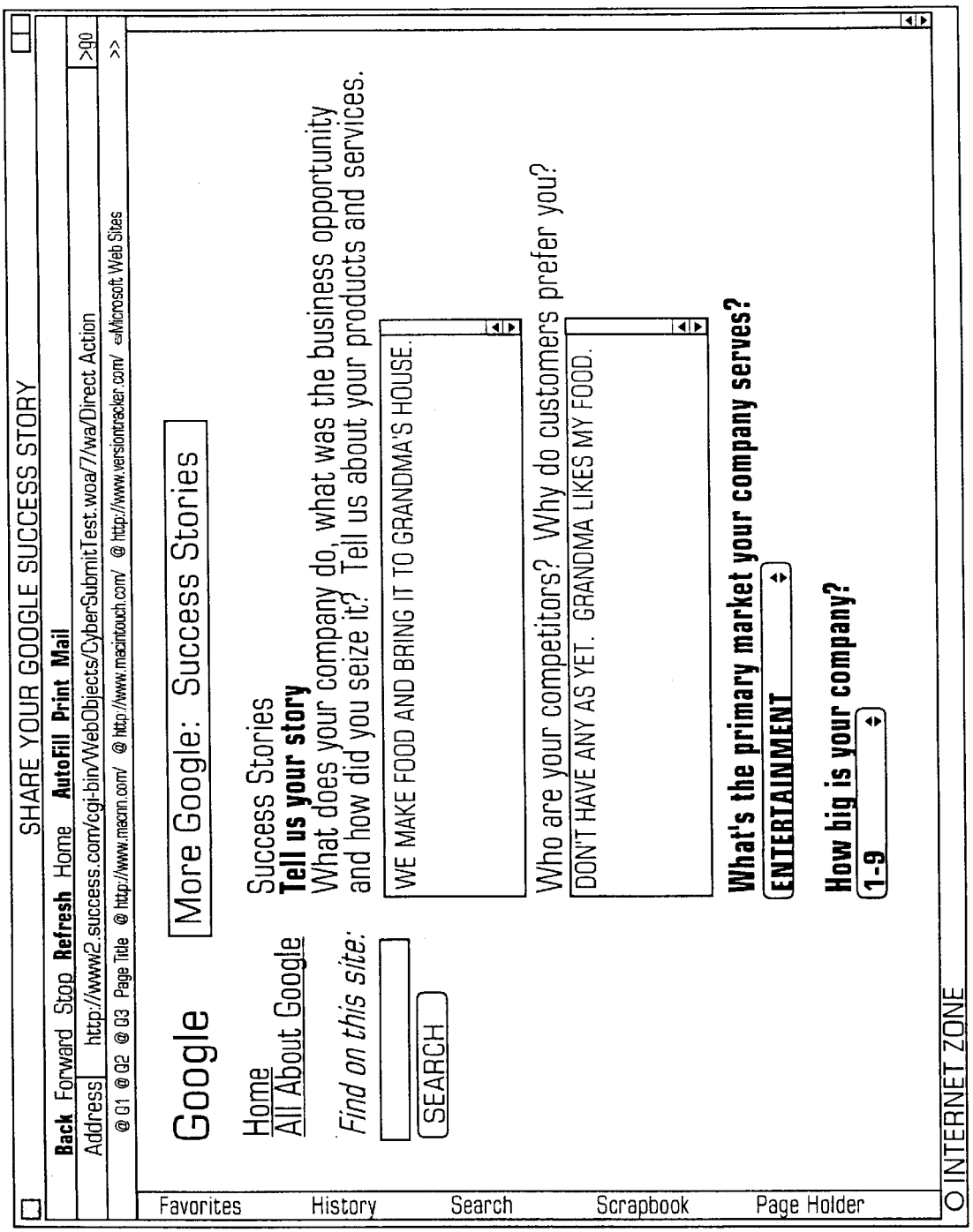

FIGS. 21A–21G are diagrams illustrating an example of a customized interview form in accordance with the invention. In particular, this interview form has been customized for Google (a search engine client) and the interview form is presented to the user when the user receives the e-mail inviting them to partake in an interview and clicks on the URL with the embedded ticket that directs the user to the customized interview form. FIG. 21A illustrates an example of a customized interview form 380 that may be presented to a user that has clicked on the URL with the embedded ticket. In accordance with the invention, the data from the interview preparation page has been filled into the interview page as shown. The user may click on a story button 382 to fill in more information about the story as shown in FIGS. 21B and 21C. The second page of the interview form 384 shown in FIGS. 21B and 21C permit the user to enter various information into the fields of the form as shown. The form may also include one or more drop-down menus that permit the user to select a value from a list of values, such as the size of the company. As shown in FIG. 21C, the bottom of the second page of the form may include a back to previous page button 386 and a tell us about your relationship button 388 that presents the user with the next page of the interview form. In accordance with the invention, as each interview page is completed, it is saved in the system so that the user can quit at any time and pick up later at the same point. Until the interviewee submits the form, he/she can change the data in any page of the form as needed.

Figure 21D:
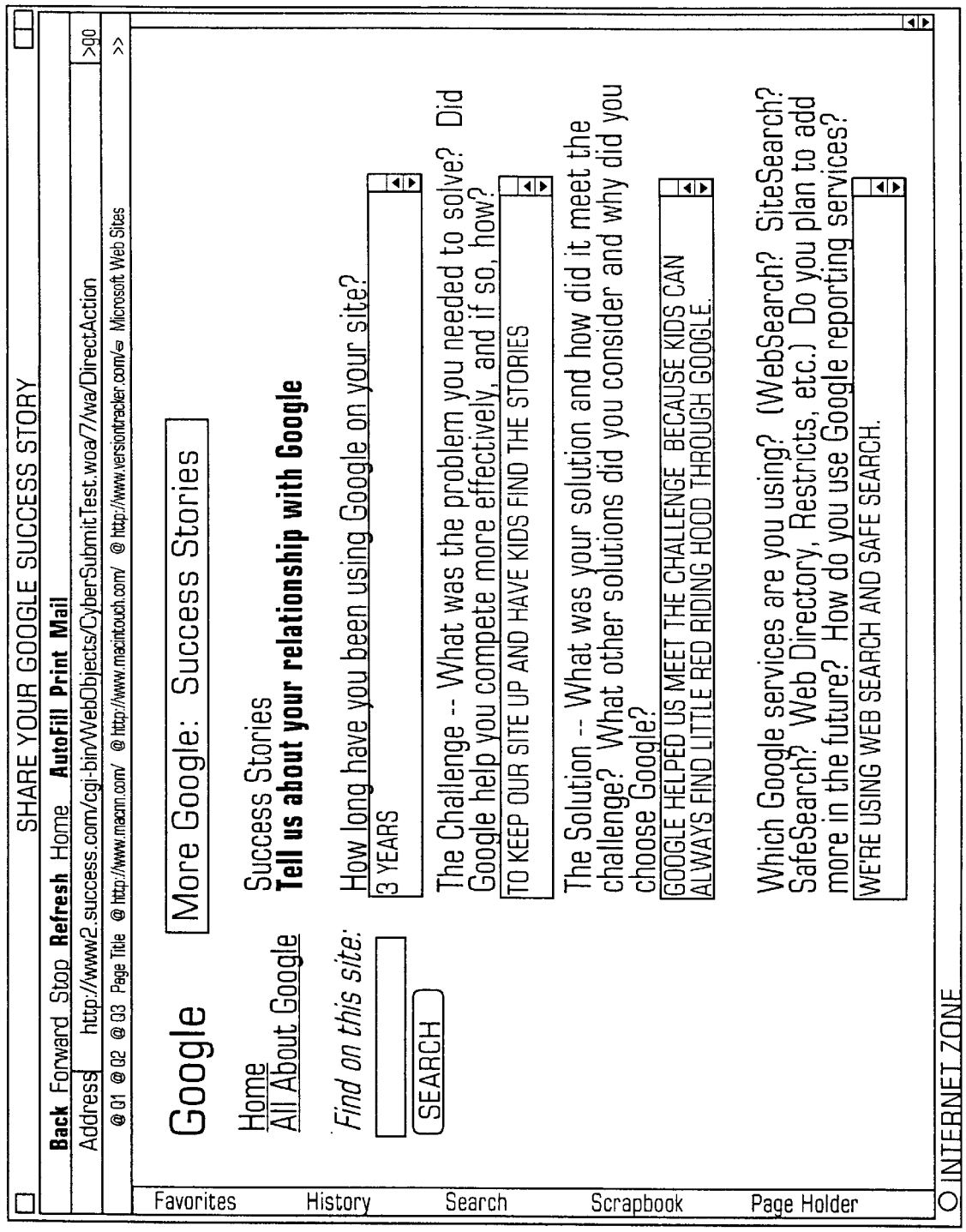
Figure 21E:
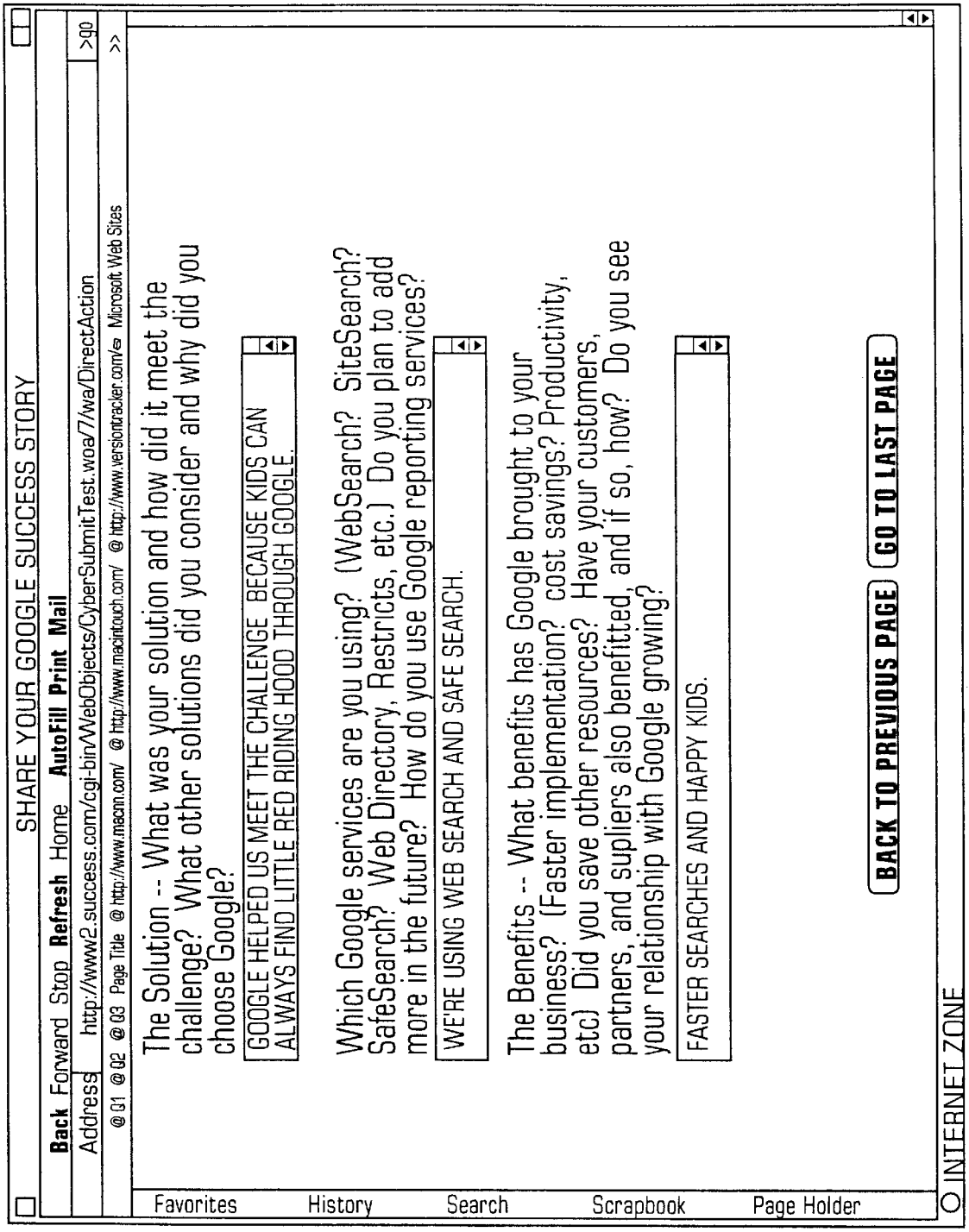
Figure 21F:
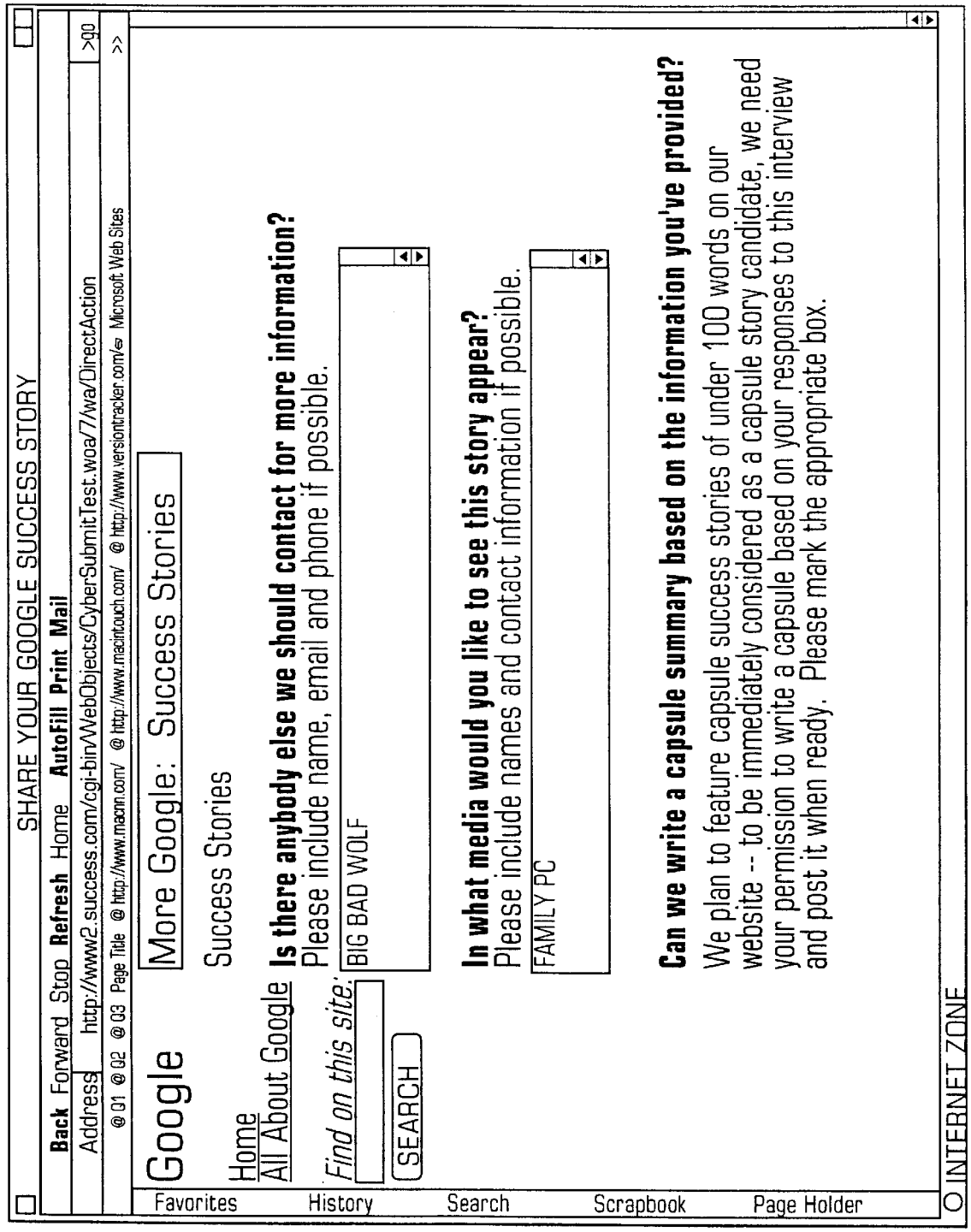
Figure 22A:
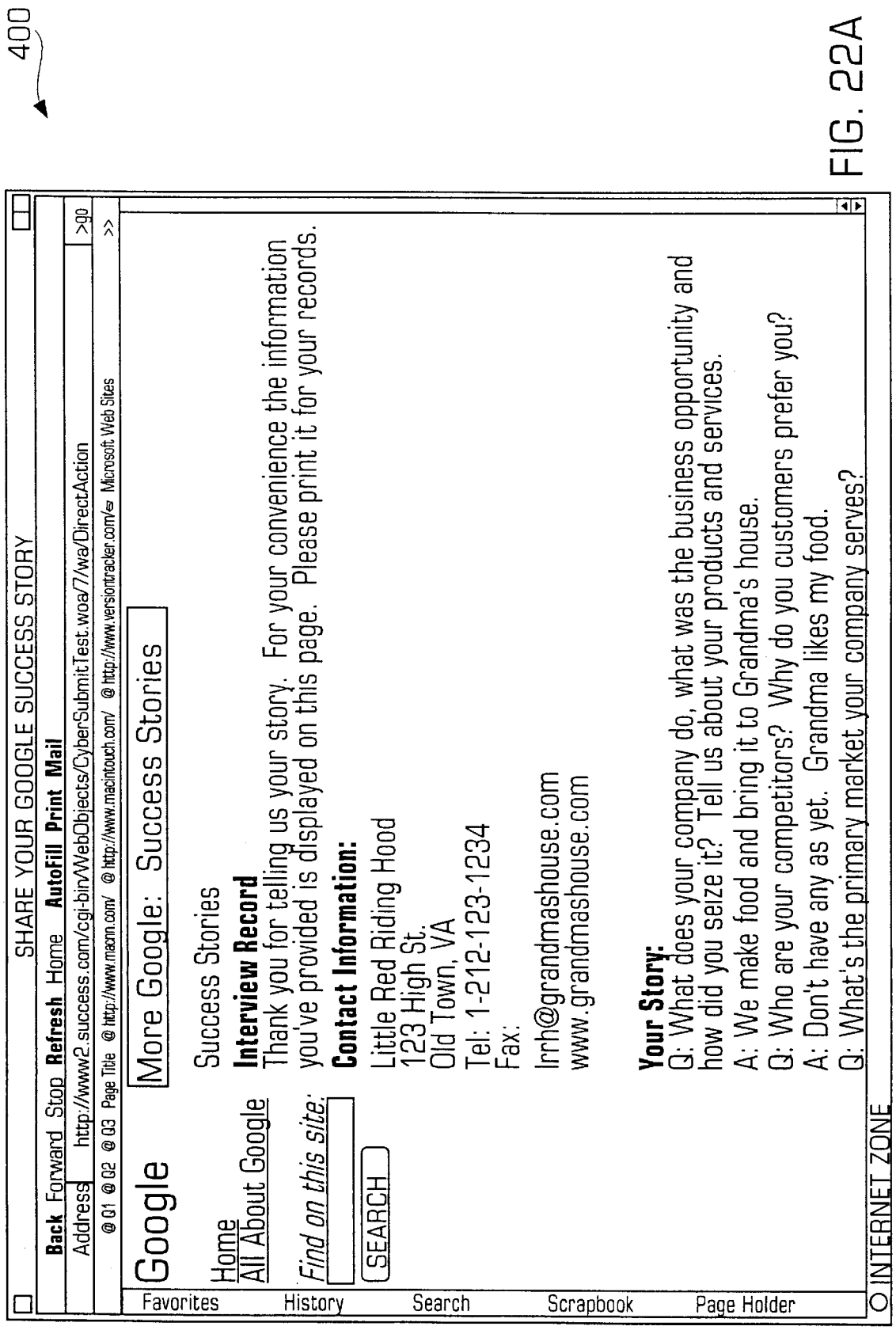

FIGS. 21D and 21E illustrate an example of the next page of the interview form that has been filled in by an interviewee. FIGS. 21F and 21G illustrate a last page of the interview form including a capsule permission portion 390 that requests permission to generate a capsule summary based on the information provided by the interviewee. On this last page, the user has interview form navigation buttons that permit the user to return to the prior pages of the form or submit the completed interview form. Now, an example of the interview transcript will be described. FIGS. 22A–22C are diagrams illustrating an example of an interview transcript in accordance with the invention. In particular, once the interviewee has completed the interview, the interview transcript pages 400 as shown in FIGS. 22A–22C are displayed to the user. The system may also generate an interview receipt that is sent to the interviewee. Now, an example of the interview review form is described.

Figure 23C:
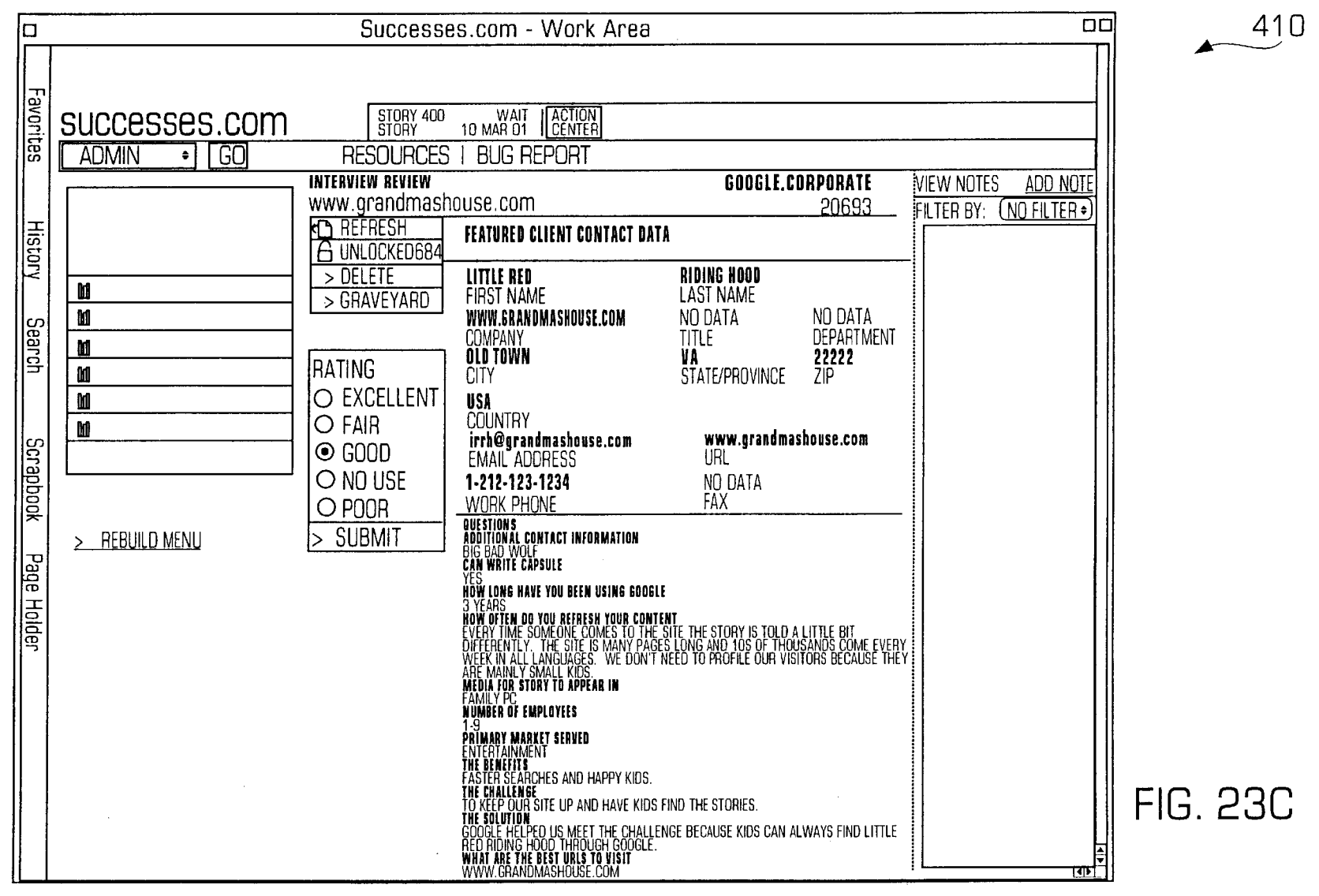
Figure 23D:
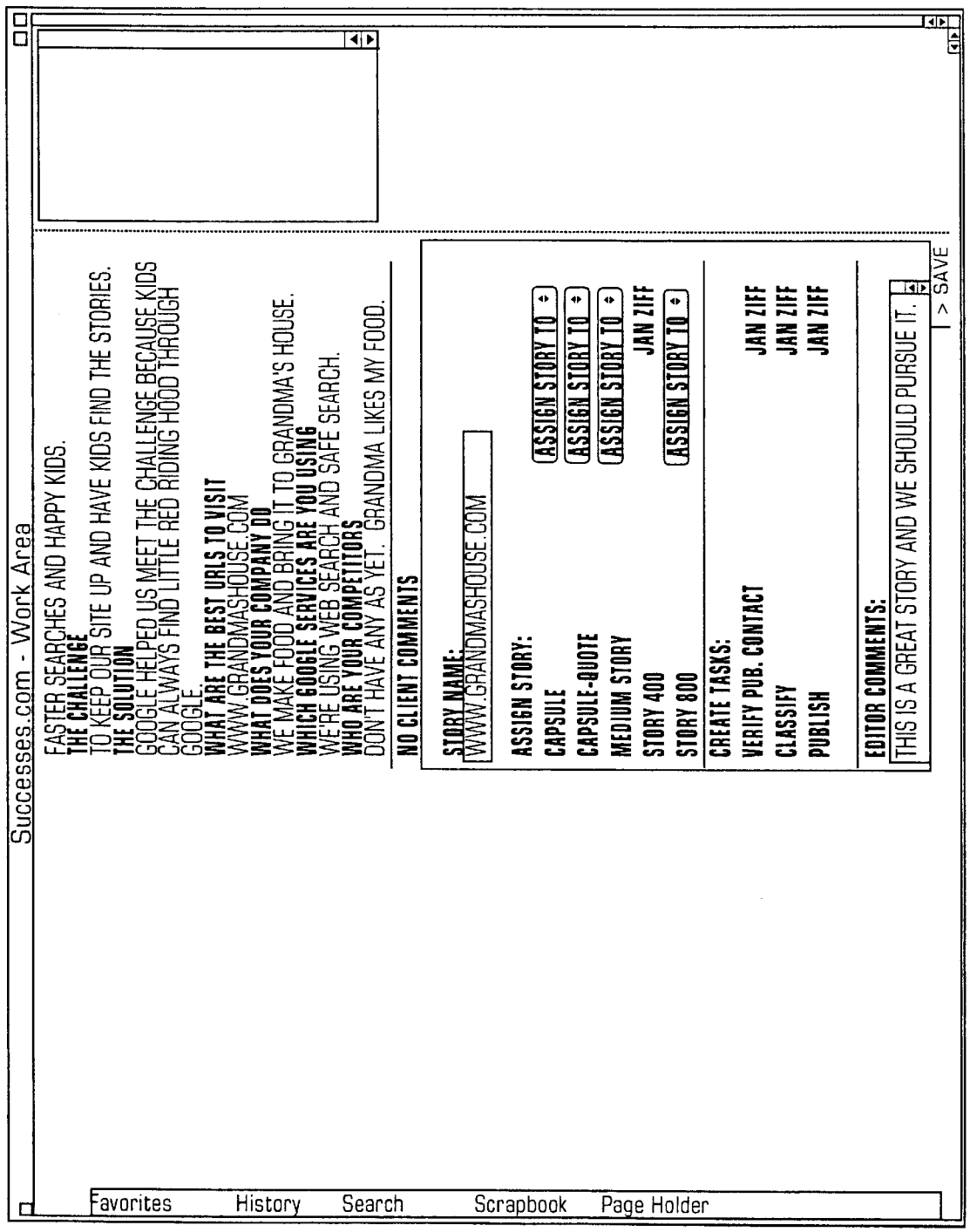

FIGS. 23A–23D are diagrams illustrating an example of an interview review process in accordance with the invention. In particular, FIG. 23A illustrates a page 410 viewed by the person assigned to review the interview (typically the editor of the story) with the questions and response from the interviewee filled in so that it can be reviewed by the person assigned to reviewing the interview. The page may include a data section 412 with the data from the interview and an assignment section 414 as shown in FIG. 23B. In particular, the page permits the user of the system to assign various story related tasks, such as generating the capsule, generating the capsule quote, generating the medium story, generating the 800 word story, generating the 400 word story to one or more people using drop-down menus as shown. The page may also permit the user to assign other tasks, such as verifying the public contact information, classifying the story and publishing the story to one or more people. The section may also include an editor comments portion. FIGS. 23C and 23D illustrate the interview review page 410 once one or more tasks have been assigned to user of the system. In particular, FIG. 23C shows that the assigned user may now create the story types of the story while FIG. 23D illustrates the actual assignments made by the editor including the assignment of the 400 word story to Ms. Ziff. The generation of the 400 word story in accordance with the invention will now be described.

Figure 24A:
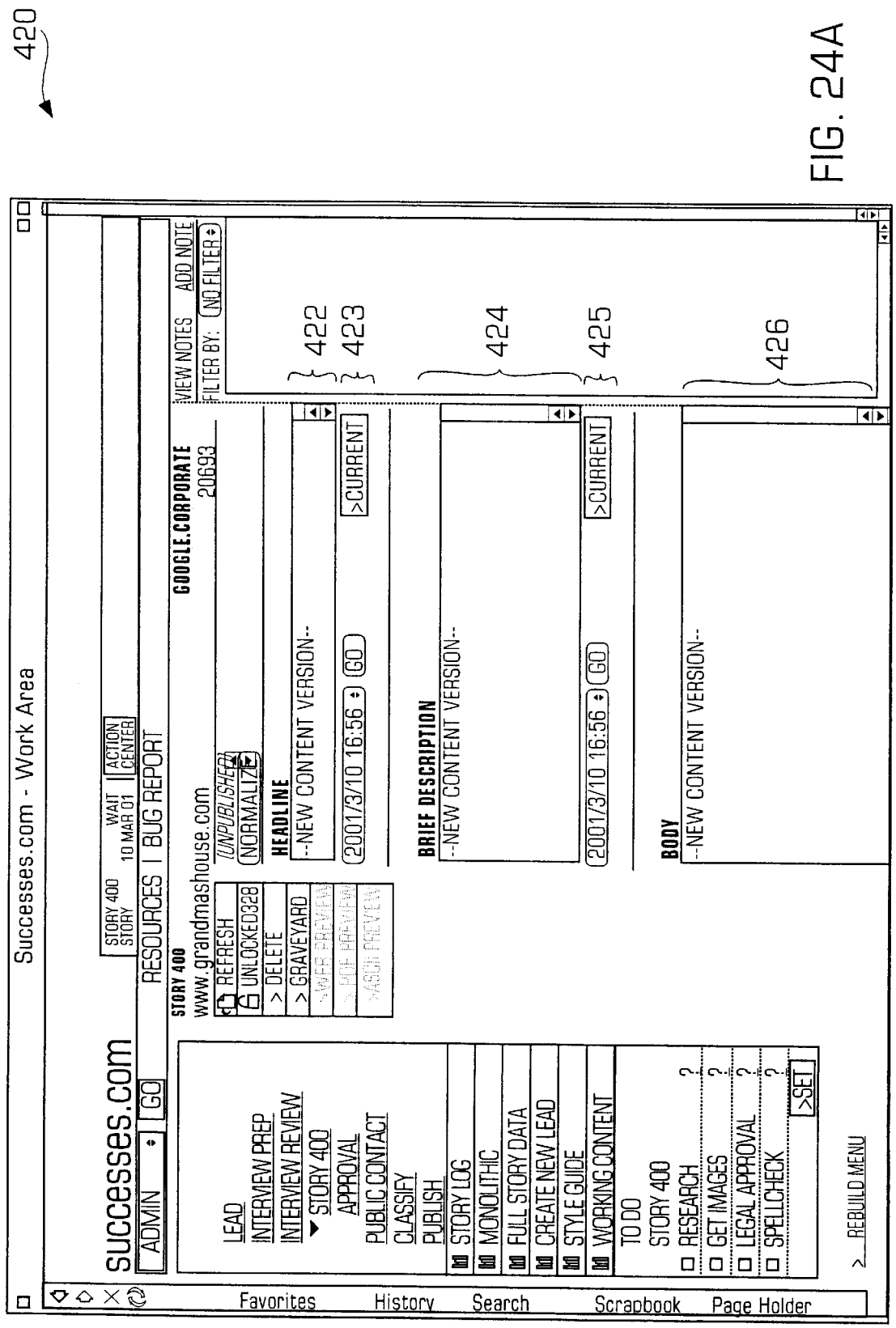
Figure 24B:
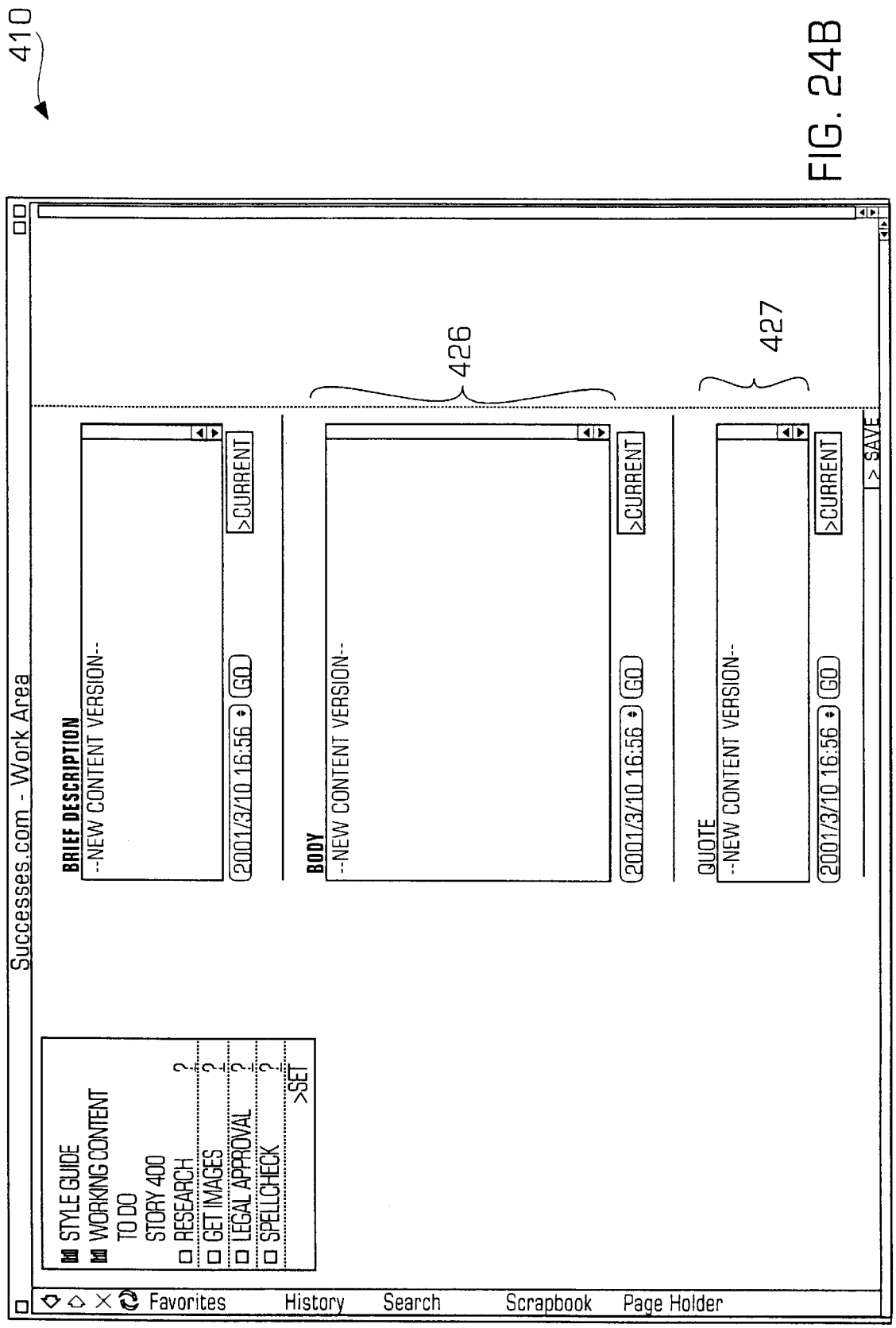
Figure 24C:
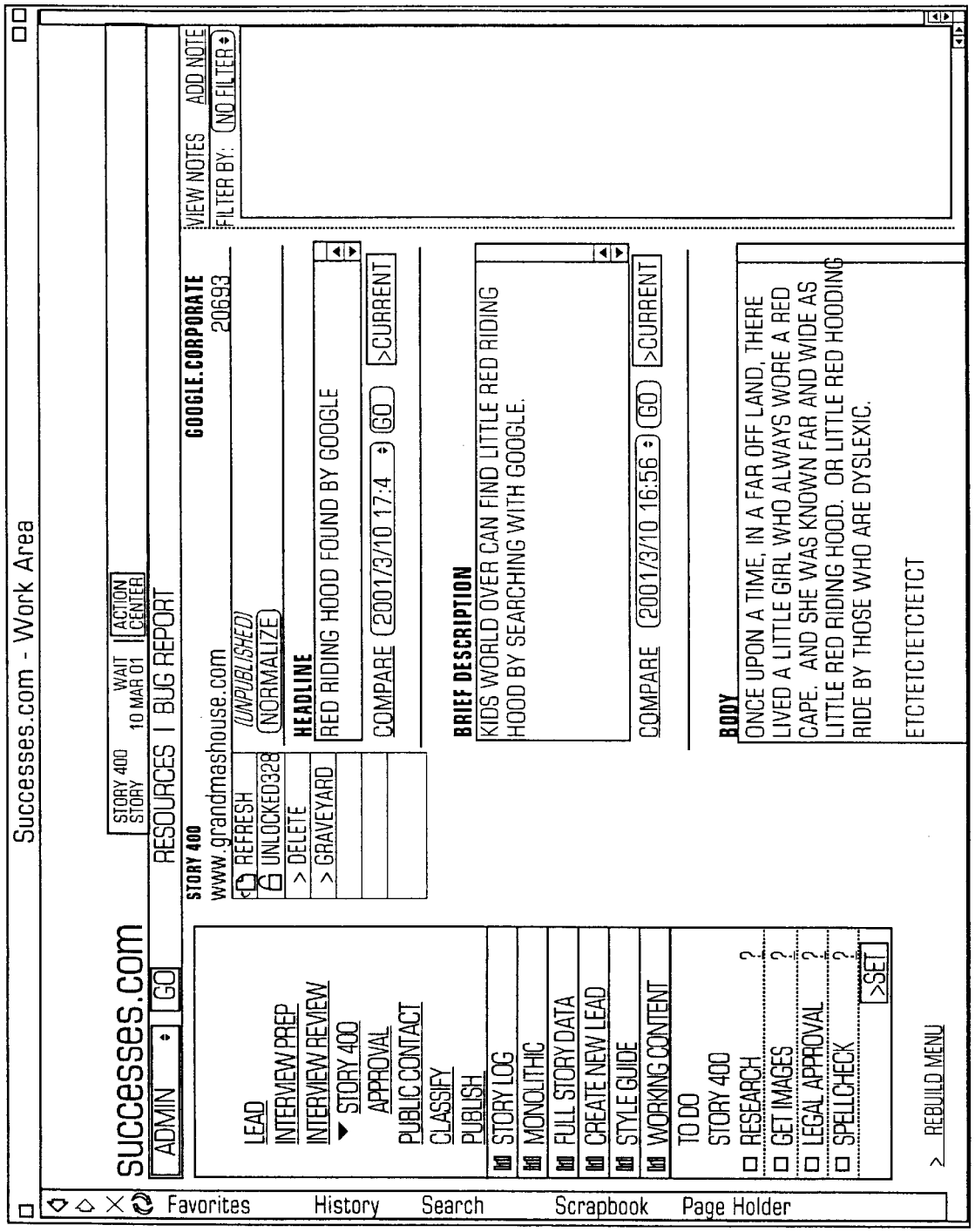
Figure 24E:
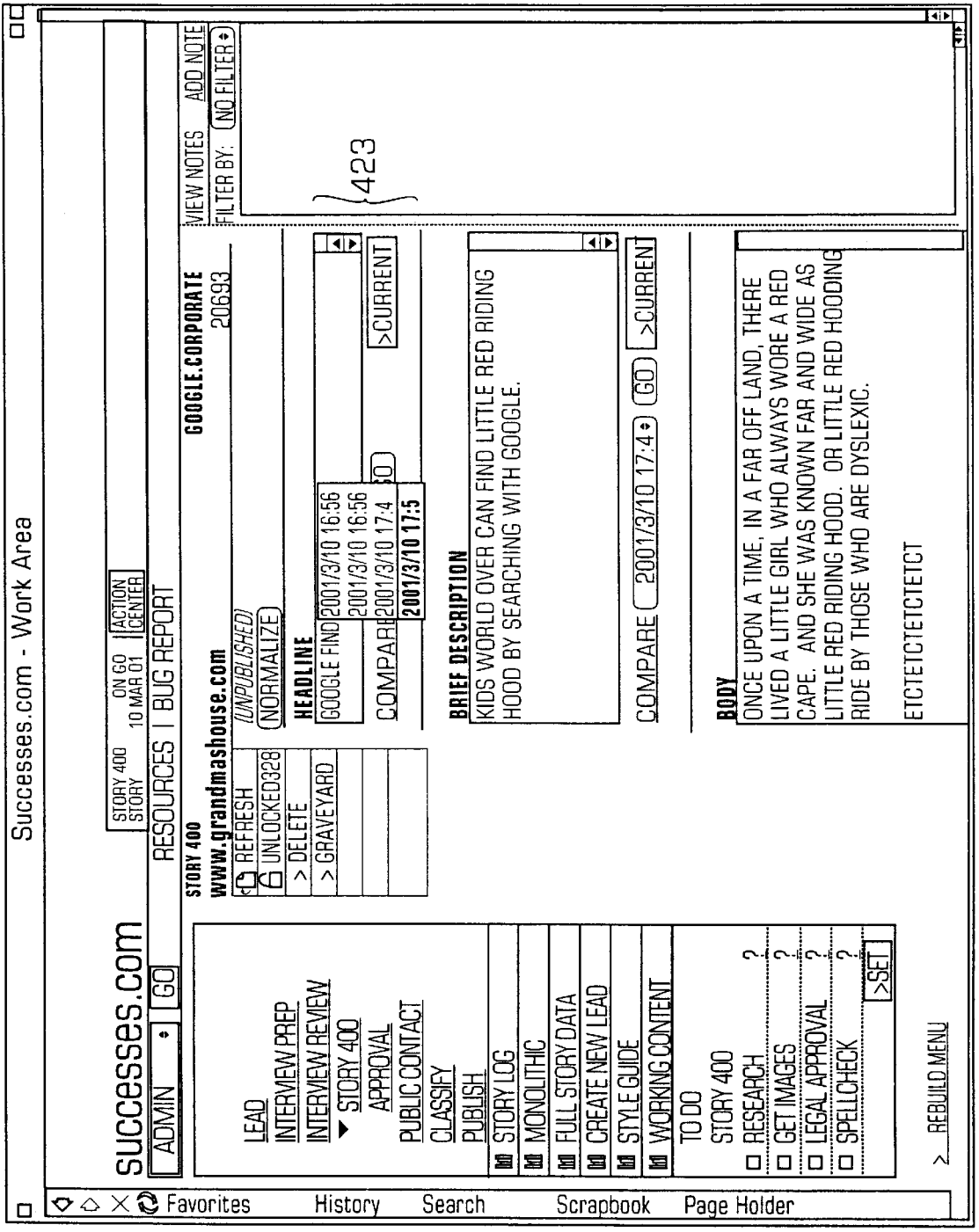

FIGS. 24A–24E are diagrams illustrating an example of a story being created in accordance with the invention. In particular, FIGS. 24A and 24B illustrate a story creation page 420 that is currently blank and ready to be filled in by the user assigned to create the 400 word story. In this example of the page, there may be a headline portion 422 with a compare version and date 423, a brief description portion 424 and an associated compare 425 and a body 426 and an associated compare 427 which permit the user to enter the information into the fields and also check the versions of the sections. FIG. 24C illustrates the same page 420 with the data for the headline, brief description and body filled in by the user that is responsible for generating the story. FIG. 24D illustrates the same page 420 wherein the user has changed the headline. FIG. 24E illustrates the same page 420 wherein one or more different versions of the headline has been saved and the compare region 423 has become a pull-down selection box with the dates and times for each version of the headline so that the user can view each different version of the headline.

The system may also include a content maintenance portion. In particular, once a piece of content is published, the system can set a reminder flag at a predetermined period of time, such as 90 days, associated with the content. Then, the system generates a reminder to the writer or editor of the content after 90 days asking the writer to check with the client and update the content as needed so that the content can be updated instead of being scrapped. The system may also include a mechanism for permitting the user of the system to upload multimedia, such as video, images, audio, etc. into a secure storage area using an automated process. In a preferred embodiment, the multimedia uploading may occur using the ticketing mechanism. Now, the public contacts page in accordance with the invention will be described.

Figure 25A:
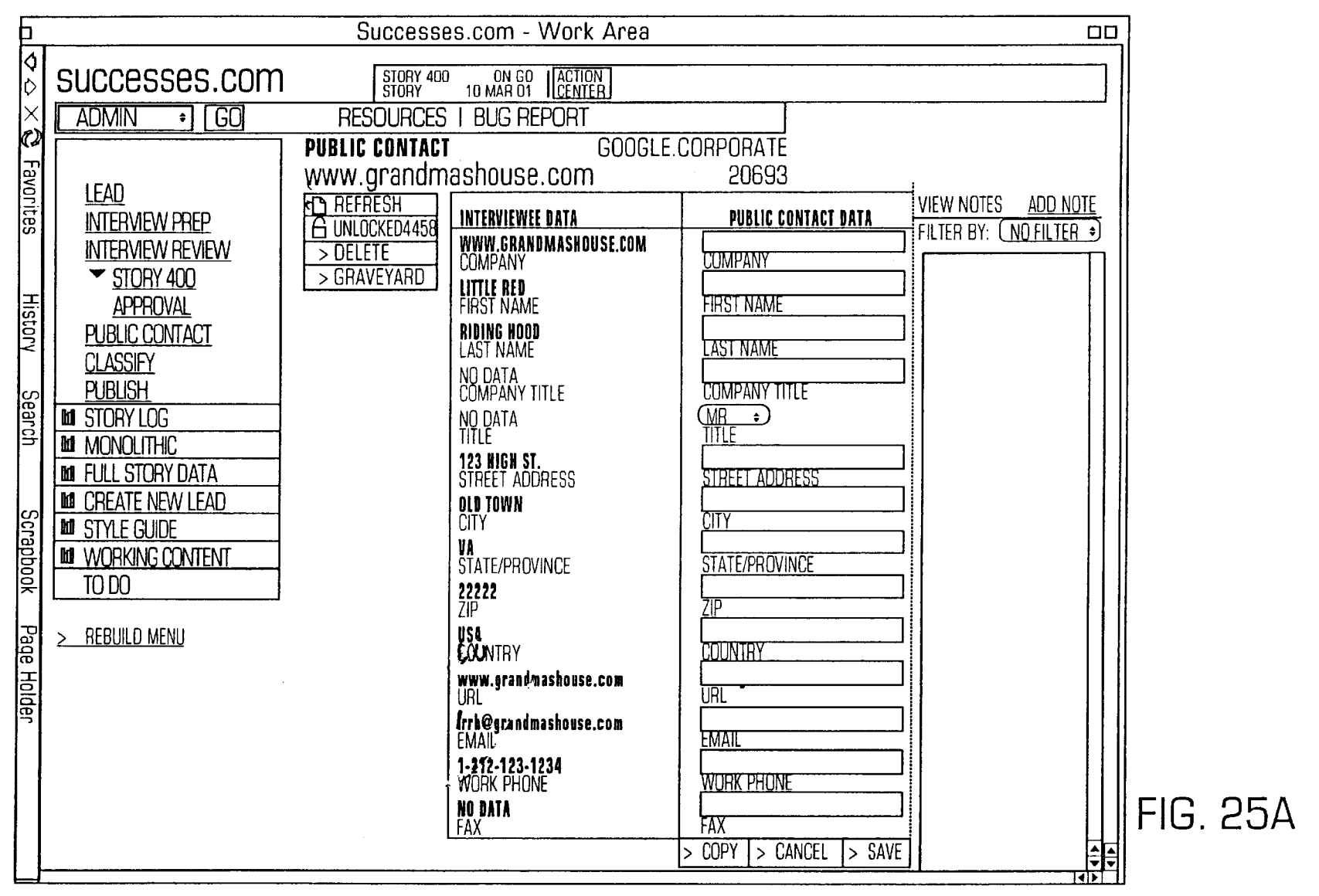
Figure 25B:
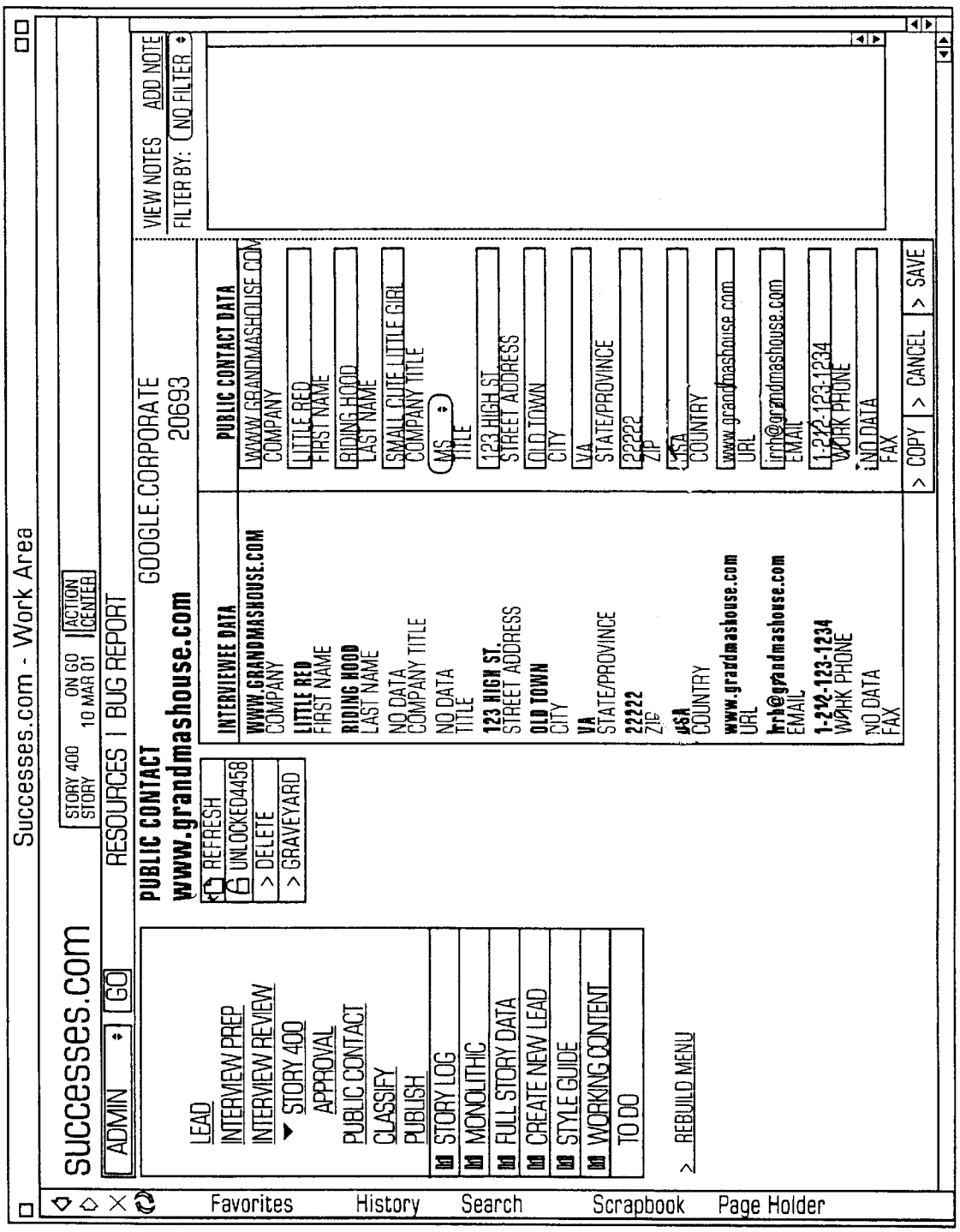

FIGS. 25A and 25B are diagrams illustrating an example of a public contact process in accordance with the invention. In particular, FIG. 25A shows the public contact information as entered by the interviewee during an interview and FIG. 25B illustrates the public contacts page when the data has been transferred into the public contact data area as shown. FIG. 26 illustrates an event log 430 for a particular piece of content, such as a story wherein each action performed on the data relating to the content is tracked so that an audit trail may be generated. As shown, a person viewing the event log can see each and every action performed on the data, the time of the action and who performed the action. Now, an example of the action center page in accordance with the invention will be described.

Figure 27A:
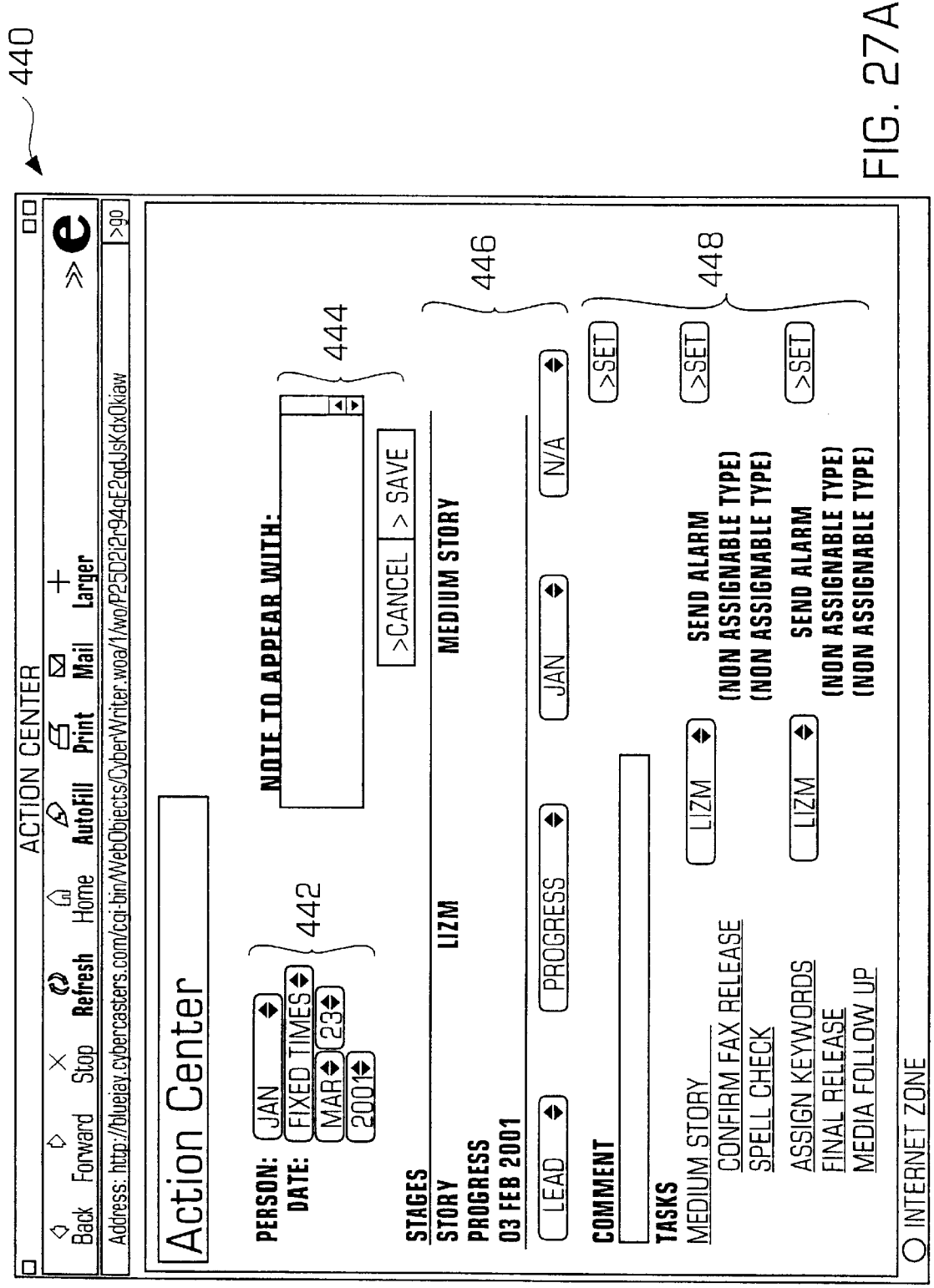
FIGS. 27A and 27B illustrate an example of an action center user interface in accordance with the invention for an editor and a writer.
Figure 27B:
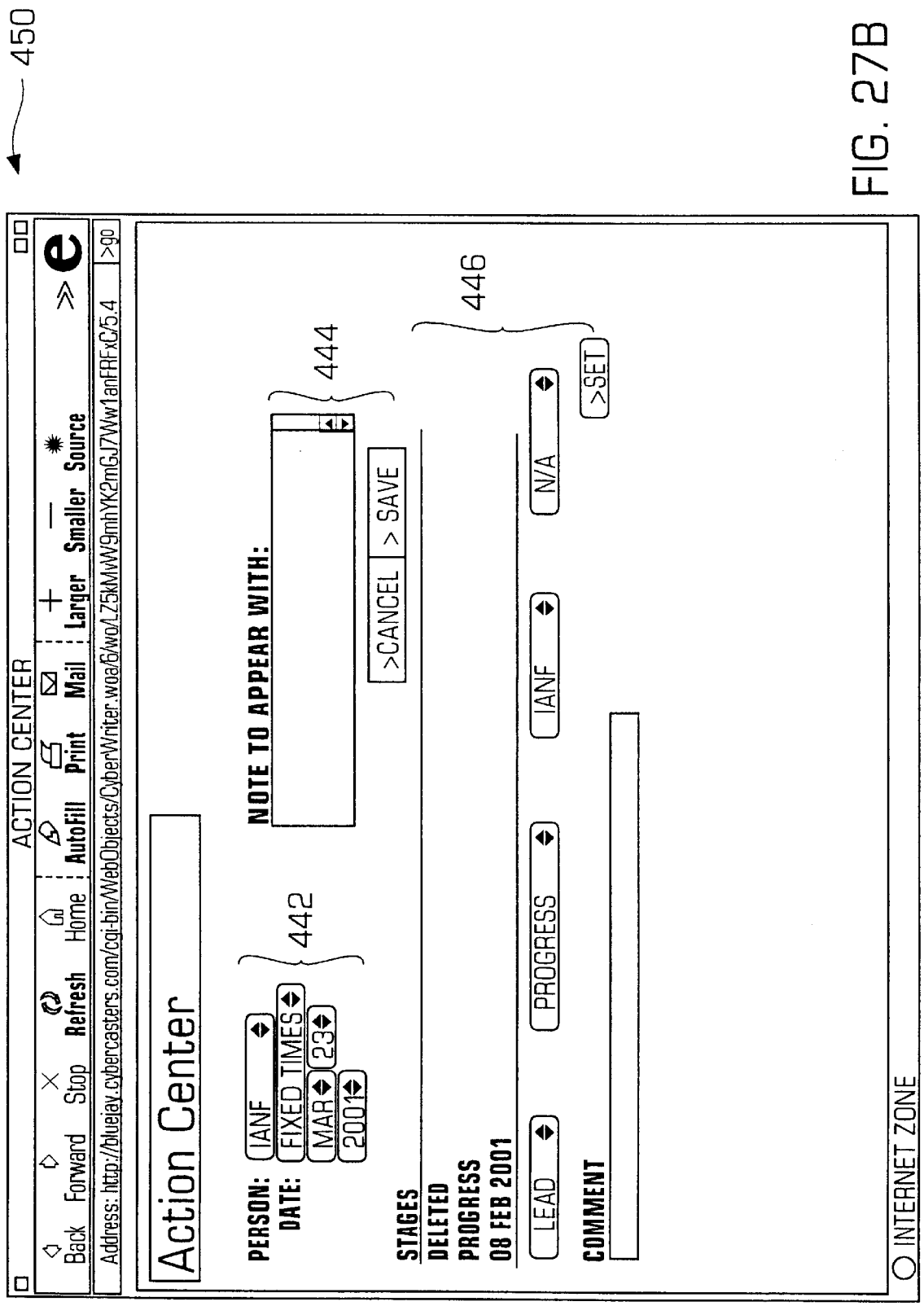

FIGS. 27A and 27B illustrate an example of an action center user interface in accordance with the invention for an editor and a writer. In particular, FIG. 27A illustrates an action center page 440 for an editor while FIG. 27B illustrates an action center page 450 for a writer of the system. In more detail, the action center page 440 for the editor may look at information for a user and/or enter new tasks, etc. for a particular user. The page may include a user identification section 442 so that the editor can select the user name and date to look at the actions for a particular user of the system. The page may also include a notes section 444 that permits the editor to add a note that will appear the next time that particular user logs into the system. The page may also include a stages section 446 that lists the stage of the current tasks assigned to the user and a tasks section 448 that permits the editor to look at the current assignments of the tasks for the user and permits the editor to reassign tasks as needed. The page for a writer as shown in FIG. 27B may be similar expect that it may not include the task reassignment portion so that the writer may view the tasks and assign tasks as needed. Now, the user interface for the Extranet system in accordance with the invention will be described.

FIGS. 28A–28H are screen shots illustrating the user interface and operation of the Extranet portion of the content development management system in accordance with the invention. In accordance with the invention, the system permits internal users to access the system as well as external users. The external users make use of the Extranet portion to access the system and then the process for generating a lead through to publishing a piece of content is substantially similar to the process for an internal user as described above with reference to FIGS. 18–27. For example, a manager within a particular corporation that is a client of the content development management system may use the Extranet to manage the content generation process in accordance with the invention.

Figure 28A:
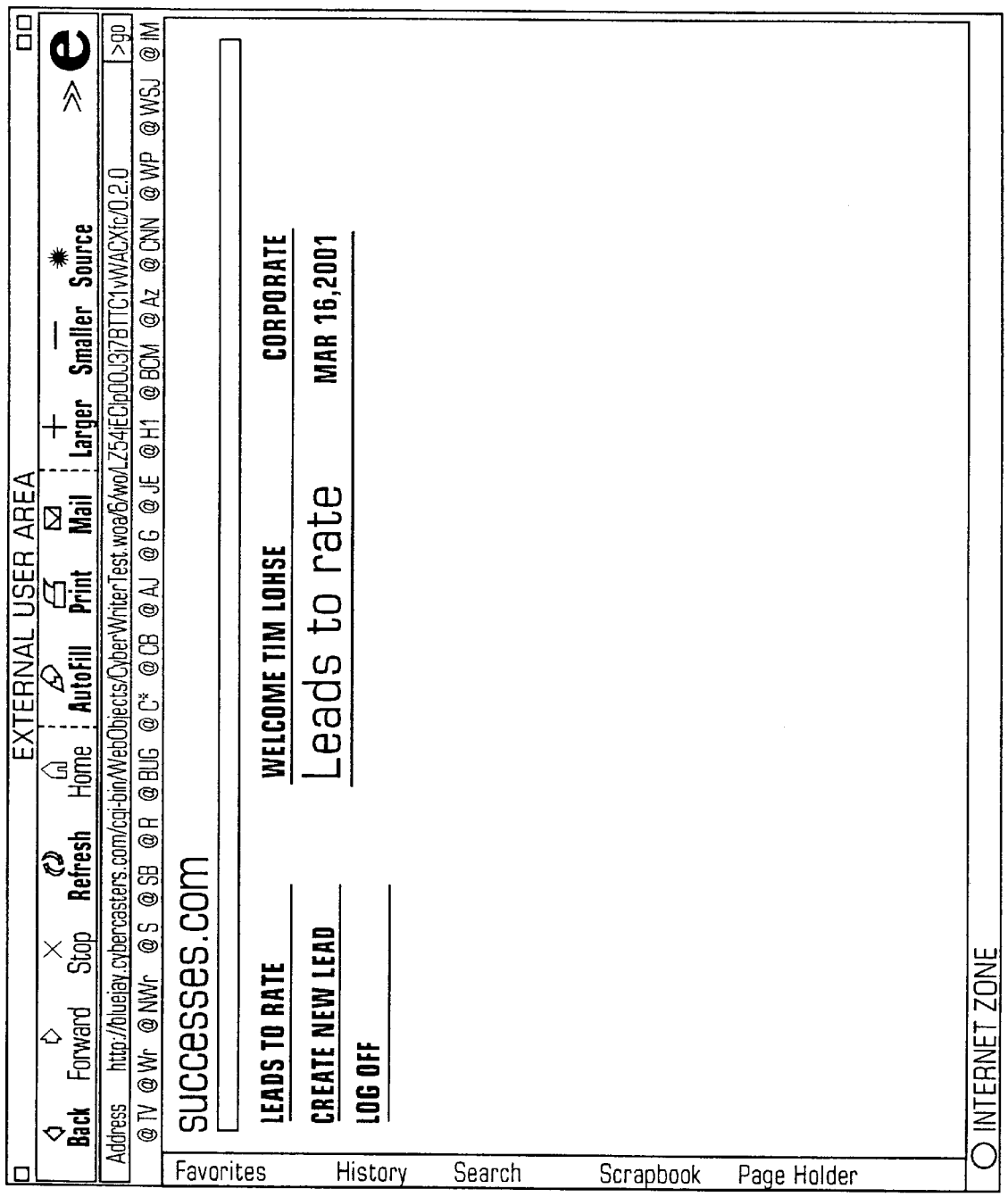
Figure 28D:
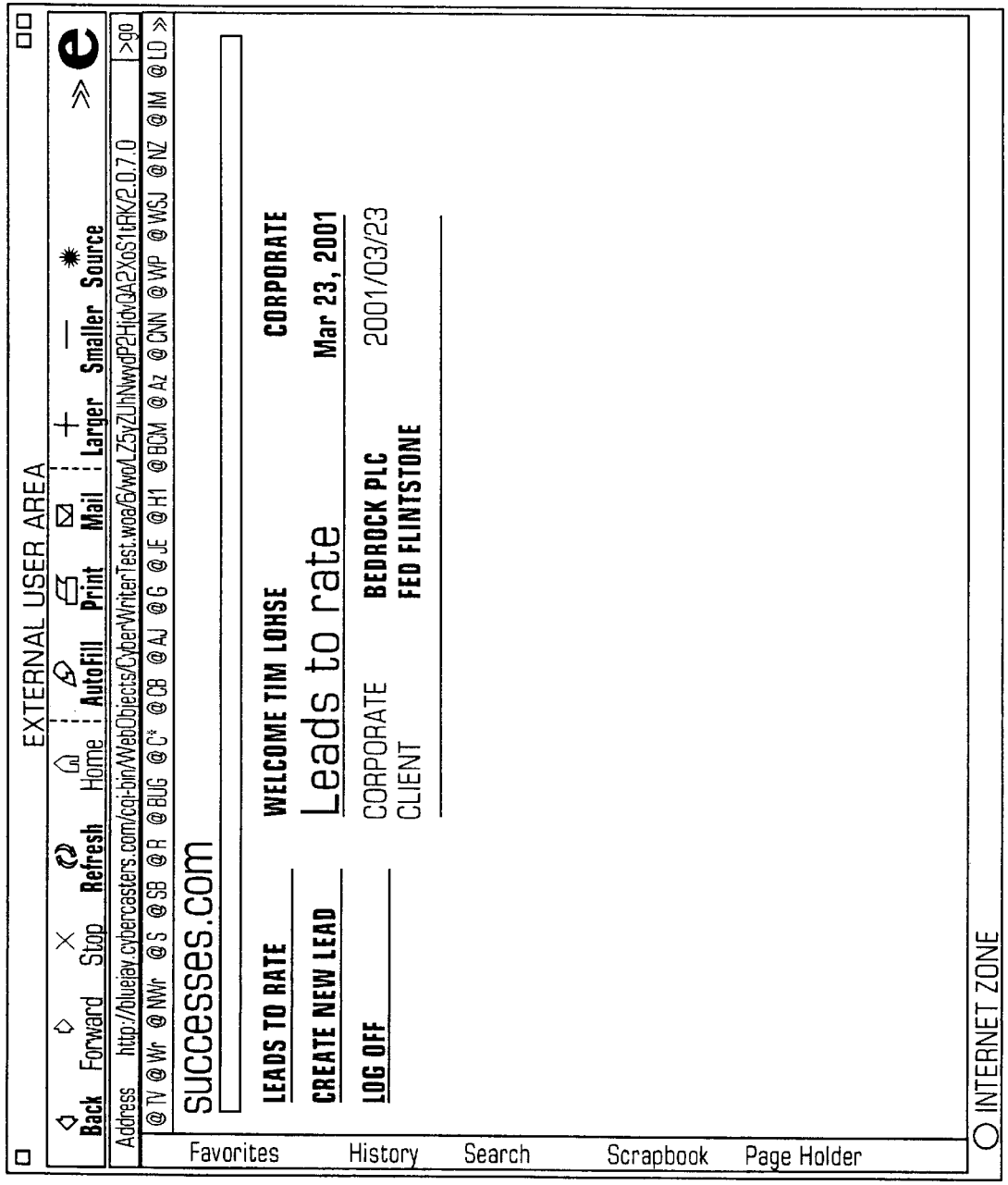
Figure 28F:
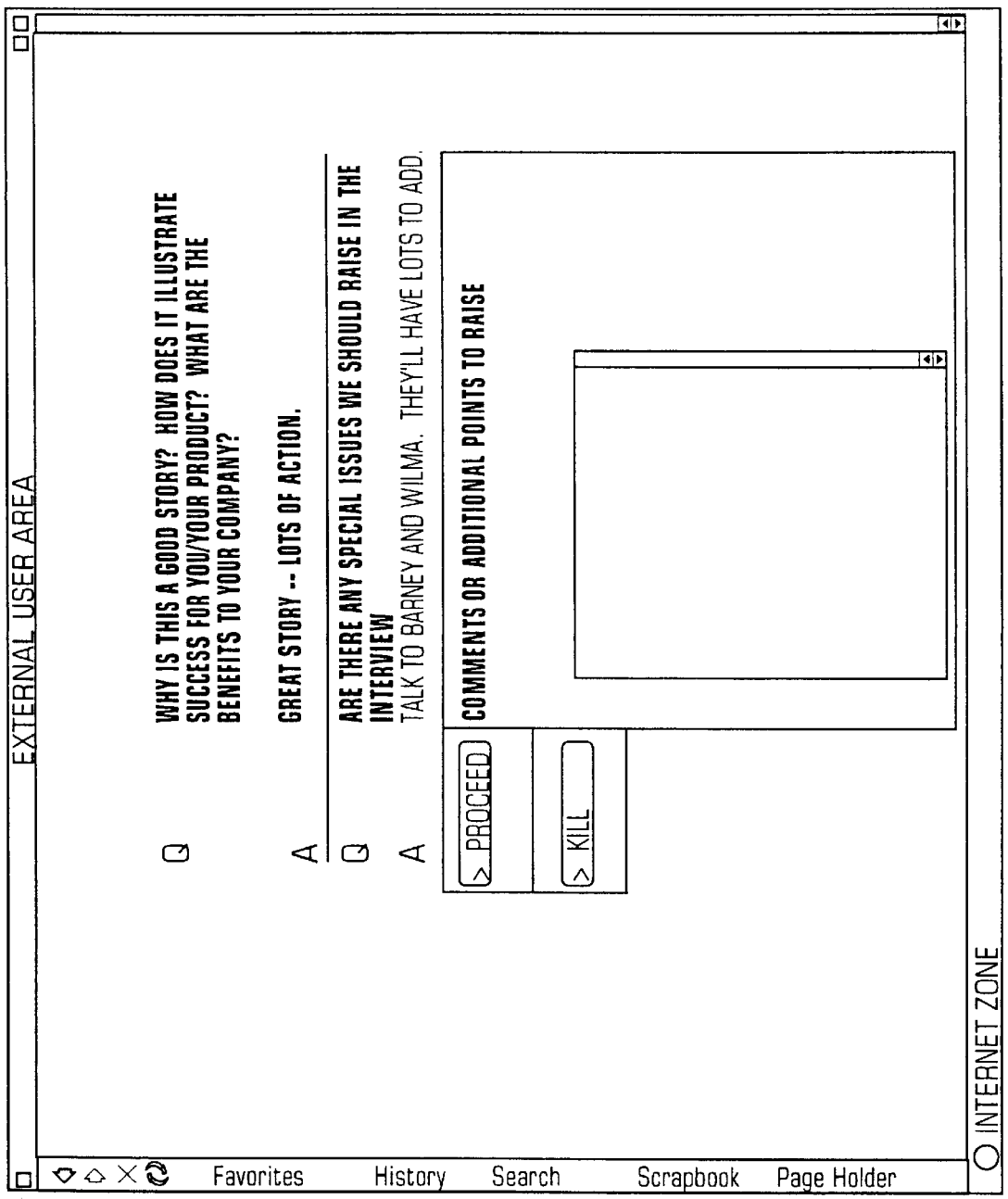

Briefly, FIG. 28A illustrates an example of the user interface which a client may see when they log into the system which shows the current leads to review and rate. FIG. 28B illustrates an example of a page that may be used to generate a lead while FIG. 28C illustrates a lead being created by an external user. FIG. 28D illustrates the same log-in page as shown in FIG. 28A except that the user now has a lead to rate and review. FIG. 28E and FIG. 28F illustrate the user interface with which an external use may rate a lead and provide comments about a lead. FIG. 28G illustrates another lead being generated and FIG. 28H illustrates the user interface presented to the user when the user logs in and has more than one lead to review and rate. As mentioned above, the rest of the content generation process is similar to that of an internal user and therefore will not be described herein.

In summary, the content development system in accordance with the invention provides many benefits and advantages that facilitate the content generation process. The system is highly customizable and includes performance tracking for the various users of the system, including the editors, writers and the like. The system may include cost management systems. The system may automatically generate reports which permit various statistics about the users of the system to be monitored. The system may also track and compare the typical content generation time to a current content generation time in order to identify efficient writers or content that has been lagging in the system.

The system in accordance with the invention is not limited to story generation or content generation as described in the preferred embodiments. For example, the system may be used to hire new employees. The system may be used to generate leads. Once the lead is approved, the candidate may be presented with a ticket and the interview portion of the content generation system may be used to interview a new potential candidate for a particular position. In particular, the interview form would be customized for the particular position. The system may then ask the candidate to submit data and samples, such as writing samples, to a secure web location so that the candidate can be reviewed. Obviously, the system may also be used for various other processes.

The system may also include a help system wherein the user may click on an icon at any time to bring up a help screen for the system. The system may also include a style guide for customers so that people working with the particular customer are able to see the styles unique to that customer. For example, a particular customer may require that only certain words may be used in a particular piece of content. The system may also include templates for e-mails which are customizable.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A content generation management system, comprising:
a first computer comprising a database that stores a plurality of data records, each data record containing information about a particular piece of content including at least content lead information and content information and a content generation workflow manager that manages the workflow from lead generation to content publication; and
one or more extranets connected to the first computer over a network, each extranet being used to generate content for a particular entity, each user of a particular extranet being able to submit information for content about the entity to the first computer; and
wherein the content generation workflow manager further comprises a lead generation system for generating leads for content and performing interviews of the leads, a writer module for generating the content and a publisher that publishes the content.

2. The system of claim 1, wherein the database further comprises a client node for each client of the system and one or more workthread nodes that store information about the workflow for each piece of content associated with the client.

3. The system of claim 2, wherein the database further comprises one or more department nodes associated with the client node so that one or more different departments of a client may have different content, but the content for the client is associated with all of the other content of the client.

4. The system of claim 3, wherein the one or more workthreads are associated with the department node.

5. The system of claim 2, wherein each workthread node further comprises one or more content nodes wherein each content node contains information about a particular piece of content for the client.

6. The system of claim 5, wherein each content node further comprises one or more content type nodes wherein each content type node further comprises information about a different generation of the content within the system.

7. The system of claim 6, wherein each content type node comprises one or more content component nodes wherein each content component node contains information about a portion of the particular content type.

8. The system of claim 7, wherein each content component node further comprises one or more component version nodes wherein each component version node contains information about a particular version of the component.

9. The system of claim 2, wherein each workthread node further comprises a datastore node that further comprises one or more lead nodes containing information about the leads associated with a particular piece of content, one or more interview nodes containing information about the interviews associated with the piece of content and one or more workcontent nodes containing the information about the piece of content.

10. The system of claim 1, wherein the content generation workflow manager further comprises means for assigning a different access privilege level to each user of the system.

11. The system of claim 1, wherein the content generation workflow manager further comprises a ticketing system for permitting limited access to the system in order to submit information to the system.

12. The system of claim 1, wherein the content generation workflow manager further comprises means for generating a lead for a piece of content, means for generating interview information for the piece of content based on the lead, means for generating a piece of content based on the lead and interview and means for publishing the content.

13. The system of claim 12, wherein the interview generation means further comprises a ticketing system to permit a featuree of a lead to access the system for the limited purpose of submitting interview information into the system.

14. The system of claim 12, wherein the content generation means further comprises a ticketing system to permit a reviewer of a piece of generated content to access the system for the limited purpose of reviewing the generated content and approving the generated content.

15. The system of claim 1, wherein the content generation workflow manager further comprises means for customizing the information associated with each user of the system including the user interface.

16. The system of claim 1, wherein the content generation workflow manager further comprises a search engine that permits users of the system to search for the content stored in the database.

17. The system of claim 12, wherein the publication means further comprises means for randomizing one or more elements of the piece of content.

18. The system of claim 12, wherein the publishing means further comprises means for pre-generating a search page of the content in the published web site.

19. A method for managing the workflow during the creation of a plurality of pieces of content based on content leads, the method comprising:
  receiving a lead from a user, the submission including contact information about the submitter and information about the potential piece of content;
  storing the content lead data;
  generating a piece of content based on the content lead comprising rating a lead as being publishable and managing a content lead rated as publishable in order to produce a publishable piece of content, the managing comprising tracking the one or more steps involved in publishing the piece of content wherein each step is independent of each other step and the steps are completed in any order; and
  publishing the publishable content in one or more different formats.

20. The method of claim 19, wherein the content generation workflow managing further comprises assigning a different access privilege level to each user of the system.

21. The method of claim 20, wherein the content generation workflow managing further comprises ticketing a user to permit limited access to the system in order to submit information to the system.

22. The method of claim 19, wherein the content generation workflow managing further comprises generating a lead for a piece of content, generating interview information for the piece of content based on the lead, generating a piece of content based on the lead and interview and publishing the content.

23. The method of claim 22, wherein the interview generation further comprises ticketing to permit a featuree of a lead to access the system for the limited purpose of submitting interview information into the system.

24. The method of claim 22, wherein the content generation further comprises ticketing to permit a reviewer of a piece of generated content to access the system for the limited purpose of reviewing the generated content and approving the generated content.

25. The method of claim 19, wherein the content generation workflow managing further comprises customizing the information associated with each user of the system including the user interface.

26. A computer system for managing the workflow during the creation of a plurality of content based on content leads, the system comprising:
  a database for storing a plurality of data records, each data record containing information about a particular piece of content including at least a lead;
  means for receiving a lead for a user, the lead including contact information about the submitter and information about the potential story;
  means for interviewing the user about the piece of content;
  means for generating a piece of content based on the lead and interview comprising means for rating the content lead as being publishable and means for managing a content lead rated as publishable in order to produce a publishable piece of content, the managing means comprising means for tracking the one or more steps involved in publishing of the content wherein each step is independent of each other step and the steps are completed in any order; and
  means for publishing the content in one or more different formats.

27. A database for storing one or more pieces of content associated with a client in a content generation management system, the database comprising:
  a client node for each client of the system and one or more workthread nodes that store information about the workflow for each piece of content associated with the client and one or more department nodes associated with the client node so that one or more different departments of a client may have different content, but the content for the client is associated with all of the other content of the client.

28. The database of claim 27, wherein the one or more workthreads are associated with the department node.

29. The database of claim 28, wherein each workthread node further comprises one or more content nodes wherein each content node contains information about a particular piece of content for the client.

30. The database of claim 29, wherein each content node further comprises one or more content type nodes wherein each content type node further comprises information about a different generation of the content within the system.

31. The database of claim 30, wherein each content type node comprises one or more content component nodes wherein each content component node contains information about a portion of the particular content type.

32. The database of claim 31, wherein each content component node further comprises one or more component version nodes wherein each component version node contains information about a particular version of the component.

33. The database of claim 27, wherein each workthread node further comprises a datastore node that further comprises one or more lead nodes containing information about the leads associated with a particular piece of content, one or more interview nodes containing information about the interviews associated with the piece of content and one or more workcontent nodes containing the information about the piece of content.

* * * * *